United States Patent
Abbas

(10) Patent No.: US 10,046,242 B1
(45) Date of Patent: Aug. 14, 2018

(54) IMAGE PROCESSING FOR IMPROVING MEMORIZATION SPEED AND QUALITY

(71) Applicant: S3B.Memorization, LLC, Silver Spring, MD (US)

(72) Inventor: Mehyar Abbas, Silver Spring, MD (US)

(73) Assignee: SYRIAN AMERICAN INTELLECTUAL PROPERTY (SAIP), LLC, San Jose, CA (US)

( * ) Notice: Subject to any disclaimer, the term of this patent is extended or adjusted under 35 U.S.C. 154(b) by 147 days.

(21) Appl. No.: 14/839,336

(22) Filed: Aug. 28, 2015

Related U.S. Application Data

(60) Provisional application No. 62/044,173, filed on Aug. 29, 2014, provisional application No. 62/092,826, filed on Dec. 16, 2014, provisional application No. 62/115,267, filed on Feb. 12, 2015, provisional application No. 62/196,882, filed on Jul. 24, 2015.

(51) Int. Cl.
| | |
|---|---|
| *G09B 19/04* | (2006.01) |
| *A63F 13/822* | (2014.01) |
| *A63F 13/215* | (2014.01) |
| *A63F 13/211* | (2014.01) |
| *A63F 13/2145* | (2014.01) |

(52) U.S. Cl.
CPC ........ *A63F 13/822* (2014.09); *A63F 13/211* (2014.09); *A63F 13/215* (2014.09); *A63F 13/2145* (2014.09)

(58) Field of Classification Search
None
See application file for complete search history.

(56) References Cited

U.S. PATENT DOCUMENTS

| | | | |
|---|---|---|---|
| 5,219,291 A | 6/1993 | Fong et al. | |
| 5,252,075 A | 10/1993 | Heng | |
| 6,755,657 B1 * | 6/2004 | Wasowicz | G09B 5/04 434/167 |
| 6,986,663 B2 * | 1/2006 | Budra | G09B 5/00 434/167 |
| 7,933,852 B2 * | 4/2011 | Jenkins | G09B 5/02 706/45 |
| 8,408,910 B2 * | 4/2013 | Hölljes | A63F 13/53 434/156 |
| 8,777,626 B2 * | 7/2014 | Levy | G09B 17/006 434/156 |

(Continued)

*Primary Examiner* — Sunit Pandya

(57) ABSTRACT

Memorization systems and methods are provided. The systems and methods include outputting, at a hardware platform, an image sequence that forms an environment to facilitate memorization and displaying a controllable object in the image sequence as continuously moving along a path, and controlling a position of the controllable object within each image of the image sequence, based on a user input. Moreover, item objects may be displayed in the image sequence as obstacles in the path to block the controllable object. The obstacles may contain information suitable for memorization. In addition, systems and methods may include outputting an image representing a negative indicator in response to the controllable object selecting an incorrect action, or outputting an image representing a positive indicator in response to movement of the controllable object selecting a correct action.

37 Claims, 45 Drawing Sheets
(39 of 45 Drawing Sheet(s) Filed in Color)

(56) References Cited

U.S. PATENT DOCUMENTS

| | | | | |
|---|---|---|---|---|
| 8,825,492 B1* | 9/2014 | Buhadi | ................. | G09B 19/04 |
| | | | | 434/156 |
| 2004/0023195 A1* | 2/2004 | Wen | ...................... | G09B 19/06 |
| | | | | 434/185 |
| 2004/0058304 A1* | 3/2004 | Morsy | ..................... | G09B 7/00 |
| | | | | 434/262 |
| 2005/0196732 A1 | 9/2005 | Budra et al. | | |
| 2005/0208459 A1* | 9/2005 | Chang | ..................... | G09B 5/06 |
| | | | | 434/169 |
| 2006/0292529 A1 | 12/2006 | De Ley et al. | | |
| 2009/0053681 A1* | 2/2009 | Shen | ..................... | G09B 19/06 |
| | | | | 434/157 |
| 2010/0092933 A1* | 4/2010 | Kuchera | ............... | G09B 17/00 |
| | | | | 434/185 |
| 2010/0248194 A1 | 9/2010 | Renduchintala et al. | | |
| 2013/0260346 A1* | 10/2013 | Wood | ..................... | G09B 5/00 |
| | | | | 434/156 |
| 2013/0323692 A1 | 12/2013 | Freimuth et al. | | |
| 2014/0173638 A1 | 6/2014 | Anderson | | |
| 2015/0037765 A1 | 2/2015 | Jaggi et al. | | |

\* cited by examiner

IMAGE PROCESSING FOR IMPROVING MEMORIZATION SPEED AND QUALITY

CROSS-REFERENCE TO RELATED APPLICATIONS

This claims the priority benefit of U.S. Provisional Patent Application Nos. 62/044,173, filed Aug. 29, 2014; 62/092,826, filed Dec. 16, 2014; 62/115,267, filed on Feb. 12, 2015; and 62/196,882, filed on Jul. 24, 2015, the disclosures of each of which are incorporated by reference herein.

TECHNICAL FIELD

Examples of the present disclosure relate to image processing methods and systems for displaying content, and more particularly, to image processing methods and systems for displaying content by outputting a series of images that form an environment for facilitating memorization.

BACKGROUND

Information relating to a wide variety of subject matter is generally available in a massive scale. Memorizing information relating to a particular subject matter is often a difficult task due to the large amount of information available. Techniques for memorizing information, such as using flash cards, are slow to assist in memorization and require a large amount of focus and effort. Computer programs can be used to improve a user's ability to memorize information relating to the subject matter.

But, existing programs may not keep a user's focus. Additionally, the existing programs may not impose a negative consequence to the user for incorrectly answering a question. Further, after using existing programs, the user often forgets what he or she recently memorized. The user is inconvenienced due to a lack of results from existing programs.

SUMMARY

According to some examples of the present disclosure, memorization systems and methods may output an image sequence on a display device forming an active learning environment or a passive learning environment for facilitating memorization by the user. Further, memorization systems and methods may output a controllable object that interacts with the learning environment in connection with the memorization. In an aspect of the present disclosure, a method may be provided. The method may include outputting, at a user device, an image sequence that forms an environment to facilitate memorization. Further, the method may include displaying a controllable object in the image sequence as continuously moving along a path, and controlling a position of the controllable object within each image of the image sequence, based on an input received from a user operating the user device. Moreover, the method may include presenting an item object in the image sequence as an obstacle in the path to block the controllable object. The item object can include a representation of a prompt that is correct or incorrect. In addition, the method can include outputting a negative image representing a negative indicator in response to movement of the controllable object selecting an incorrect action with respect to the prompt, or outputting a positive image representing a positive indicator in response to movement of the controllable object selecting a correct action with respect to the prompt. The method may also include outputting an additional environment to facilitate memorization, wherein the additional environment includes information suitable for memorization presented according to whether the positive image or the negative image is outputted.

According to another aspect of the present disclosure, a system may be provided. The system may include a display, a system controller, and a non-transitory memory. The non-transitory memory may include a controllable object engine and one or more data structures. The system controller can be used to control the display to output an image sequence that forms an environment to facilitate memorization. The controllable object engine can facilitate displaying a controllable object in the image sequence as continuously moving along a path, such that the controllable object interacts with the image sequence based on an input from a user. The one or more data structures can store prompts relating to information suitable for memorization. Each prompt can be correct or incorrect.

The system controller may also control the display to present an item object in the image sequence as an obstacle in the path to block the controllable object. The item object may include a representation of one or more prompts. The display may output a negative image representing a negative indicator in response to the controllable object selecting an incorrect action with respect to the prompt. The display may also output a positive image representing a positive indicator in response to movement of the controllable object selecting a correct action with respect to the prompt.

According to another aspect of the present disclosure, a non-transitory computer readable medium may be provided with instructions that are executable by a processor. The instructions may include code for outputting, at a display, an image sequence that forms an environment to facilitate memorization. Further, the instructions may include code for displaying a controllable object in the image sequence as continuously moving along a path, and code for controlling a position of the controllable object within each image of the image sequence, based on user input received from an input device. Moreover, the instructions may include code for presenting an item object in the image sequence as an obstacle in the path to block the controllable object. The item object may include a representation of a prompt that is correct or incorrect. In addition, the instructions may include code for outputting a negative image representing a negative indicator in response to the controllable object selecting an incorrect action with respect to the prompt. The instructions may also include code for outputting a positive image representing a positive indicator in response to movement of the controllable object selecting a correct action with respect to the prompt.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
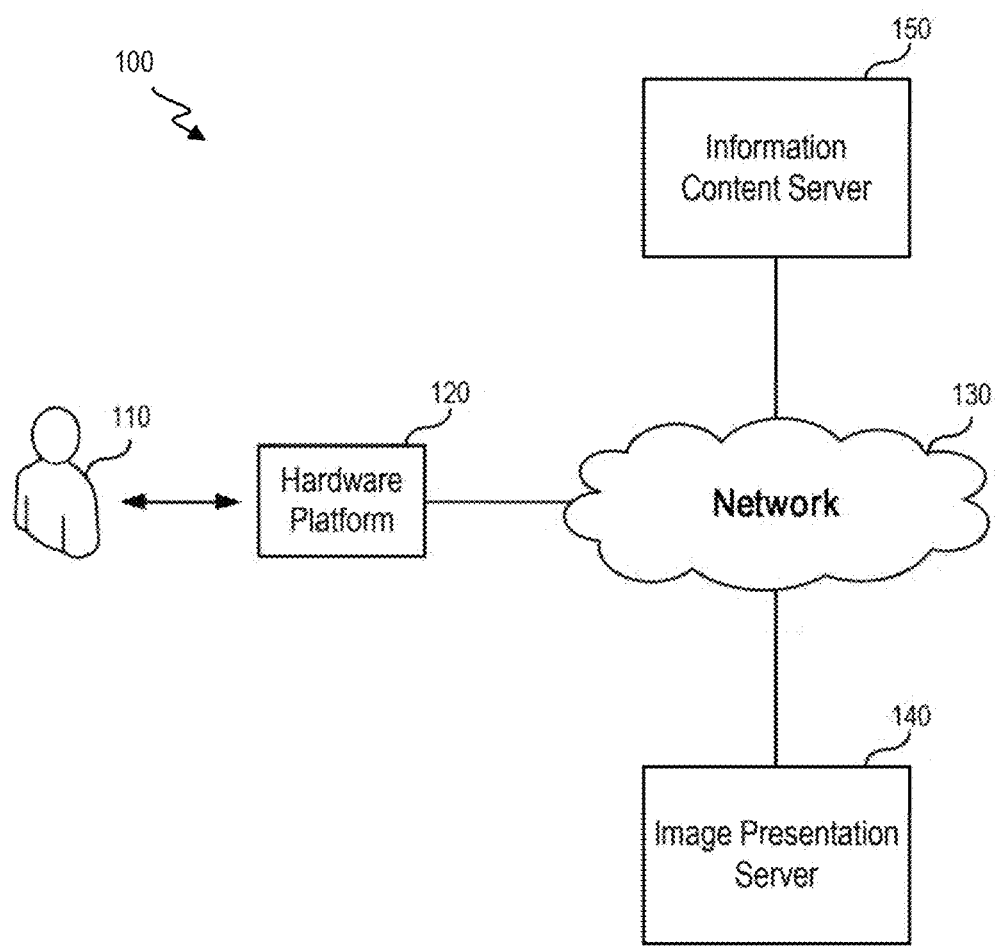
FIG. 1 is a diagram illustrating a memorization environment, according to an example of the present disclosure.

In general, certain aspects and features relate to image processing methods and systems for improving a user's ability to memorize and retain information. Image processing methods and systems can include a hardware platform configured to display a series of images that form an active learning environment for facilitating memorization. Users can be enabled to memorize large quantities of information at high speeds and improved retention.

Further, the hardware platform can display a series of images that form the active learning environment in a manner that creates artificial pressure on the user. The artificial pressure can enhance the user's focus and maintain the user's attention to the information presented in the active learning environment. For example, the hardware platform can create the artificial pressure by controlling the display to output a controllable object (e.g., an avatar) that is continuously moving (e.g., running) on a platform in a forward motion along a path. For example, the controllable object can be moving forward as a default. While the user is experiencing enhanced focus due to the artificial pressure, the user may control the controllable object to interact with the series of images. Further, the hardware platform can display obstacles in the path of the controllable object. The hardware platform can display information suitable for memorization within the obstacles. The displayed obstacles can also prompt the user to make quick decisions about the information suitable for memorization displayed within the obstacles. For example, the user can make binary decisions related to the information displayed by the hardware platform. Examples of a binary decision can include controlling the controllable object to pass through an obstacle or to avoid an obstacle. Passing through the obstacle can be represented by any indication that signals the user's decision to pass through the obstacle. Examples of representing the controllable object passing through an obstacle can include the controllable object encountering the obstacle and moving through the obstacle, encountering the obstacle and the obstacle disappearing, and collecting the obstacle from a distance (e.g., selecting an obstacle from a distance without the controllable object encountering the obstacle). Avoiding the obstacle can be represented by any indication that signals the user's decision to avoid the obstacle. Examples of representing the controllable object avoiding the obstacle can include the controllable object jumping over the obstacle, the controllable object moving around the obstacle (e.g., to the side of the obstacle), and the controllable object not collecting or selecting an obstacle from a distance. The hardware platform can receive and process the input corresponding to the user's binary decision. Based on the received input, the hardware platform can display at least one image representing a positive indicator or at least one image representing a negative indicator.

For example, the hardware platform can display a background and a road that forms a path. The hardware platform can also display a controllable object that is continuously running on the path in a forward direction. The hardware platform can display a first object on the path at a position that blocks the controllable object from moving forward along the path. The hardware platform can display information suitable for memorization within the first object. For example, if the active learning environment relates to learning a language, the hardware platform can display text of the Spanish word "fresa" within the first object.

The hardware platform can display the controllable object as approaching the first object. The hardware platform can receive an input from the user for controlling movement of the controllable object. Further, the hardware platform can display the controllable object passing through or avoiding the first object, based on the received input, without penalty. After the controllable object passes through or avoids the first object, the hardware platform can display a second object on the path at a position that can block the controllable object from moving forward along the path. The hardware platform can display additional information suitable for memorization within the second object. For example, when the active learning environment relates to learning Spanish, the hardware platform can display the text of "fresa" (the Spanish word for strawberry) in the first object and an image of a strawberry within the second object. The information included in the first object can be associated with the additional information included in the second object.

The hardware platform can display the controllable object as approaching the second object. Before encountering the second object, the user may decide whether there is a match or a mismatch relationship between the information included in the first object and the additional information included in the second object. Movement of the controllable object can be controlled according to a user input. The hardware platform can receive the input and determine whether the input corresponds to a correct action or an incorrect action. The hardware platform can display an image representation of a positive indicator when the input corresponds to a correct action. The hardware platform can also display an image representation of a negative indicator when the input corresponds to an incorrect action.

If the input corresponds to a correct action, then the current session of the memorization environment can continue. If the input corresponds to an incorrect action, then the current session of the memorization environment can be terminated. While the user is focused, due to the artificial pressure created by the active learning environment, the user may make a binary decision of whether to control the controllable object to pass through or avoid the second object. The user can learn about the information suitable for memorization in the first object and in the second object while in a focused state.

As another example, the hardware platform can display an object in the path of the controllable object. The hardware platform can display information suitable for memorization within the object. Further, the hardware platform can display the controllable object continuously moving towards the object. As the controllable object approaches the object, the user may determine whether the information displayed within the object is true or false. The user can then control movement of the controllable object based on whether the user believes the information is true or false. The hardware platform can receive the input of the controlled movement and determine whether the input corresponds to a correct action or an incorrect action. The hardware platform can display a positive image representing a positive indicator when the input corresponds to a correct action. The hardware platform can also display a negative image representing a negative indicator when the input corresponds to an incorrect action. The positive image can be an image representation of a reward for the correct action. For example, the positive image can include the text "Congratulations!" The negative image can be an image representation of a negative consequence for the incorrect action. For example, the negative image can include the text "Wrong! Try again."

If the input corresponds to a correct action, then the current session of the memorization environment can continue. If the input corresponds to an incorrect action, then the current session of the memorization environment can be terminated. While the user is in the focused state, the user can be presented with the opportunity to make a binary decision as to passing through the object or avoiding the object based on whether the information included in the object is true or false.

FIG. 1 illustrates a diagram of a learning environment 100, according to an embodiment of the present disclosure. The learning environment 100 may include a hardware platform 120, a network 130, an image presentation server 140, and an information content server 150. In some embodiments, the learning environment 100 can be used for formal education in any language and at any level from elementary school to graduate school. The learning environment 100 is not limited to languages. The learning environment can be used for learning any subject matter, such as math, physics, chemistry, law, etc. In other embodiments, learning environment 100 can be used for informal education, which can involve learning and memorizing subject matter outside the scope of formal educational courses.

In some embodiments, user 110 can participate in the learning environment 100 to improve his or her memorization of the subject matter. For example, user 110 can be an individual learning Spanish using the learning environment 100.

Hardware platform 120 may be one or more devices configured to output a series of images (e.g., an image sequence). In some embodiments, hardware platform 120 may be a non-portable electronic device, such as a desktop computer including a display. In other embodiments, hardware platform 120 may also be a portable electronic device, such as a smartphone, tablet, or wearable-technology device with a display. For example, hardware platform 120 may be a virtual-reality headset with a display. The virtual-reality headset may be worn by user 110. As another example, hardware platform 120 may be a screen on which images are projected, such that a real-world environment is augmented by the images projected onto the screen. In this example, one or more images may be projected onto a lens of a pair of glasses, such that the real-world environment viewed through the lenses of the pair of glasses is augmented by the projected images. As another example, hardware platform 120 may be a special-purpose gaming console, such as a racing arcade game. In some embodiments, obstacles including information suitable for memorization can be represented as attacking a character controlled by the user. For example, the character can be in a fixed position and the obstacles can be approaching the character. The special-purpose gaming console may be configured to facilitate memorization of a wide variety of subject matter. The special-purpose gaming console can display three-dimensional (3D) images, 3D video, two-dimensional (2D) images, or 2D video.

In addition, hardware platform 120 may be configured to output a series of images or sounds that form an environment for facilitating memorization of a particular subject matter. The series of images can be an image sequence that forms a visual environment displayed on a display device. For example, the image sequence can be a video stream that includes image frames displayed at a predetermined rate, such as 24 frames per second. In some embodiments, the image sequence can include a background of the visual environment. The background can include a representation of a road extending into the horizon, a representation of the sky, and a representation of buildings located at the side of the road. The background can also include objects that are located at various positions on the road (e.g., see FIGS. 7-13). The objects can include text or at least one image.

In some embodiments, hardware platform 120 may be configured to display an object, which is controllable by user 110 (hereinafter referred to as a controllable object). The controllable object can be included in the image sequence that forms the visual environment and can interact with the visual environment. The controllable object can be controlled based on a user input (e.g., "up," "right," "left," "down" on a keyboard). The hardware platform 120 can be configured to receive any form of user input, including direct input or indirect input. For example, the user input can include voice input, touch screen input, keyboard or mouse input, motion input, etc. Further, the hardware platform 120 can receive an input that can control the controllable object to jump, speed up, slow down, move right, move left, or any other movement.

In some embodiments, the controllable object may be an avatar of user 110 or an avatar selected by the user 110. The manner in which the avatar is displayed may be customizable by user 110. The controllable object may be continuously moving in a forward direction, as a default (e.g., without needing user input), along a path (e.g., a road, see FIGS. 7-13). A position of the controllable object within the visual environment can be maintained in approximately the same area of the display. For example, the image sequence can also be a view of the controllable object at a predetermined angle that is maintained while the controllable object moves forward. The hardware platform 120 can update the background while the controllable object moves forward. The continuously moving controllable object can enhance the focus of user 110 while the user 110 is participating in learning environment 100.

The hardware platform 120 may also be configured to display avoidable obstacles (e.g., an object) in the path the controllable object. The avoidable obstacles may be presented with information suitable for memorization (e.g., text or images). To continue a current session of the learning environment 100, user 110 can react quickly to pass through the obstacles or avoid the obstacles, depending on the information included in the obstacles. The obstacle can be an item object that represents a prompt that is correct or incorrect. For example, the item object can represent a prompt for the user 110 to make a binary decision about the information displayed in the obstacle. The prompt can be correct (e.g., text that corresponds to a correct or true statement can be displayed in the obstacle) or incorrect (e.g., text that corresponds to an incorrect or false statement can be displayed in the obstacle). Learning environment 100 can maintain the focus of user 110 because the controllable object is continuously moving in a forward direction towards obstacles presented in the path of the controllable object. If user 110 does not react quickly to perform a correct action, the current session of learning environment 100 may end (e.g., user 110 can lose). The hardware platform 120 can display at least one image representing that the avatar "died." When the hardware platform 120 displays that the avatar has "died," the user 110 may start over from a previous point in the learning environment 100 or repeat a particular level of the learning environment 100.

In some embodiments, the hardware platform 120 can display an environment that facilitates memorization in several modes. For example, in a first mode, the hardware platform 120 can display the environment as including an active learning environment and a passive learning environment. In the active learning environment, the hardware platform 120 can receive input from the user 110 related to binary decisions about information included in objects. For example, the hardware platform 120 can receive an input of the user 110 controlling the controllable object to pass through or avoid an obstacle. In the passive learning environment, the hardware platform 120 can display information suitable for memorization without receiving input related to binary decisions made by user 110. For example, the passive learning environment can include an image representation of a building on which information suitable for memorization is displayed. In the passive learning environment, the user 110 may not make binary decisions about information included in the object. Instead, the user can view the passive learning environment to memorize the information displayed. The hardware platform 120 can display the active learning environment and the passive learning environment simultaneously or sequentially.

In a second mode, the hardware platform 120 can display the active learning environment without the passive learning environment. In a third mode, the hardware platform 120 can display the passive learning environment without the active learning environment. For example, in the third mode, the user 110 may view the information displayed in the passive learning environment and memorize this information to prepare for the active memorization environment. In a fourth mode, the hardware platform 120 can operate in an audio only mode, in which the hardware platform 120 outputs audio signals that can correspond to information suitable for memorization. The audio signals can prompt users to make binary decisions regarding the information suitable for memorization. The hardware platform can operate in more than one mode at a time. Other modes can also be used.

In some embodiments, the hardware platform 120 can display the controllable object to be still without a user input. For example, the controllable object may not move in any direction without interference by the user 110. The hardware platform 120 can display different obstacles that include information suitable for memorization (e.g., in the form of text or images). The controllable object can be moved from one obstacle to another and stopped, based on the user input.

In some embodiments, the hardware platform 120 can display the environment that facilitates memorization without a controllable object. For example, the hardware platform 120 can be a virtual-reality headset (worn by a user) that can display an active or passive learning environment. The virtual-reality headset can display information suitable for memorization within obstacles that are presented in a path. The environment can be displayed and changed from a first-person perspective (e.g., from the viewpoint of the controllable object).

In some embodiments, the hardware platform 120 can display the environment that facilitates memorization without the controllable object and without processing user input. For example, the hardware platform 120 can display a passive learning environment (e.g., a movie) that displays the information suitable for memorization.

Network 130 may be one or more networks for facilitating the transmission of a variety of types of data. The network 130 may include a variety of network types, such as a local area network (LAN), wireless local area network (WLAN), intranet, extranet, etc. The network 130 may also include short-range communication networks (e.g., Bluetooth networks, Zigbee networks).

Image presentation server 140 may include one or more servers for facilitating presentation of images on a display of the hardware platform 120. In some embodiments, the image presentation server 140 may store information related to the objects and backgrounds presented on a display of the hardware platform 120 in connection with learning environment 100. For example, image presentation server 140 may store information related to the background images presented on the display of hardware platform 120 for each phase (e.g., a level) of the learning environment 100. If a level of the learning environment is updated, the updated level can be available to all users communicating with image presentation server 140.

Information content server 150 may be one or more servers for facilitating memorization of subject matter in connection with the learning environment 100. For example, information content server 150 may store information related to subject matter that is distilled into a form suitable for memorization. In some embodiments, the distilled form of information (e.g., the information suitable for memorization) may include statements of information, which may be stored in information content server 150. The statements of information may be generated by distilling crude information related to the particular subject matter (e.g., information contained in a physics textbook) into smaller independent ideas (e.g., $E=MC^2$) or into multiple independent ideas. A statement of information can have multiple dependent ideas. For example, a statement of information can be an independent idea (e.g., "A restriction on the right to vote must satisfy strict scrutiny") and a combination of an independent idea and a dependent idea (e.g., "Strict scrutiny is a form of judicial review" can be an independent idea and "in which the law must have passed to further a compelling government interest" can be a dependent idea). The independent ideas may be complete sentences that can be understood without any other sentence or idea.

In addition, once distilled from the crude information, the statements of information may be used as content in learning environment 100. In some embodiments, the statements of information may be used in the active learning environment. For example, the statements of information may be included in the obstacles presented in the path of the controllable object. When used in the active learning environment, the statements of information may be reformed into true versions and false versions. The true versions and false versions of the statements of information may be stored in information content server 150. The binary decisions made by user 110 may be based on the statements of information included in objects displayed in the active learning environment. Further, in the active learning environment, the statements of information can be independent ideas or a dependent idea related to another statement of information.

In other embodiments, the statements of information may be used in the passive learning environment. For example, after the user 110 performs a correct action or an incorrect action with respect to an object including a statement of information (e.g., passing through an object) in the active learning environment, the statement of information can be repeated by displaying the statement of information without prompting the user 110 to make a binary decision about the statement of information. The passive learning environment can include the repetition of the statement of information without prompting the user 110 to make a binary decision. In the passive learning environment, the statements of information can always be true versions of the statement of information. Further, in the passive learning environment, the statement of information can be an independent idea, which can be understood by the user without another statement of information.

Figure 2:
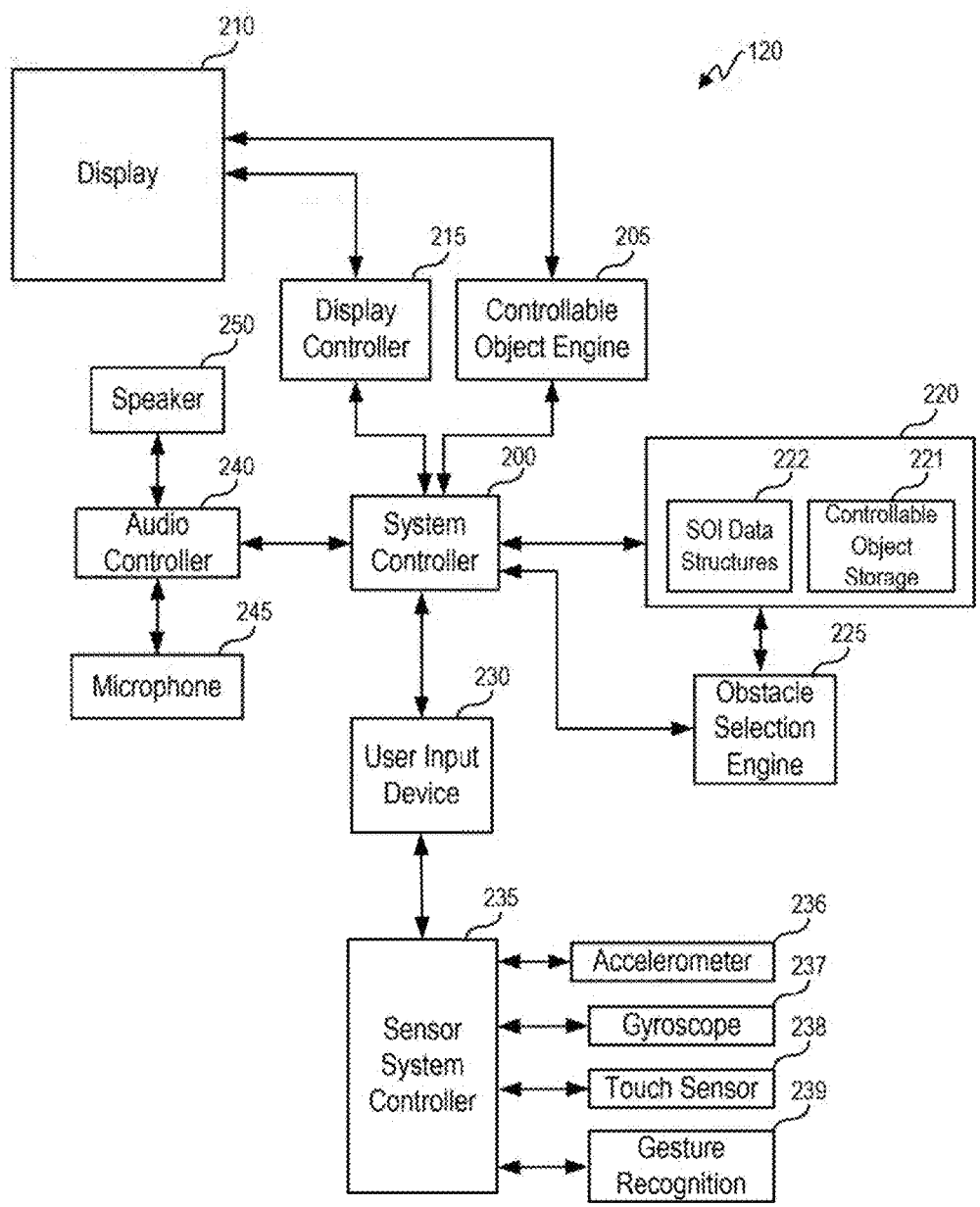
FIG. 2 is a schematic diagram illustrating a hardware platform of a memorization environment, according to an example of the present disclosure.

FIG. 2 is a schematic diagram illustrating hardware platform 120, according to an example of the present disclosure. Hardware platform 120 may include at least a system controller 200, a display 210, data structures 220, a user input device 230, and an audio controller 240. System controller 200 may include one or more processors configured to control or manage communication of data using bus structures between display 210, data structures 220, user input device 230, and audio controller 240.

System controller 200 may communicate with display controller 215 and controllable object engine 205. Controllable object engine 205 may be stored in memory and executable by a processor to display images related to the controllable object on display 210. In some embodiments, controllable object engine 205 may control various parameters of the controllable object (e.g., a position, angle, speed, acceleration, etc.). For example, controllable object engine 205 may output (to display 210) an image sequence representing the controllable object avoiding an obstacle (e.g., jumping over the obstacle).

Display controller 215 may include one or more processors configured to process images that are presented on display 210. In some embodiments, display controller 215 may process a series of images that forms the environment for facilitating memorization. For example, display controller 215 may process a series of images that form a background area of the displayed image. Further, display controller 215 may also process a series of images that form a floor (e.g., a path) upon which the controllable object continuously moves in the forward direction. Display controller 215 may also process a series of images that form the obstacles presented in the path of the controllable object. Processing images by display controller 215 may include retrieving images, compressing images, decompressing images, or converting images into a format suitable to be presented on display 210.

System controller 200 may also communicate with data structures 220. Data structures 220 may store data related to images and information (e.g., text or images) presented on display 210. In some embodiments, data structures 220 may include controllable object storage data structures 221 and statement of information data structures 222. Controllable object storage data structures 221 may store images related to the controllable object presented on display 210. Statement of information data structures 222 may store data related to the statements of information used in learning environment 100. For example, statement of information data structures 222 may store data related to information that is included in obstacles presented on display 210. In addition, obstacle selection engine 225 may retrieve one or more images related to obstacles that are presented in the path of the controllable object.

In addition, system controller 200 may communicate with user input device 230. User input device 230 may be any device that facilitates receiving information or instructions from user 110. In some embodiments, user input device 230 may include a voice recognition system (e.g., a microphone and voice recognition software) that receives audio input from user 110 and converts the audio input to electronically represented information. In other embodiments, user input device 230 may include a handwriting recognition system for recognizing patterns written by user 110 on a touch-sensitive screen. For example, the handwriting recognition system may include a stylus pen and a touch screen or the touch screen can receive stroke inputs from the user's fingers. User 110 may handwrite an answer that is received by the handwriting recognition system and converted into digital data. As another example, user input device 230 may include a keyboard and mouse for receiving a typing input from user 110. In another example, user input device 230 may include a gesture recognition system that recognizes physical movement of user 110.

User input device 230 can communicate with sensor system controller 235. For example, sensor system controller 235 may control or manage data received from accelerometer 236, gyroscope 237, touch sensor 238, and gesture recognition system 239. The sensors described above are examples, and other types of sensors can be used.

System controller 200 may also communicate with audio controller 240. Audio controller 240 may output audio signals via speaker 250 independently or in connection with the images displayed on display 210. For example, if display controller 215 outputs an image of a strawberry on display 210, audio controller 240 can transmit an audio signal of the Spanish word for strawberry (e.g., "fresa") to speaker 250 to be outputted. Audio controller 240 may also control data received from microphone 245, which may receive and record sounds from user 110.

Hardware platform 120 may be configured as shown in FIG. 2 to output a series of images that form an environment for facilitating memorization. While FIG. 2 illustrates several components, hardware platform 120 is not limited to the components shown in FIG. 2 and other examples of the hardware platform 120 may include more or fewer components than shown in FIG. 2.

Figure 3:
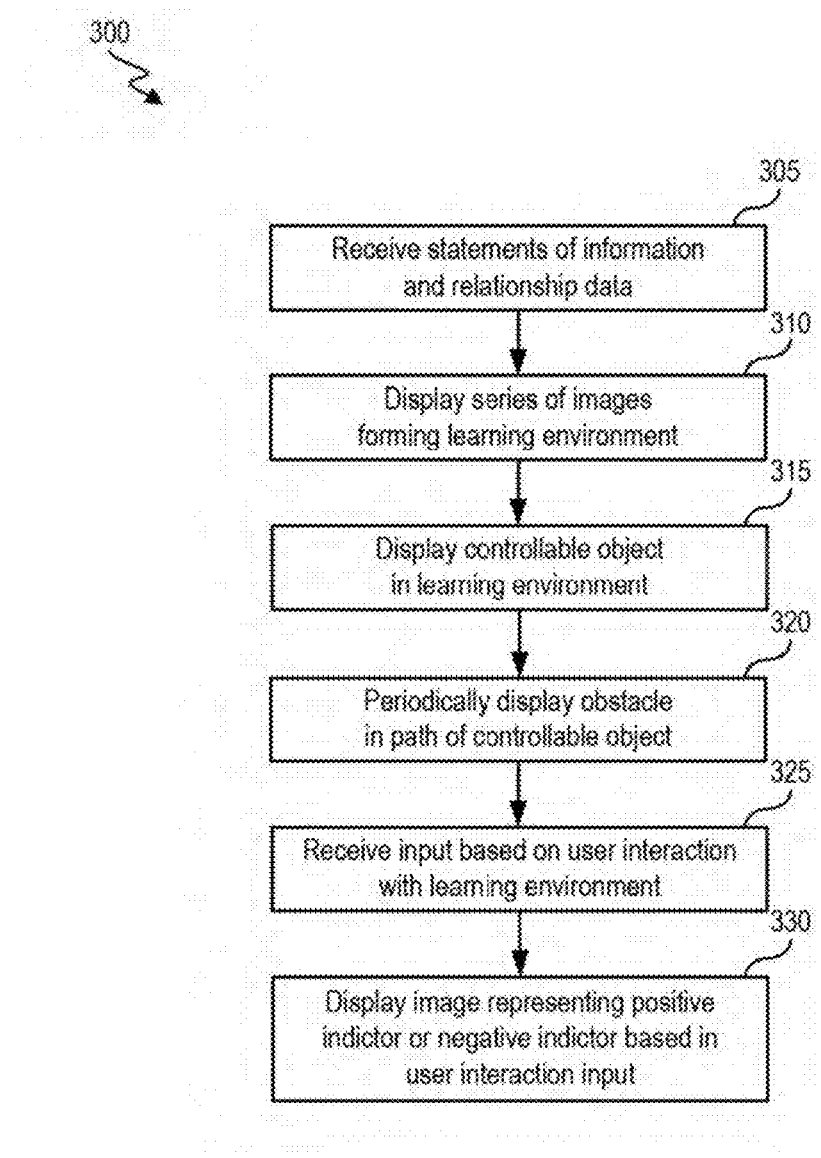
FIG. 3 is a flowchart illustrating a process for improving memorization of information.

FIG. 3 is a flowchart illustrating an example of process 300 for improving memorization of information. Process 300 may be performed, in full or in part, by hardware platform 120 to facilitate memorization of particular subject matter.

At block 305, hardware platform 120 may receive statements of information and relationship data from information content server 150. Receiving data at hardware platform 120 may also include storing data at hardware platform 120. For example, hardware platform 120 may store the received statements of information and relationship data in data structures 220.

As discussed above, statements of information are independent ideas inserted into learning environment 100 in connection with the memorization of subject matter. For example, a single statement of information may include the phrase "Traditionally, if the buyer breaches a contract for the sale of real property, the seller is entitled to expectation damages."

In addition, hardware platform 120 may receive the relationship data, separately or together with the statement of information. Relationship data may relate to information indicating the user inputs that correspond to a correct action or the user inputs that correspond to an incorrect action. For example, if an obstacle presented in the path of the controllable object includes text of the above statement of information (e.g., "Traditionally, if a buyer breaches a contract for the sale of real property, the seller is entitled to expectation damages"), a correct response to this statement of information may correspond to a user passing through the obstacle. An incorrect response to this statement of information may correspond to a user avoiding the obstacle. In this example, the relationship data may include information indicating that a user input of passing through the obstacle corresponds to a correct response.

As another example, the relationship data can also include data against which the input can be compared to determine whether the input corresponds to the correct action or the incorrect action. The input may be compared against data associated with the correct action. In this example, the data associated with the correct action can be an "up" arrow on a keyboard. If the input corresponds to an "up" arrow being pressed, then the input would match the data associated with the correct action. Both the input and the data associated with the correct action would be the "up" arrow on the keyboard. The hardware platform 120 can then output the positive image because the input corresponds to the correct action.

At block 310, hardware platform 120 may display a series of images that form an environment for facilitating memorization of subject matter. For example, hardware platform 120 may display a floor on a lower portion of display 210 (e.g., see the path 700 illustrated in FIG. 7). The displayed floor may include a path to be traversed by the controllable object. As another example, hardware platform 120 may display building structures along the side of the path. The hardware platform 120 may also display obstacles presented in the path at various times. The obstacles may include information represented by text or one or more images. The information included in the obstacles may correspond to the statements of information received at block 305.

At block 315, hardware platform 120 may display the controllable object in the environment for facilitating memorization. In some embodiments, the controllable object may be an avatar of user 110 of selected by user 110. For example, the avatar of user 110 may appear similar to a human. The avatar's appearance can be entirely customizable by user 110. The avatar of user 110 may be any visual representation of user 110.

In some embodiments, the controllable object is displayed as continuously moving in a forward direction. For example, if the controllable object is an avatar with a human-like shape, the avatar may be displayed as if the human-like shape is continuously running in a forward direction. The avatar may be continuously (e.g., endlessly) running as a default. For example, when user 110 is not inputting control instructions for the avatar, the avatar may still be continuously running. The speed at which the avatar is running may be customizable by user 110 or pre-set by the system.

At block 320, hardware platform 120 may be configured to periodically display obstacles in the path of the controllable object. The obstacles may be any shape or form. Further, the shape and form of the obstacles may be entirely customizable by user 110. In some embodiments, the obstacles may include text or images related to a particular statement of information. Using the above example of the statement of information, an obstacle may include the text "Traditionally, if a buyer breaches a contract for the sale of real property, the seller is entitled to expectation damages." As another example, a displayed obstacle may include an image (e.g., an image of a strawberry). The obstacle may be empty, which can indicate that user 110 is to speak one or more words into a microphone (e.g., microphone 245). In other examples, the obstacle may include a prompt indicating that user 110 is to write one or more letters (or words) on a touch screen (e.g., touch sensor 238).

At block 325, hardware platform 120 may receive an input from user 110. In some embodiments, hardware platform 120 may receive data from user input device 230 based on user's 110 interaction with learning environment 100. For example, hardware platform 120 may receive an input corresponding to an arrow key pressed on a keyboard. As another example, the input may be a sound recognized by a voice recognition system. An obstacle may prompt a user to pronounce the word strawberry in the Spanish language (e.g., "fresa"). Hardware platform 120 may receive an audio signal via microphone 245 based on user 110 speaking the word "fresa." In other embodiments, hardware platform 120 may receive an input from of a gesture performed by user 110 to be recognized by a gesture recognition system.

In addition, the input received at hardware platform 120 may represent a binary decision made by user 110. For example, the input may correspond to a selection of a correct action or incorrect action. In further detail, display 210 may display the controllable object continuously running along a path in a forward direction. An obstacle may be presented in the path of the controllable object. The obstacle may include an image of a cherry and the word "fresa" adjacent to the image. As the controllable object approaches the obstacle, hardware platform 120 may receive a first input corresponding to a correct action or a second input corresponding to an incorrect action. The first input corresponding to a correct action may include user 110 pressing the "up" arrow key on a keyboard. The "up" arrow may result in the controllable object jumping to avoid the obstacle. In this case, user 110 may realize that the Spanish word "fresa" translates to a strawberry, and not a cherry.

The second input that corresponds to an incorrect action may include user 110 controlling the controllable object to pass through the obstacle including the image of the cherry and the text of "fresa". In this case, user 110 may not realize that the Spanish word "fresa" means strawberry, and not cherry.

At block 330, hardware platform 120 may display one or more images representing a positive indicator when hardware platform 120 receives the first input corresponding to the correct action. Alternatively, at block 330, hardware platform 120 may display one or more images representing a negative indicator when hardware platform 120 receives the second input corresponding to the incorrect action. Further, when hardware platform 120 receives the first input corresponding to the correct action, then the controllable object may continue moving in the forward direction. However, when hardware platform 120 receives the second input corresponding to the incorrect action, then a current session of the environment may be terminated. For example, hardware platform 120 can display an image representation of the avatar dying. In this example, the user 110 may repeat a level of the learning environment 100.

Figure 4:
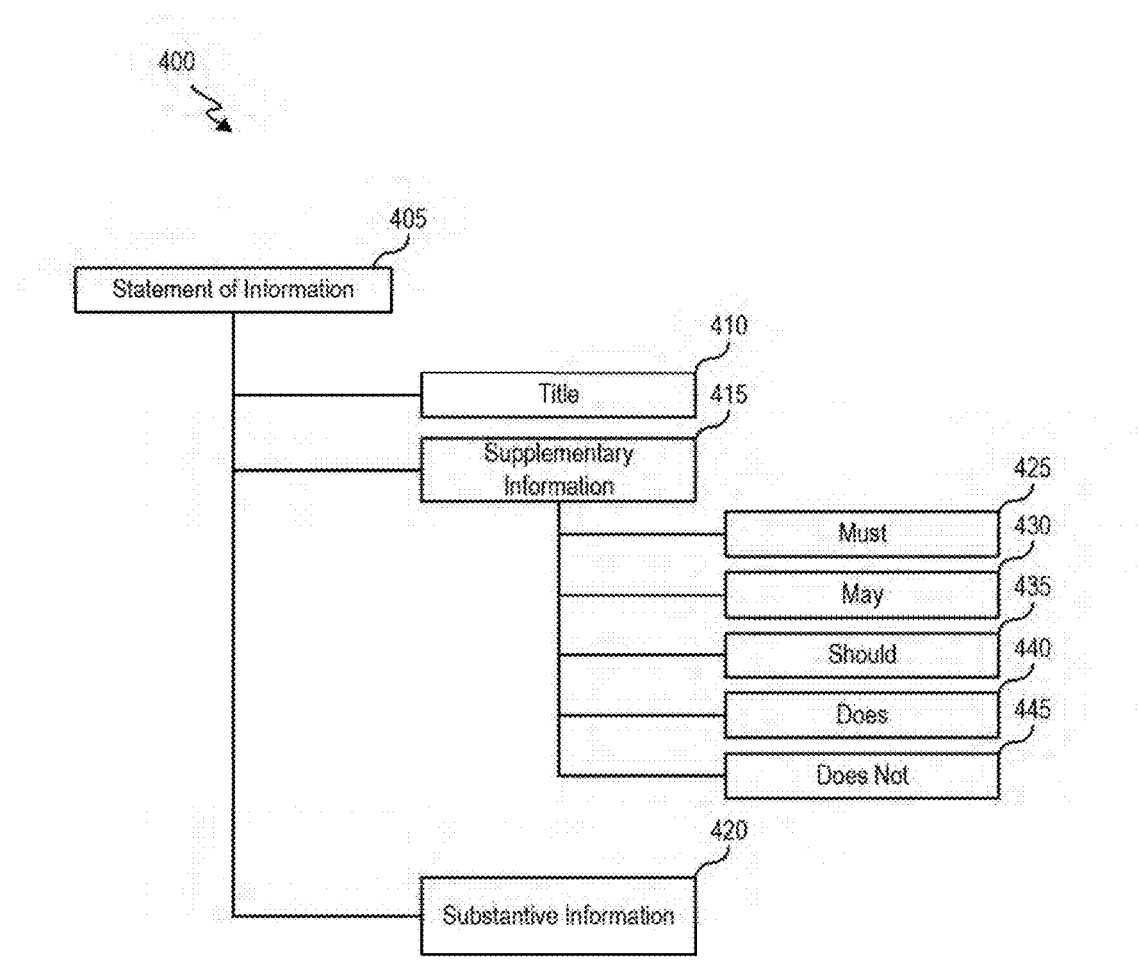
FIG. 4 is a block diagram illustrating data structures including data of various elements of the memorization system, according to an example of the present disclosure.

FIG. 4 is a block diagram illustrating data structures 400 including data of various elements of the memorization system, according to an example of the present disclosure. Data structures 400 may indicate an organizational structure for storing statements of information and the components therein. In some embodiments, data structures 400 may be stored in data structures 222 of hardware platform 120. In other embodiments, data structures 400 may be stored in information content server 150.

For example, once crude information is distilled into statements of information, the statements of information may be stored in data structures 400; namely, the statement of information element 405. Further, the statement of information element 405 may include additional elements including the title element 410, the supplementary information element 415, and the substantive information element 420. While the statement of information may include any information related to any subject matter, as a non-limiting example, the description of FIG. 4 is set forth herein using the phrase "The will must be in writing" as the statement of information.

The title element 410 may store information related to the title of the independent idea in the statement of information. For example, the title element 410 may store "the will" or "will" as the title of the statement of information stored in the statement of information element 405.

The supplementary information element 415 may store supplementary information related to the title. In some embodiments, the supplementary information element 415 may store information needed to complete the statement of information. For example, the supplementary information element 415 may store the phrase "must be" in the "must be" data structure element 425. Supplementary information element 415 may include additional data structure elements including the "may" element 430, the "should" element 435, the "does" element 440, and the "does not" element 445. The list of additional data structure elements 425-445 is exemplary, and other data structure elements can be used. Further, information stored in the data structure elements 425-445 may be selectively retrieved to create variations of the statement of information. For example, the statement of information of "the will must be in writing" (e.g., a true statement of information) may be varied to "the will does not have to be in writing" (e.g., a false statement of information) using the data structure elements 425-445.

Substantive information element 420 may include information that is to be memorized. For example, the substantive information element 420 may store the words "in writing." In some embodiments, the information included in the substantive information element 420 can be inserted into objects of the active learning environment.

Data structures 400 may be an organizational structure for storing various information in connection with learning environment 100.

Figure 5:
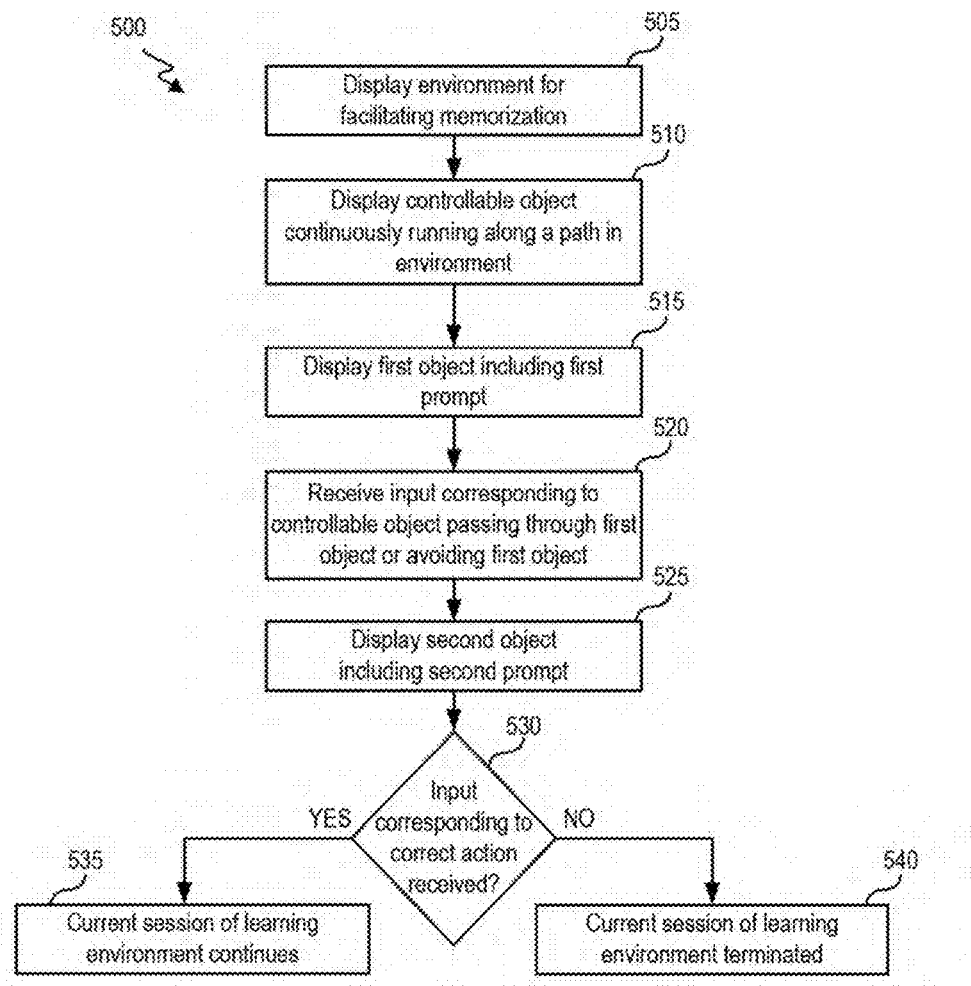
FIG. 5 is a flowchart illustrating a process for improving memorization using a controllable object displayed in the memorization system, according to an example of the present disclosure.

FIG. 5 is a flowchart illustrating an example of process 500 for improving memorization using a controllable object displayed in the memorization system, according to an example of the present disclosure. Process 500 may be performed, in full or in part, by hardware platform 120 in order to facilitate memorization of particular subject matter.

At block 505, hardware platform 120 may display the environment for facilitating memorization. In some embodiments, the environment may include a floor (upon which the controllable object continuously runs). The floor may include a path (e.g., a road) to guide the controllable object in a forward direction. In addition, the environment may also include structures (e.g., buildings) displayed on the side of the path.

At block 510, hardware platform 120 may display a controllable object continuously moving in a forward direction along the path in the environment. For example, the controllable object may be an avatar displayed in a human-like shape, and may be endlessly running on the path. The avatar may be running as a default (e.g., when there is no user input). Further, a position of the controllable object displayed on display 210 may be controlled based on a user input.

At block 515, hardware platform 120 displays a first object in the path of the controllable object. The first object may include a first prompt that presents information in the form of images or text. For example, the first prompt may be a picture of a strawberry. As another example, the first prompt may include text of the word "fresa" in the Spanish language. The first object may provide context for an object to follow. User 110 does not have to make a binary decision with respect to the first object.

At block 520, the controllable object may pass through or avoid the first object without penalty. User 110 does not have to make a binary decision with respect to the first object because the first object may provide context for a second object to follow. For example, the current session of the environment continues regardless of whether the controllable object passes through the first object or avoids the first object.

At block 525, a second object is displayed in the path of the controllable object. The second object may include a second prompt, which corresponds to the first prompt, such that the first prompt and the second prompt match, or the first prompt and the second prompt do not match. For example, if the first prompt includes a picture of a strawberry, the second prompt may include text of the word "fresa" (which is the translation of strawberry in Spanish). In this example, the first prompt and the second prompt have a match relationship. As another example, if the first prompt includes a picture of a strawberry, the second prompt may include text of the word "platano" (which is the translation of banana in Spanish). In this example, the first prompt and the second prompt have a mismatch relationship. Unlike the first prompt, however, user 110 may make a binary decision (e.g., pass through or avoid the second object) with respect to the second object as the controllable object approaches the second object. User's 110 binary decision with respect to the second object may determine whether the current session continues or terminates.

At block 530, hardware platform 120 receives input from the user and makes a decision about whether the input corresponds to a correct action. The hardware platform 120 can compare the received input to the relationship data stored in the data structures 220 to determine whether the input corresponds to a correct action or an incorrect action. Relationship data can include information indicating the user inputs that correspond to a correct response or the user inputs that correspond to an incorrect response.

In some embodiments, an input corresponding to a correct action may be an input of controlling the controllable object to pass through the second object when a match relationship exists between the first object and the second object. An input corresponding to a correct action may also be an input of controlling the controllable object to avoid the second object when a mismatch relationship exists between the first object and the second object.

In addition, an input corresponding to an incorrect action may be an input of controlling the controllable object to avoid the second object when a match relationship exists between the first object and the second object. Further, an input corresponding to an incorrect action may also be an input of controlling the controllable object to pass through the second object when a mismatch relationship exists between the first object and the second object.

In other embodiments, an input corresponding to a correct action may be a voice input. For example, if the first object includes a picture of a strawberry and the second object prompts user 110 to speak the Spanish word for strawberry, an input corresponding to a correct action may be user 110 speaking the word "fresa" into a microphone (e.g., microphone 245). Conversely, an input corresponding to an incorrect action may be user 110 speaking any word other than "fresa" (e.g., user 110 speaking the word "platano"). The hardware platform 120 can detect what word was inputted by the user 110 using a voice recognition system.

In further embodiments, an input corresponding to a correct action may be an input of handwritten text. For example, if the first object includes a picture of a strawberry and the second object prompts user 110 to handwrite the Spanish word for strawberry, an input corresponding to a correct action may be user 110 handwriting the word "fresa" on a touch screen (e.g., touch sensor 238). Conversely, an input corresponding to an incorrect action may be user 110 handwriting any word other than "fresa" (e.g., user 110 handwriting the word "platano"). The hardware platform 120 can detect what word was written by the user 110 using a stroke recognition system.

If hardware platform 120 receives an input corresponding to a correct action, then process 500 proceeds to block 535 where the current session of the environment continues. Further, upon receiving the input corresponding to the correct action, hardware platform 120 may output a sound. For example, the outputted sound may correspond to a repetition of the statement of information related to the first and second objects. In the above example, when an input corresponding to a correct action is received at hardware platform 120, hardware platform 120 may output sound of the word "fresa" together with a picture or multiple pictures. The outputted voice may have a predetermined tone, such as an enthusiastic tone, a neutral tone, a happy tone, a friendly tone, etc.

If hardware platform 120 receives an input corresponding to an incorrect action, then process 500 may proceed from block 530 to block 540. At block 540, the current session of the environment may be terminated. In some embodiments, instead of being terminated, the current session of the environment may indicate that user 110 has a predetermined number of attempts remaining to complete the session or the user may start from a previous position (e.g., as a disadvantage). In other embodiments, the current session of the environment may continue, however, the correct response may be repeated for user 110 to memorize the statement of information.

Instead of displaying a first object followed by a second object, the environment can display one object that includes two items of information. In this case, an input corresponding to a correct action depends on whether the two items of information in the object have a match relationship or a mismatch relationship.

Figure 6:
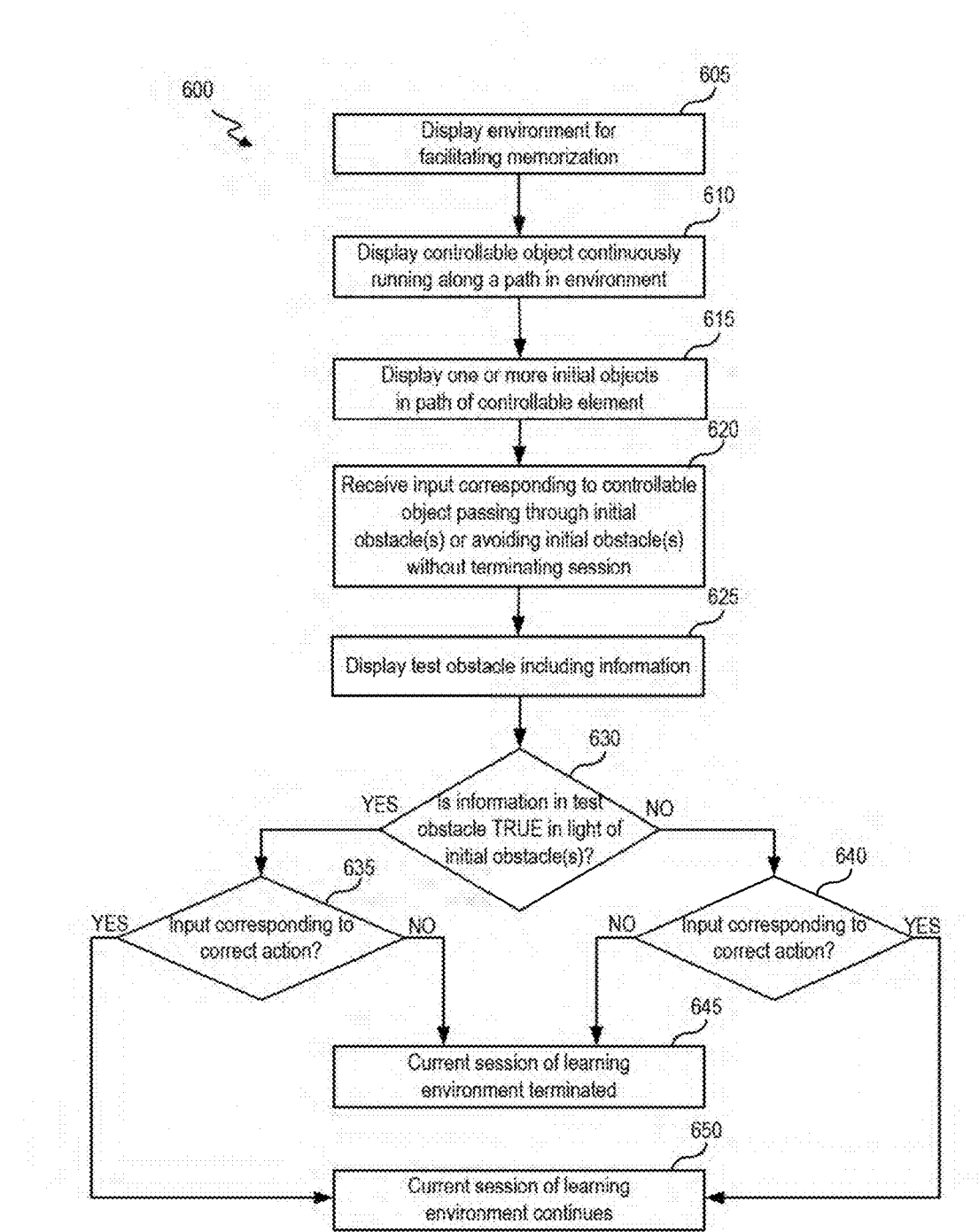
FIG. 6 is a flowchart illustrating another process for improving memorization using the controllable element displayed in the memorization system, according to an example of the present disclosure.

FIG. 6 is a flowchart illustrating an example of a process 600 for improving memorization using the controllable element displayed in the memorization system, according to an example of the present disclosure. Process 600 may be performed, in full or in part, by hardware platform 120 to facilitate memorization of particular subject matter.

At block 605, hardware platform 120 may display the environment for facilitating memorization. In some embodiments, the environment may include a floor (upon which the controllable object continuously runs). The floor may include a path (e.g., a road) to guide the controllable object in a forward direction. In addition, the environment may also include structures (e.g., buildings) displayed on the side of the path.

At block 610, hardware platform 120 may display a controllable object continuously moving in a forward direction along the path in the environment. For example, the controllable object may be an avatar displayed in a human-like shape that is endlessly running on the path. The avatar may be running as a default (e.g., when there is no user input). Further, a position of the controllable object displayed on display 210 may be controlled based on a user input.

At block 615, hardware platform 120 may display one or more initial objects in the path of the controllable object. The one or more initial objects may include (e.g., contain) information that provides context for following objects. For example, hardware platform 120 may display a first initial object that includes the phrase "The right to vote," and subsequently, hardware platform 120 may display a second initial object that includes the phrase "is a." User 110 does not have to make a binary decision with respect to the first and second initial objects because these objects provide context for one or more objects to follow.

At block 620, hardware platform 120 receives input corresponding to the controllable object passing through or avoiding the one or more initial objects without penalty. User 110 does not have to make a binary decision with respect to the one or more initial objects because these objects provide context for a test object to follow. For example, the current session of the environment continues regardless of whether the controllable object passes through the first object or avoids the first object. Further, user 110 may guide the controllable object to maintain a current path.

At block 625, hardware platform 120 displays a test obstacle in the path of the controllable object. In some embodiments, user 110 can make a binary decision with respect to the information contained in the test obstacle (e.g., a statement of information") to continue with the training session. Continuing with the example above, if the first initial object includes the phrase "The right to vote" and the second initial object includes the phrase "is a," the test obstacle may include the phrase "fundamental right." The information contained in the test obstacle is associated with the information contained in the first and second initial objects. In other words, the first and second initial objects provide context for the information contained in the test obstacle.

At block 630, the hardware platform 120 makes a decision about whether the information contained in the test obstacle is true in light of the context provided in the one or more initial objects. The hardware platform 120 can use the relationship data obtained from the information content server 150 to make the decision at block 630. The relationship data can also be stored in data structures 220 of hardware platform 120. In some embodiments, the hardware platform 120 can determine whether or not the information contained in the test obstacle is true at the same time as or before displaying the test obstacle.

In the example above, if the test obstacle includes the phrase "fundamental right," then the relationship data may indicate that the test obstacle is true in light of the initial objects. As another example, if the first initial object contained the phrase "The right to vote" and the second initial object contained the phrase "is not a," then the relationship data may indicate that the test obstacle (e.g., containing the phrase "fundamental right") is not true in light of the initial objects. In this example, the test obstacle is not true in light of the initial objects because the right to vote is a fundamental right. The relationship data may be used to determine whether an input corresponds to a correct action or an incorrect action.

When the information contained in the test obstacle is true in light of the information contained in the initial objects ("YES" at block 630), then process 600 may proceed to block 635. At block 635, the hardware platform 120 can make a decision about whether the input received from user 110 corresponds to a correct action. In some embodiments, the hardware platform 120 can compare the received input with the relationship data to determine whether the received input corresponds to a correct action. For example, when the information contained in the test obstacle is determined as being true in light of the information contained in the initial objects, hardware platform 120 may determine that an input of controlling the controllable object to pass through the test obstacle corresponds to a correct action ("YES" at block 635). As another example, hardware platform 120 may determine that an input of controlling the controllable object to avoid the test obstacle corresponds to an incorrect action ("NO" at block 635).

If hardware platform 120 determines that the input received from user 110 corresponds to an incorrect action, then process 600 proceeds to block 645 where the current session of the learning environment is terminated. In some embodiments, instead of being terminated, the current session of the environment may indicate that user 110 has a predetermined number of attempts remaining to complete the session. In other embodiments, the current session of the environment may continue, however, the correct response may be repeated for user 110 to memorize the statement of information.

In addition, upon receiving the input corresponding to the incorrect action, hardware platform 120 may output a sound. For example, the outputted sound may correspond to a repetition of the statement of information related to the initial objects and the test obstacle. When an input corresponding to an incorrect action is received at hardware platform 120, hardware platform 120 may output sound of the word "fresa." The outputted voice may have a predetermined tone, such as a negative tone, a neutral tone, an unhappy tone, an unfriendly tone, etc.

If hardware platform 120 determines that the input received from user 110 corresponds to a correct action, then process 600 proceeds from block 635 to block 650 where the current session of the learning environment continues. Upon receiving the input corresponding to the correct action, hardware platform 120 may output a sound. For example, the outputted sound may correspond to a repetition of the statement of information related to the first and second objects. In the above example, when an input corresponding to a correct action is received at hardware platform 120, hardware platform 120 may output sound of the word "fresa." The outputted voice may have a predetermined tone, such as an enthusiastic tone, a neutral tone, a happy tone, a friendly tone, etc.

Referring back to block 630, if the information contained in the test obstacle is not true (e.g., false) in light of the information contained in the initial objects, then process 600 proceeds from block 630 to block 640. At block 640, hardware platform 120 determines whether an input corresponding to a correct action is received at a user input device (e.g., user input device 230). In some embodiments, the hardware platform 120 can compare the received input with the relationship data to determine whether the received input corresponds to a correct action. For example, when the information contained in the test obstacle is determined as being false in light of the information contained in the initial objects, hardware platform 120 may determine that an input of controlling the controllable object to pass through the test obstacle corresponds to an incorrect action ("NO" at block 640). As another example, hardware platform 120 may determine that an input of controlling the controllable object to avoid the test obstacle corresponds to a correct action ("YES" at block 640).

If hardware platform 120 determines that the input received from user 110 corresponds to an incorrect action ("NO" at block 640), then process 600 proceeds to block 645 where the current session of the learning environment is terminated. In some embodiments, instead of being terminated, the current session of the environment may indicate that user 110 has a predetermined number of attempts remaining to complete the session. In other embodiments, the current session of the environment may continue, however, the hardware platform 120 can output text corresponding a correct version of the information included in the test obstacle for user 110 to memorize the information.

In some embodiments, the hardware platform 120 may output a sound after receiving the input corresponding to the incorrect action. The speaker 250 can output a sound corresponding to a repetition of the information included in the initial objects and the test obstacle. For example, when an input corresponding to an incorrect action is received at hardware platform 120, hardware platform 120 can output the sound of the word "fresa." The outputted voice may have a predetermined tone, such as a negative tone, a neutral tone, an unhappy tone, an unfriendly tone, etc.

If the hardware platform 120 determines that the input received from user 110 corresponds to a correct action ("YES" at block 640), then process 600 proceeds from block 640 to block 650 where the current session of the learning environment continues. Upon receiving the input corresponding to the correct action, hardware platform 120 may output a sound. For example, the speaker 250 can output a sound corresponding to a repetition of the information included in the first and second objects. The information included in the first and second objects can include a statement of information, which is distilled from crude information. In the above example, when an input corresponding to a correct action is received at hardware platform 120, hardware platform 120 may output sound of the word "fresa." The outputted voice may have a predetermined tone, such as an enthusiastic tone, a neutral tone, a happy tone, a friendly tone, etc. When the hardware platform 120 can also display the information included in the first and second objects for user 110 to memorize.

Instead of displaying one or more initial objects before displaying the test obstacle, the hardware platform 120 can display one object that includes a statement of information comprised of text or images. In this case, an input corresponding to a correct action depends on whether the text or images contained in the displayed object is true or false. For example, the hardware platform 120 can display an object including the phrase "The right to vote is a fundamental right." In this example, an input corresponds to a correct action when the input controls the controllable object to pass through the displayed object.

Figure 7:
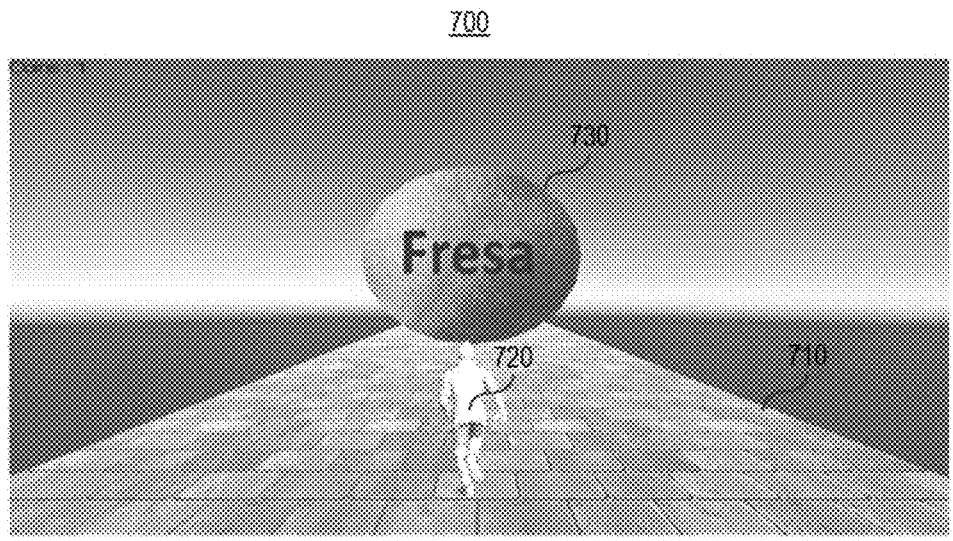
FIG. 7 is an example of a screen shot, displayed by a memorization system, illustrating a first object as text, according to an example of the present disclosure.
Figure 8:
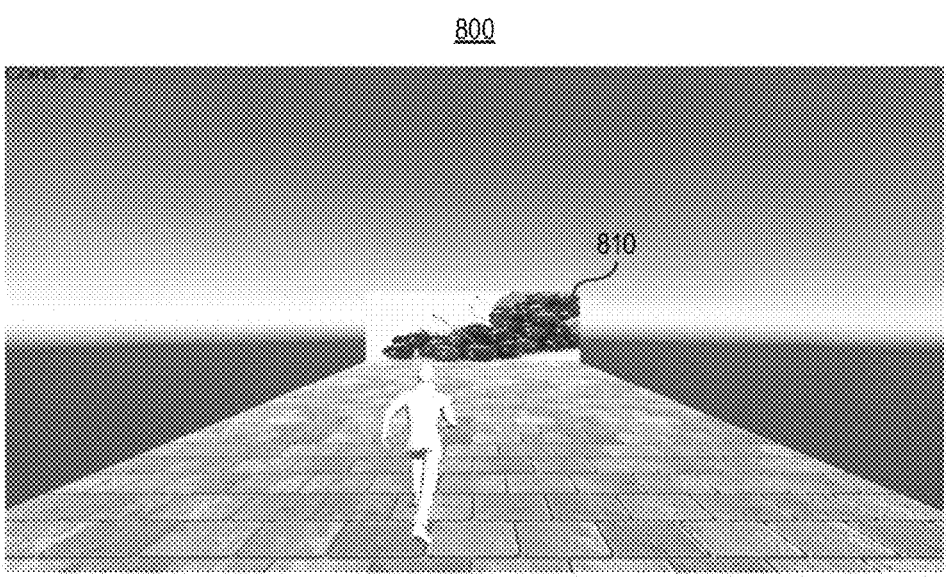
FIG. 8 is another example of a screen shot, displayed by a memorization system, illustrating a second object as an image, according to an example of the present disclosure.

FIGS. 7-8 illustrate examples of screen shots displayed by a memorization system, according to an example of the present disclosure. In FIG. 7, hardware platform 120 displays screenshot 700, including a path 710, controllable object 720, and first object 730. FIG. 8 illustrates screenshot 800 including second object 810 displayed on a display (e.g., display 210). The second object 810 is displayed after the first object 730. FIG. 7 illustrates an example of the first object 730 including text (e.g., "fresa"). After receiving an input corresponding to the controllable object 720 passing through the first object 730, the hardware platform 120 can display the controllable object as approaching the second object 810. The second object 810 can include an image of cherries. FIGS. 7-8 illustrate an example of a mismatch relationship between the information contained in the first object 730 and the information contained in the second object 810. An input corresponding to a correct action may be an input to avoid the second object 810. In some embodiments, first object 730 may contain an image (e.g., an image of a strawberry) and second object 810 may contain text (e.g., text of the word "fresa"). In other embodiments, the hardware platform 120 can display both first object 730 and the second object 810 as including text or images.

Figure 9:
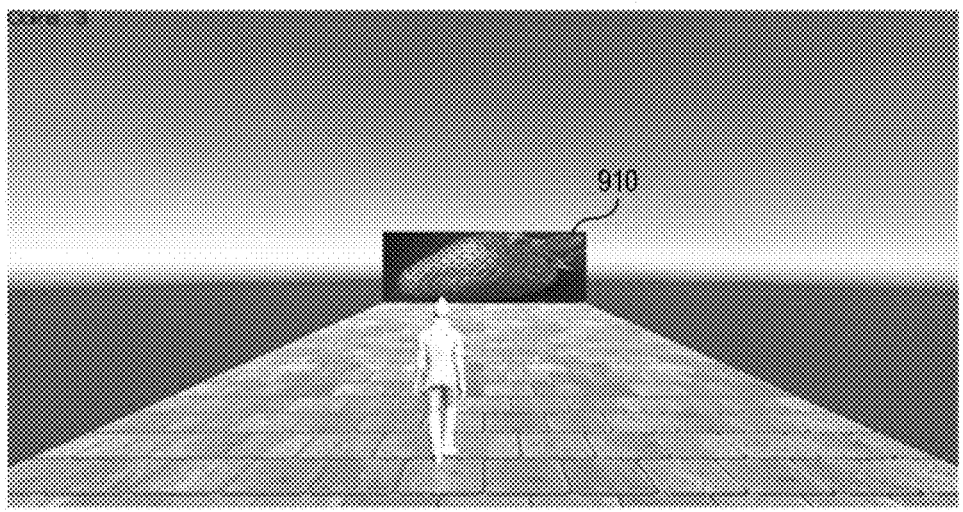
FIG. 9 is an example of a screen shot, displayed by a memorization system, illustrating a first object as an image, according to an example of the present disclosure.
Figure 10:
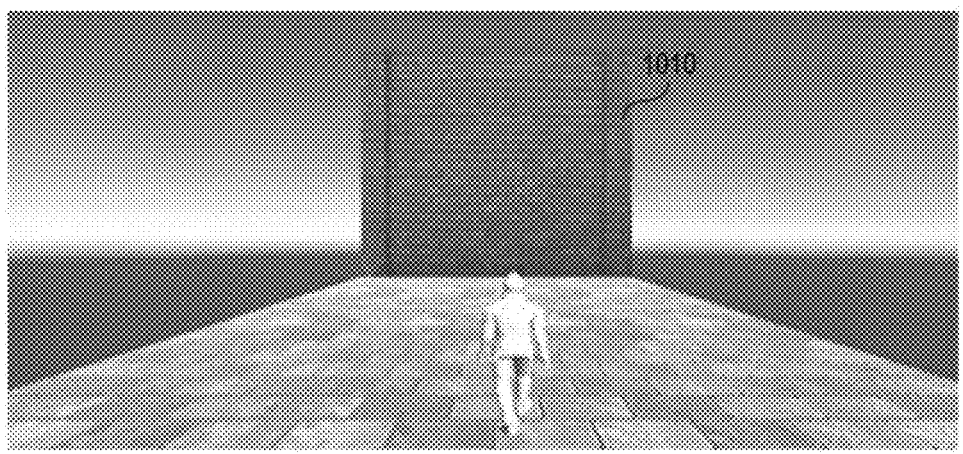
FIG. 10 is an example of a screen shot, displayed by a memorization system, illustrating a second object as a prompt for user input, according to an example of the present disclosure.

FIGS. 9-10 illustrate examples of screen shots displayed by a memorization system, according to an example of the present disclosure. FIG. 9 illustrates screenshot 900 including a first obstacle 910 displayed in the path of the controllable object. For example, the first obstacle 910 (or collectable object) can contain an image of a strawberry. The first obstacle or collectable object 910 can have no penalty associated with it when the controllable object passes through the first obstacle or avoids the first obstacle. In some embodiments, after receiving an input corresponding to the controllable object passing through the first obstacle 910, the hardware platform 120 can display a second obstacle 1010 (shown in screenshot 1000) that prompts user 110 to speak a word (e.g., the word for strawberry in Spanish). An input corresponding to a correct action may include hardware platform 120 receiving an audio signal from user 110 of the word "fresa." In other embodiments, the hardware platform 120 can display the second obstacle 1010 prompting user 110 to handwrite or type a word (e.g., "fresa") using a touch-sensitive device (e.g., touch sensor 238).

The obstacle may contain text of the word "strawberry" instead of including a picture of a strawberry. User 110 may also be prompted to speak or handwrite or type a word without the second obstacle 1010 being displayed. User 110 may be prompted to speak or handwrite a word using other techniques, such as an audio output.

Figure 11:
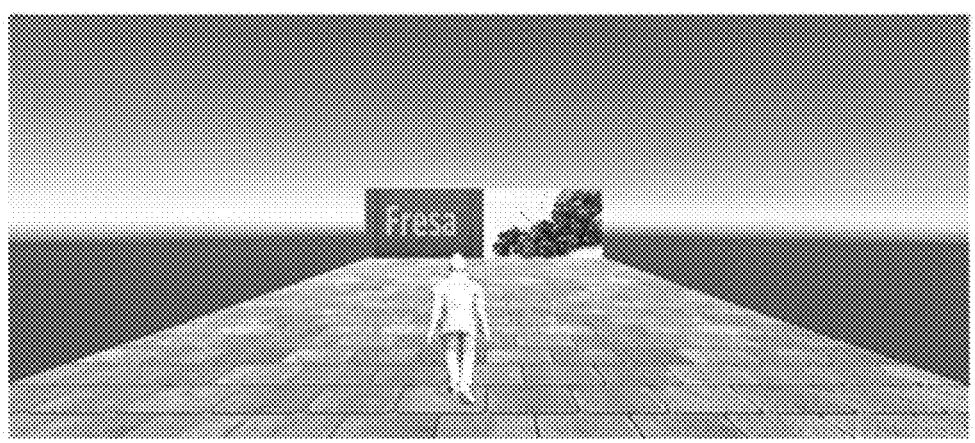
FIG. 11 is an example of a screen shot, displayed by a memorization system, illustrating an object as text and an image, according to an example of the present disclosure.

FIG. 11 illustrates an example of a screen shot 1100 displayed by a memorization system, according to an example of the present disclosure. FIG. 11 illustrates an example of the hardware platform 120 displaying an obstacle in the path of the controllable object. For example, the hardware platform 120 can display the obstacle as containing two items of information (e.g., text and an image). FIG. 11 illustrates an example of a mismatch relationship between the two items of information contained in the obstacle. An input corresponding to a correct action may be an input of controlling the controllable object to avoid the obstacle (e.g., controlling the avatar to jump over the obstacle). Speaking or handwriting a correct answer may also cause the controllable object to avoid the obstacle. The two items of information included in the obstacle may both be text. For example, one item of information may be text of the word "fresa" and the other item of information may be text of the word "cherry."

Figure 12:
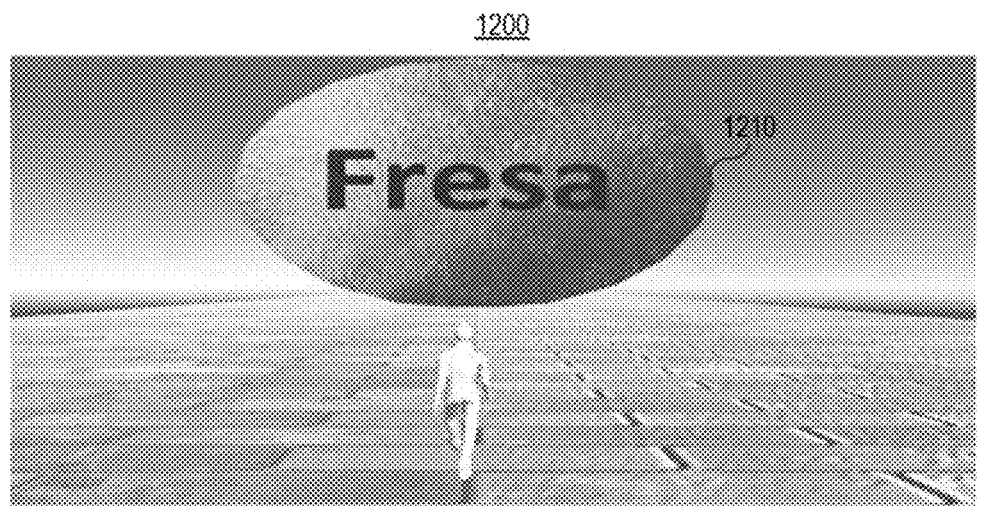
FIG. 12 is an example of a screen shot, displayed by a memorization system, illustrating a first object as text, according to an example of the present disclosure.
Figure 13:
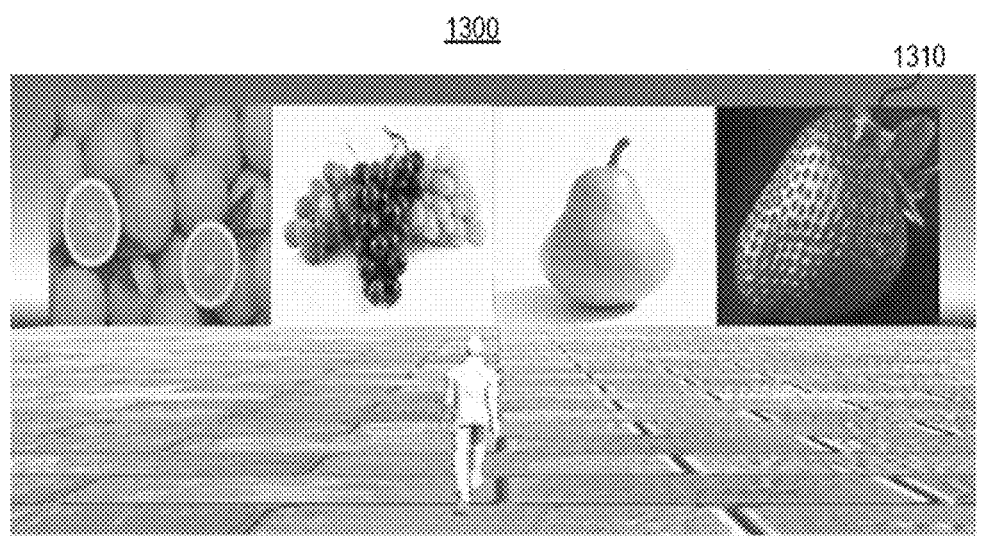
FIG. 13 is an example of a screen shot, displayed by a memorization system, illustrating a second object as several images, according to an example of the present disclosure.

FIGS. 12-13 illustrate example screen shots 1200 and 1300 displayed by a memorization system, according to an example of the present disclosure. FIG. 12 illustrates a first object 1210 displayed on display 210. After receiving an input corresponding to the controllable object passing through the first object 1210, the hardware platform 120 can display a second object 1310 in the path of the controllable object. In this example, the second object 1310 may include multiple choices (e.g., each image corresponding to a choice). An input corresponding to a correct action may include an input of controlling the controllable object to pass through one of the images (e.g., the image of the strawberry).

The first object 1210 may contain an image instead of text. Further, the second object may contain text instead of images, or text and images in any combination. In addition, one object may be displayed (e.g., the second object 1310), and each choice within the second object 1310 may include two items of information. In this example, an input corresponding to a correct action may include an input of controlling the controllable object to pass through a choice within the second object 1310 having a match relationship between the two pieces of information.

Figure 14:
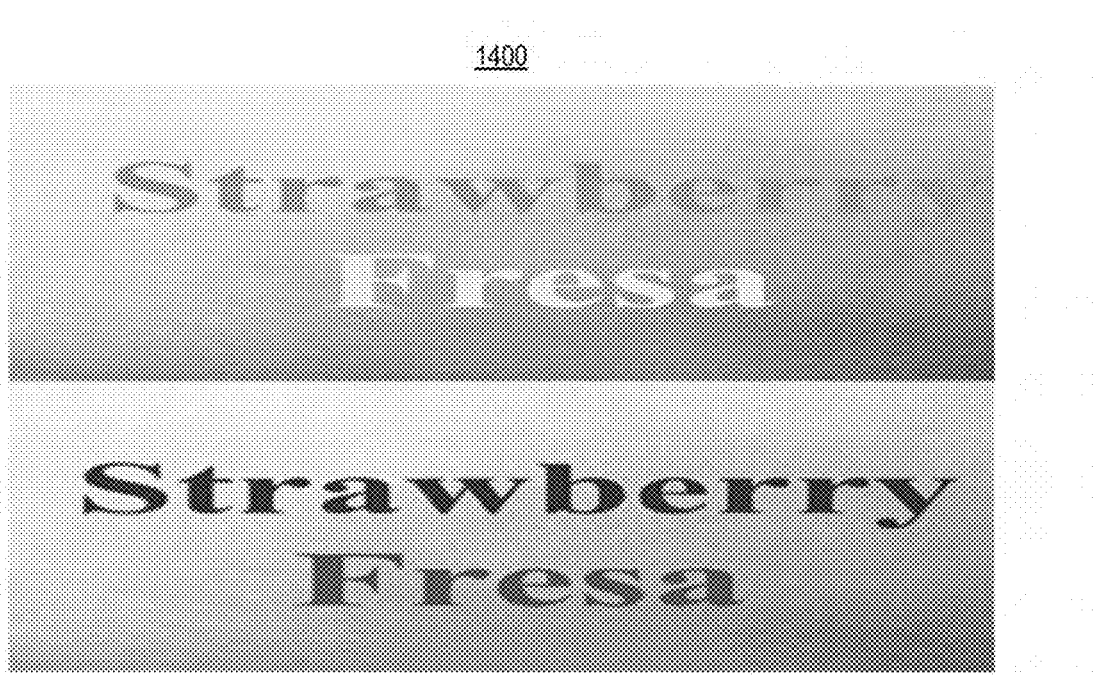
FIG. 14 is an example of a screen shot, displayed by a memorization system, illustrating a statement of information displayed according to the contrast principle.

FIG. 14 illustrates example screen shot 1400 of a learning environment displayed by the memorization system, according to a contrast principle. For example, the contrast principle is based on the statement of information becoming more memorable whenever there is a high contrast between two items of information in the statement of information. A contrast can mean a striking difference between two items. The higher the contrast is, the more memorable the information will be. Using the contrast principle in the learning environment, the statement of information may be displayed as strikingly different from other items displayed.

In some embodiments, the hardware platform 120 can display an active learning environment in which statements of information are displayed with a high contrast in color. The high contrast in color makes the statement of information more memorable to the user. For example, in screen shot 1400, the hardware platform 120 can display a series of images forming the active learning environment, such that the word "strawberry" can be displayed in a first color and another related word "fresa" (which is the Spanish translation of "strawberry") can be displayed in a second color, which is strikingly different from the first color.

In other embodiments, the contrast principle can also be applied to audio outputted in connection with the active learning environment. Using the example of "fresa" being a statement of information, the speaker 250 can output the word "fresa" repeatedly in different voices. For example, the word "fresa" can be outputted using an angry voice, a friendly voice, a sad voice, an happy voice, etc.

In further embodiments, the contrast principle can also be applied to the presentation of the statement of information. For example, the hardware platform 120 can display an image of one strawberry next to another image of multiple strawberries.

The contrast principle can also apply to the size of the displayed statement of information. For example, the hardware platform 120 can display a close-up image of a strawberry and a zoomed-out image of a strawberry. As another example, the hardware platform 120 can also display the word "fresa" in a small font size next to the word "fresa" in a large font size. The images or text displayed in the passive learning environment can also differ in shape to increase the contrast between the images or text.

The contrast principle can also apply to the content displayed in the active learning environment. In some embodiments, the hardware platform 120 can display an active learning environment according to the contrast principle using a familiarity stage and a recognition stage.

In the familiarity stage, the contrast between the statement of information displayed in one object can be high as compared to the statement of information displayed in another object. For example, one item of text in an obstacle can include information that is easily identifiable as wrong, and another item of text in the obstacle can include information that is easily identifiable as correct.

Figure 15:
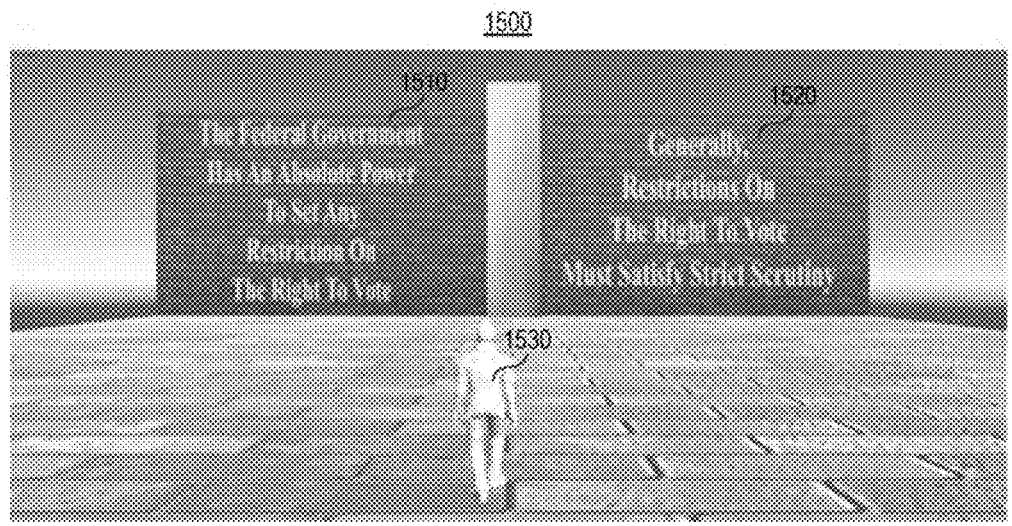
FIG. 15 is an example of a screenshot, displayed by a memorization system, illustrating a statement of information displayed according to the contrast principle.
Figure 16:
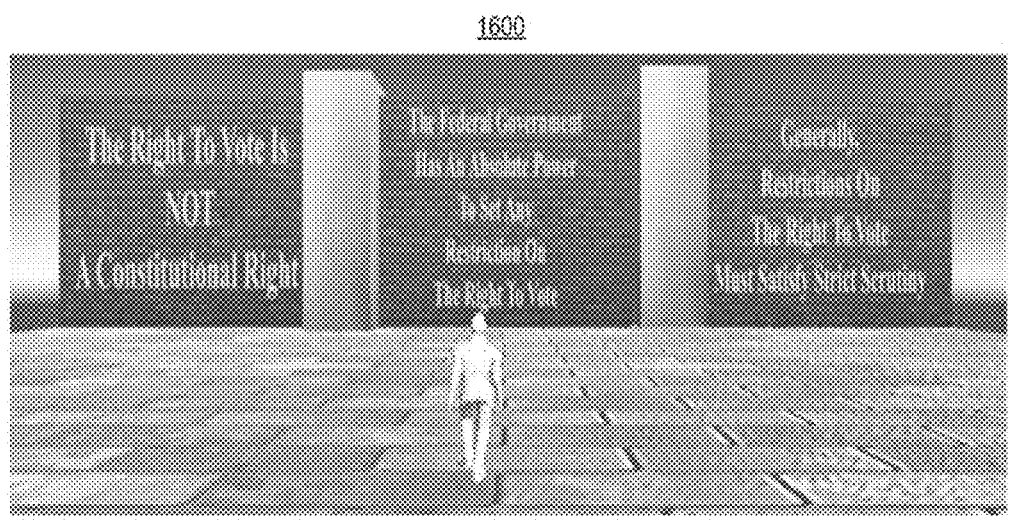
FIG. 16 is another example of a screenshot, displayed by a memorization system, illustrating a statement of information displayed according to the contrast principle.

FIGS. 15-16 illustrate example screenshots 1500 and 1600 of an active learning environment displayed by the hardware platform, according to the familiarity stage of the contrast principle. In screenshot 1500, the hardware platform displays statement of information 1510 "The Federal Government has an absolute power to set any restriction on the right to vote" and statement of information 1520 "Generally, restrictions on the right to vote must satisfy strict scrutiny." A user who is using the hardware platform 120 to learn and memorize U.S. constitutional law may easily identify that statement of information 1510 is false and statement of information 1520 is correct. The controllable object 1530 may pass through statement of information 1220, otherwise the user may have to start again from a previous point. The high contrast between statement of information 1510 and statement of information 1520 can be a good introduction to the restrictions on the right to vote in U.S. constitutional law, and it can enhance the memorization experience. Similarly, FIG. 16 illustrates screenshot 1600 of an active learning environment according to the familiarity stage of the contrast principle. In FIG. 16, screenshot 1600 illustrates three statements of information in the obstacle. The three statements of information in the obstacle have a contrast according to the familiarity stage.

Figure 17:
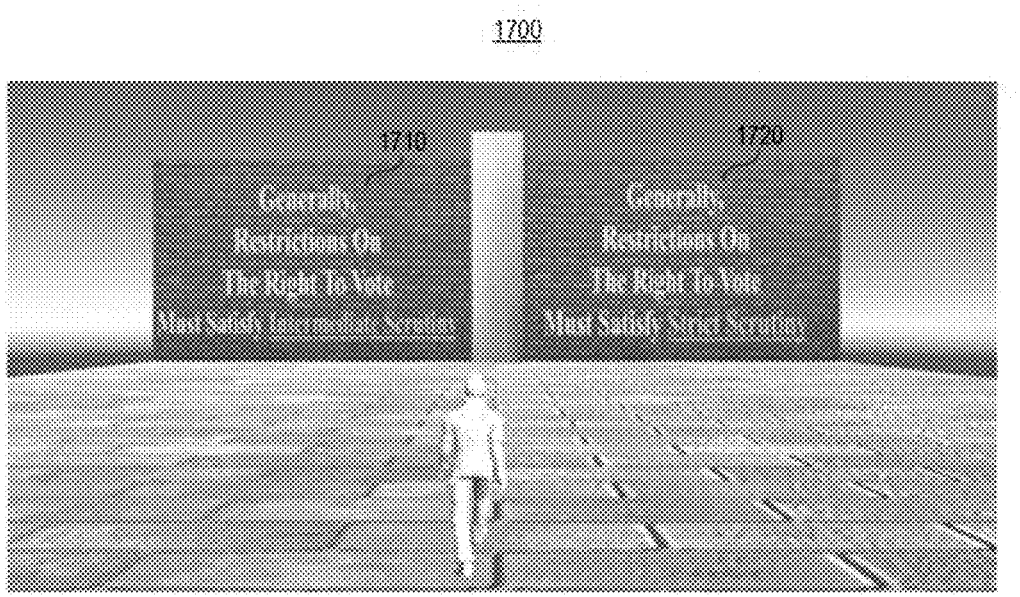
FIG. 17 is another example of a screenshot, displayed by a memorization system, illustrating a statement of information displayed according to the contrast principle.
Figure 18:
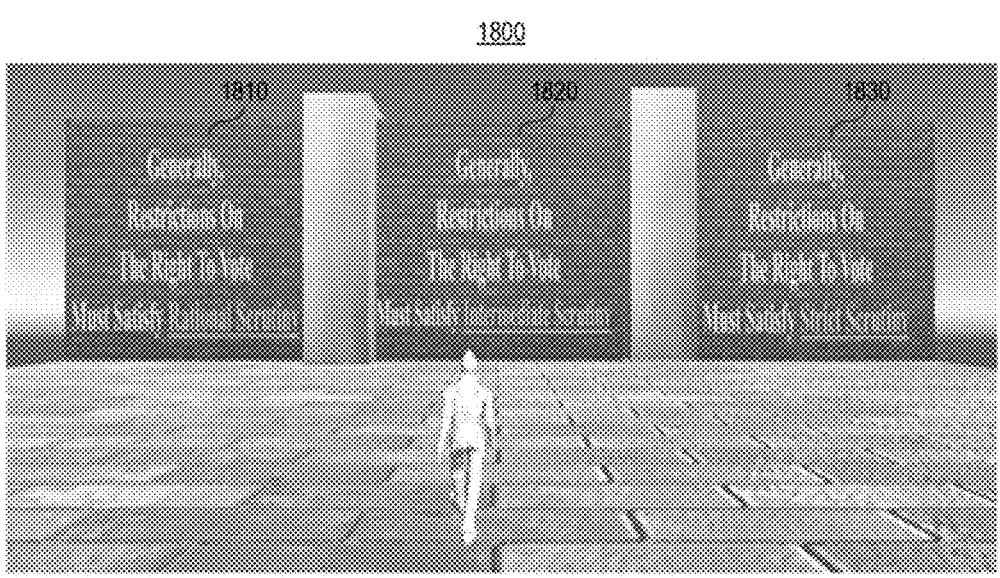
FIG. 18 is another example of a screenshot, displayed by a memorization system, illustrating a statement of information displayed according to the contrast principle.

In the recognition stage, the contrast between the statements of information displayed in an obstacle can be low. For example, the statements of information can be very similar and the true statement of information may not be easily identifiable over the false statement of information. A deeper understanding of the topic may help the user make the correct decision. FIGS. 17-18 illustrate example screenshots of active learning environments displayed by the hardware platform, according to the recognition stage of the contrast principle. In FIG. 17, screenshot 1700 illustrates statement of information 1710 and statement of information 1720 in an obstacle. One of statements of information 1710 and 1720 can be true and the other can be false. However, statement of information 1710 can be similar to statement of information 1720, but statement of information 1710 can be false. A user may need more detailed understanding of the topic to determine which of statements of information 1710 and 1720 is true. For example, the user can be tested on what level of scrutiny is required to set restrictions on the right to vote. In FIG. 17, statement of information 1720 is true and statement of information 1710 is false. Similarly, FIG. 18 illustrates a screenshot of an active learning environment according to the recognition stage of the contrast principle. In FIG. 18, screenshot 1800 illustrates three statements of information 1810, 1820, and 1830 in the obstacle. Statements of information 1810, 1820, and 1830 are similar, but one of them is correct.

The contrast principle using the familiarity stage and recognition stage can apply to any field of formal and informal education at any level and in any language. The familiarity stage can be used to introduce new statements of information and can create familiarity with the statements of information. The user can achieve a deeper understanding and ultimate mastery of the information suitable for memorization (e.g., statements of information) using the recognition stage.

In addition, the familiarity stage can be used to learn new statements of information, while the recognition stage can be used to test the depth of the user's understanding of the statements of information.

For example, if the goal is to learn a new topic using the hardware platform, then the hardware platform can initially display an active learning environment according to the familiarity stage to learn the new topic. The hardware platform can display the active learning environment according to the recognition stage later to test the user's understanding of the new topic. On the other hand, if the user wants to memorize topics he or she is already familiar with, but cannot recall accurately, then the hardware platform can initially display the active learning environment according to the recognition stage to achieve accuracy in learning and memorization.

In some embodiments, a false statement of information can be dramatized to enhance the memorability of the information. For example, in the familiarity stage, the dramatization principle can be used to achieve a high contrast between the true statement of information and the false statement of information. The dramatization principle can include relevant dramatization and irrelevant dramatization. In relevant dramatization, the dramatization of the false statement of information is related to the correct statement of information. In irrelevant dramatization, the dramatization of the false statement is not related to the correct statement of information. In some cases, the hardware platform can display the active learning environment according to the irrelevant dramatization of the false statement of information to introduce the user to the subject matter of the true statement of information.

Figure 19:
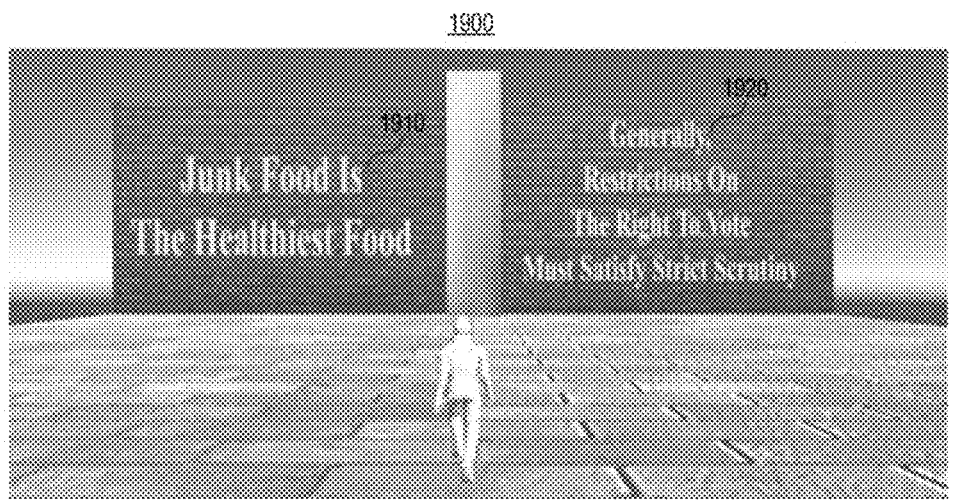
FIG. 19 is another example of a screenshot, displayed by a memorization system, illustrating a statement of information displayed according to the contrast principle.

For example, FIG. 19 illustrates an example screenshot of an active learning environment displayed by the hardware platform, according to the irrelevant dramatization aspect of the contrast principle. FIG. 19 illustrates screenshot 1900, which includes statement of information 1910 and statement of information 1920 displayed within an obstacle. The contrast between the statement of information 1910 and the statement of information 1920 is dramatized, according to irrelevant dramatization, because statement of information 1910 is easily identifiable as false and is irrelevant or unrelated to the subject matter of statement of information 1920.

Figure 20:
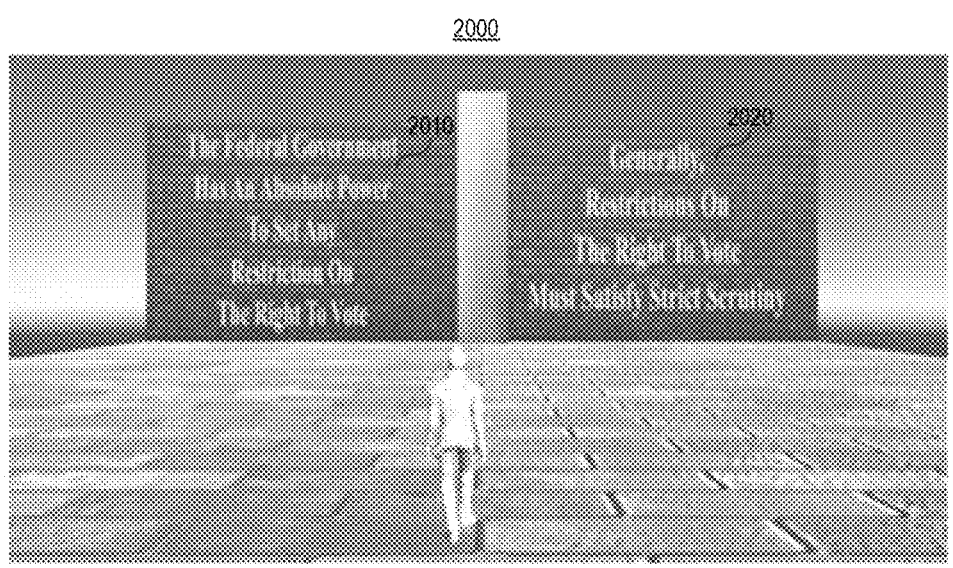
FIG. 20 is another example of a screenshot, displayed by a memorization system, illustrating a statement of information displayed according to the contrast principle.

As another example, FIG. 20 illustrates an example screenshot of an active learning environment displayed by the hardware platform, according to the relevant dramatization aspect of the contrast principle. FIG. 20 illustrates screenshot 2000, which includes statement of information 2010 and statement of information 2020 displayed within an obstacle. The contrast between the statement of information 2010 and the statement of information 2020 is dramatized, according to relevant dramatization, because statement of information 2010 is easily identifiable as false and is relevant or related to the subject matter of statement of information 2020. Statement of information 2010 may be easily identifiable by the user as false, however, the subject matter of statement of information 2010 is relevant to the subject matter of statement of information 2020 (e.g., constitutional law).

In some embodiments, the hardware platform can display statements of information in the active learning environment, according to the contrast principle combined with other learning principles. For example, the hardware platform can display the statements of information according to the contrast principle combined with the principle of multiple examples and the change of focus principle.

The principle of multiple examples can refer to the concept that the more examples of information suitable for memorization provided to the user, the more memorable the information can be for the user. In addition, the change of focus principle can refer the theory that changing the focus of an object within a picture containing a plurality of objects can improve the user's focus on the object. For example, when the user views an overview of a picture that has many different objects, the user's mind may look generally at these objects. However, when the focus inside the picture is changed by the hardware platform to focus on one object, then the user may interpret this focus to have meaning.

Figure 21:
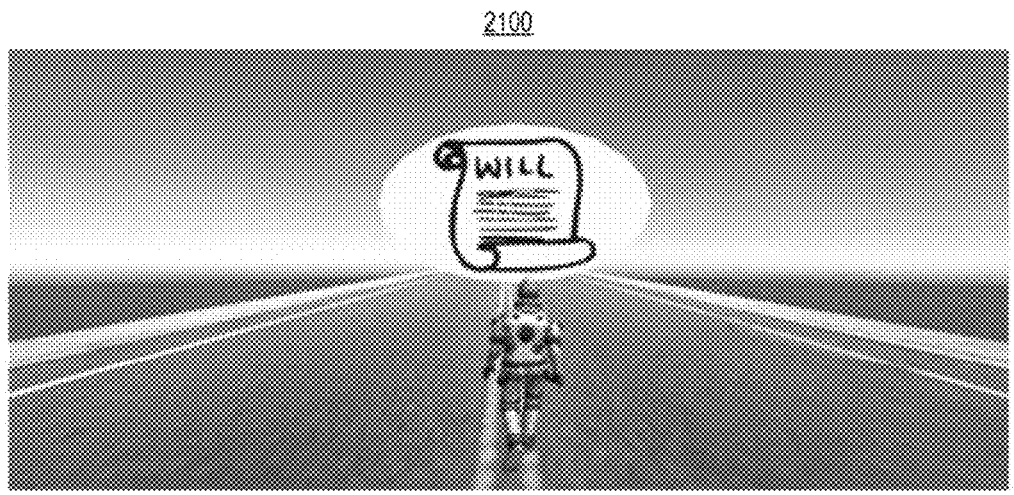
FIG. 21 is an example of a screenshot, displayed by a memorization system, illustrating a statement of information displayed according to the change of focus principle.
Figure 22:
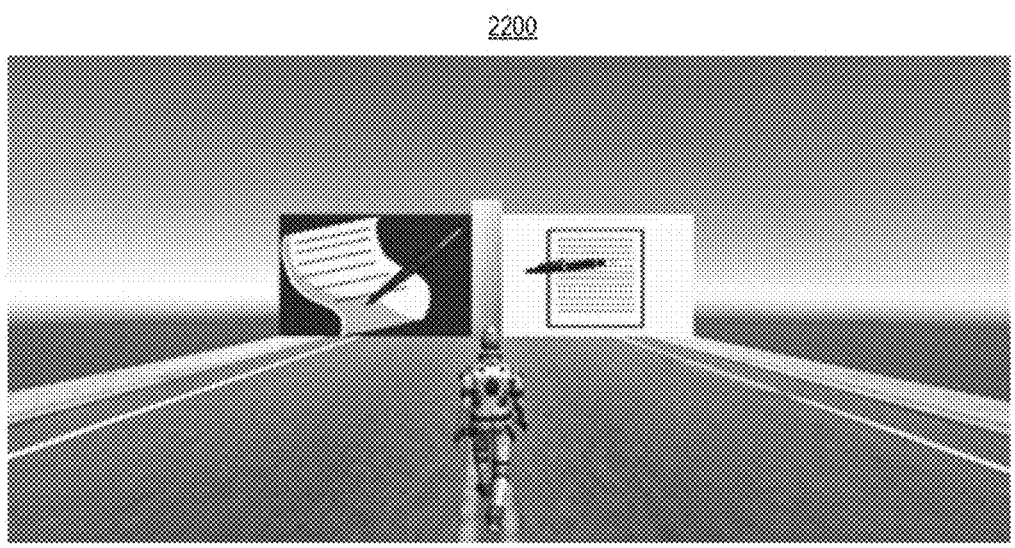
FIG. 22 is another example of a screenshot, displayed by a memorization system, illustrating a statement of information displayed according to the change of focus principle.

FIGS. 21-22 illustrate example screenshots of an active learning environment displayed by the hardware platform, according to the change of focus principle. For example, the hardware platform can display a document and a pen next to the document in an overview. The user may interpret the displayed document and the pen as being a contract, a paper and a pen to take notes during a lecture, or other different interpretations. The hardware platform can change the presentation of the document and the pen to focus on objects in the display, such as the signature location of the document, the pen, the document where both pen the document appear, etc. The hardware platform can alternate between focusing on different areas of the document and the pen (e.g., the signature location of the document, the pen, the document where both pen the document appear, etc.). This change of focus and the alternating between the signature location and the pen may represent that the document and pen are a contract to be signed. Further, the change of focus provides special meaning to the document and reduces unnecessary and irrelevant interpretations by the user.

In some embodiments, the hardware platform can facilitate the memorization of subject matter by initially presenting multiple examples of applications of the subject matter before presenting the subject matter to be memorized. Multiple examples may be presented in two ways at the same time to increase the contrast. The hardware platform can display a first example be by presenting a video within a first obstacle showing multiple examples about what is not the subject matter (e.g. examples of what is not a contract, examples of what is not the Spanish translation of strawberry, etc.). The hardware platform can display a second example by presenting another video within the second obstacle, displayed at the same time as the first obstacle, showing multiple examples about the subject matter to be memorized (e.g., what is a contract, what is the Spanish translation of strawberry, etc.). The user may decide which presented video is correct, and provide a user input to the hardware platform based on the user's decision. If the hardware platform receives an input corresponding to the correct decision (e.g., controlling the controllable object to pass through the second obstacle), then the hardware platform can present again multiple examples of what is the subject matter. Further, the hardware platform can then display the subject matter inside an obstacle in the form of a statement of information and prompt the user to make a binary decision regarding the statement of information. Showing multiple examples, rather than one example, at the same time about what is the subject matter and multiple examples about what is not the subject matter can increase the contrast between these examples. Displaying multiple examples can also facilitate a high-level understanding of the subject matter before the hardware platform presents further details of the subject matter. In other words, the hardware platform can display an active learning environment according to the multiple examples principle to facilitate an understanding of the spirit of the subject matter by initially presenting applications using multiple examples. The visual examples can be pictures, videos, animations, text, etc. The multiple examples principle can be used together with the change the focus principle to reduce unnecessary and irrelevant interpretations of the pictures presented, as mentioned above with respect to the change of focus principle.

As an example of the above described principles, if the user is learning subject matter relating to legal education, the hardware platform may facilitate the memorization of topics of the legal education (e.g., where the signature of a will should be located). The hardware platform can display an active learning environment according to the combination of the contrast principle, multiple examples principle, and the change of focus principle by presenting (on the path of the controllable object) two obstacles, each one presenting a video about the location of the signature inside the will. The first video displayed in the first obstacle may show the wrong locations (e.g., what should not be the location of the signature on a will) of the signature by showing the signature in different wrong locations (e.g., signature inside the body of the text in the middle of the will, signature at the top, signature in the margins, etc.). Further, using the change the focus principle, the hardware platform can present the first video as focusing on the wrong location of the signature every time the location of the signature changes. The hardware platform can display the first video as focusing on the signature line, not the will itself. The user can interpret that the subject matter being presented relates to the signature line of the will, instead of the will itself. The second obstacle can display a second video that shows multiple examples of signing the will, but all of them may be at the end of the will in the correct location. Again, the change of focus principle may also apply so the focus may change from an overview to the will to a specific location of the signature line at the end of the will. A user viewing the first video and the second video may compare the first video with the second video, and conclude that one of these videos is correct. Further, the user may conclude that the signature line should be at the end of the will. The videos may be presented over a short duration or a long duration.

Referring again to FIG. 21, presenting a picture of a will inside an object can indicate to the user that the upcoming topic to be memorized may relate to wills. Further, referring to FIG. 22, the hardware platform may display two pictures (e.g., or video) of a pen and a document. The picture (e.g., or video) on the right shows the pen in the middle of the page (e.g., an incorrect location of the signature line), and the picture on the left shows the pen at the end of the page (e.g., the correct location of the signature line). The user may understand that the location of the signature in the will is a key piece of information being tested here.

FIGS. 7-22 above describe embodiments of the memorization system displaying the active learning environment. FIGS. 23-61 below describe embodiments of the memorization system displaying the passive learning environment. Unlike the active learning environment, the user 110 may not make binary decisions in the passive learning environment and the hardware platform can display the statements of information according to various principles. For example, the statements of information may be displayed to user 110, according to various passive learning techniques, to improve the user's 110 ability to memorize the subject matter.

The statements of information that are displayed in the passive learning environment may be true versions of the statements of information. The statements of information may be independent ideas that are understandable without additional information. For example, a statement of information in the passive learning environment may be the phrase: "The right to vote is a fundamental right."

The hardware platform 120 can display the statements of information, according to various passive learning principles. Passive learning principles can include, but are not limited to: a higher authority principle, dramatization principle, moving statement of information principle, peripheral statement of information principle, gift statement of information principle, flashing statement of information principle, sudden statement of information principle, out of place principle, shapes representing statements of information principle, stressing statement of information, competition principle, overloading principle, known among the multiple unknown principle, lighting principle, humor principle, sexual hint principle, beauty principle, fame principle, delicious food principle, repetition principle, pressure principle, variation principle, and a change of focus principle.

Figure 23:
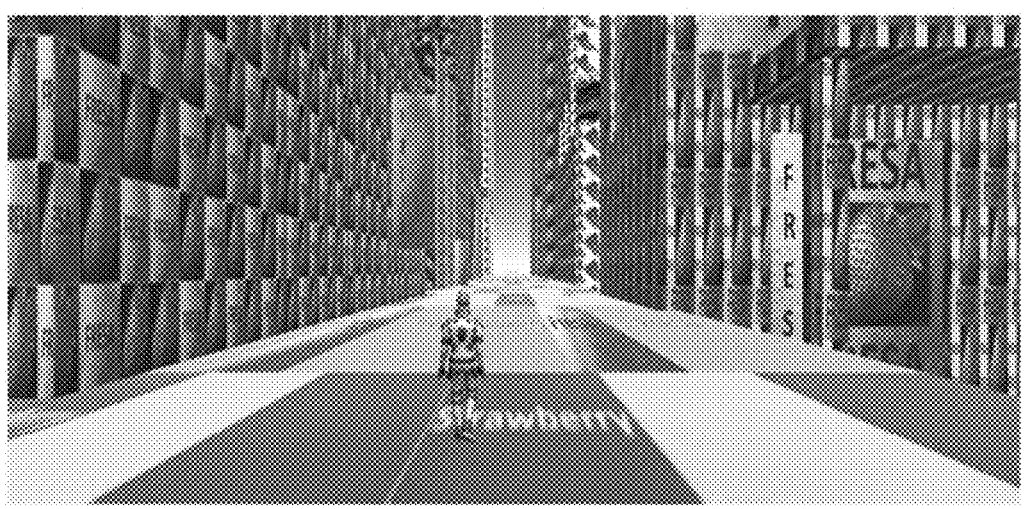
FIG. 23 is an example of a screen shot, displayed by a memorization system, illustrating statements of information displayed in a passive learning environment, according to the overloading principle.

FIG. 23 illustrates another example screenshot of the passive learning environment displayed by a memorization system. Screenshot 2300 illustrates an example of the hardware platform 120 displaying a statement of information according to the overloading principle. The overloading principle is based on overloading a user with information to enhance the user's ability to memorize target information. The overloading principle can be used in the context of the passive learning environment displayed by the hardware platform 120. Further, the overloading principle can relate to a predetermined overloading of specific information displayed by the hardware platform 120, rather than random information overload. For example, the hardware platform 120 can display a passive learning environment for facilitating memorization of specific pieces of information after the hardware platform 120 determines whether the user input corresponds to a correct action or an incorrect action. The hardware platform 120 may display the statement of information in various different forms, locations, colors, etc., throughout the passive learning environment to saturate the user with the statement of information. In screenshot 2300, the word "strawberry" and its Spanish translation of "fresa" are displayed throughout the passive learning environment.

Figure 24:
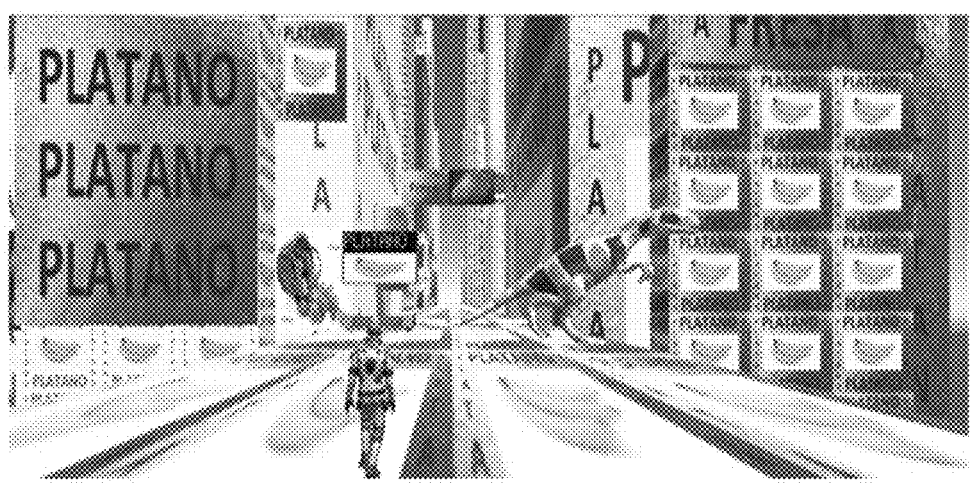
FIG. 24 is an example of a screen shot, displayed by a memorization system, illustrating statements of information displayed in a passive learning environment, according to the known among the multiple unknown principle.

FIG. 24 illustrates another example screenshot of the passive learning environment displayed by a memorization system. Screenshot 2400 illustrates an example of the hardware platform 120 displaying statements of information according to the known among the multiple unknown principle. The known among the multiple unknown principle is based on known information being processed, recognized, and memorized faster than unknown (e.g., information that has not been memorized yet) information. The hardware platform 120 may display a large number of statements of information that are unknown to the user, along with a smaller number of statements of information that are already known to the user. For example, screenshot 2400 illustrates a passive learning environment displaying a large number of images of a banana and the word "platano" (which is the Spanish translation of banana) and a smaller number of images of a strawberry and the word "fresa" (Spanish word for strawberry). In this case, the user may have already learned the Spanish word "fresa" for strawberry, but not the Spanish word "platano" for banana.

The steps to apply this principle can include receiving, at the hardware platform, a decision from the user about the statement of information to change its status from the unknown to the known statement of information. Further, the hardware platform can display a learning environment that represents the statement of information in a manner that is meant to overload the user. The hardware platform may present the statement of information using a plurality of passive memorization principles, which can facilitate the transition of the statement of information from the unknown to the known. Next, the hardware platform can present a plurality of recent statements of information (e.g., recently memorized statements of information) among a much larger number of new, unknown statements of information (yet to be learned or memorized statements of information). The user may recognize the recently memorized statements of information among the unknown (or yet to be memorized) statements of information. The hardware platform can display the number of unknown statements of information (e.g., "platano" in FIG. 24) in an amount that is much larger than the number of known statements of information ("fresa" in FIG. 24).

Other examples of passive learning principles include the change of focus principle, in which the information suitable for memorization (e.g., statement of information) can be presented with continuous and frequent changes to a camera angle viewing the information suitable for memorization; the flashing principle, in which the statement of information is displayed as flashing; moving statement of information principle, in which the statement of information is displayed as a moving object; and the out-of-place principle, in which the statement of information is displayed on an object that is out of place based on the surrounding environment (e.g., the information is presented on a back of a dinosaur on the road).

Figure 25:
FIG. 25 is an example of a screenshot, displayed by a memorization system, illustrating a statement of information displayed according to the higher authority principle.
Figure 26:
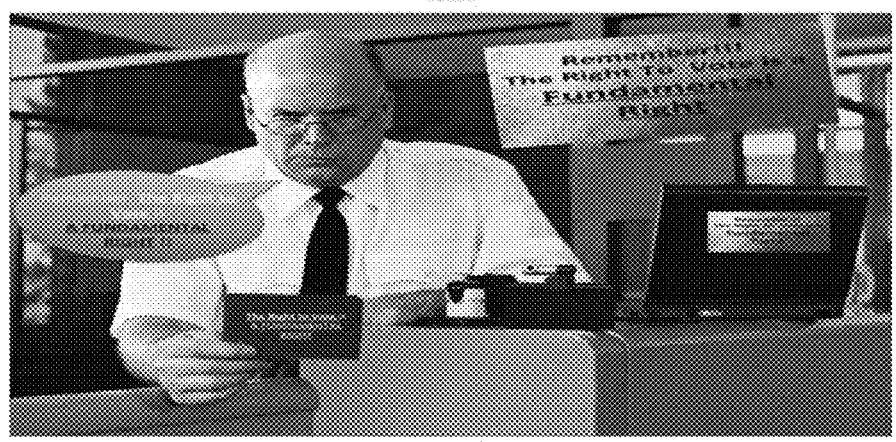
FIG. 26 is another example of a screenshot, displayed by a memorization system, illustrating a statement of information displayed according to the higher authority principle.
Figure 27:
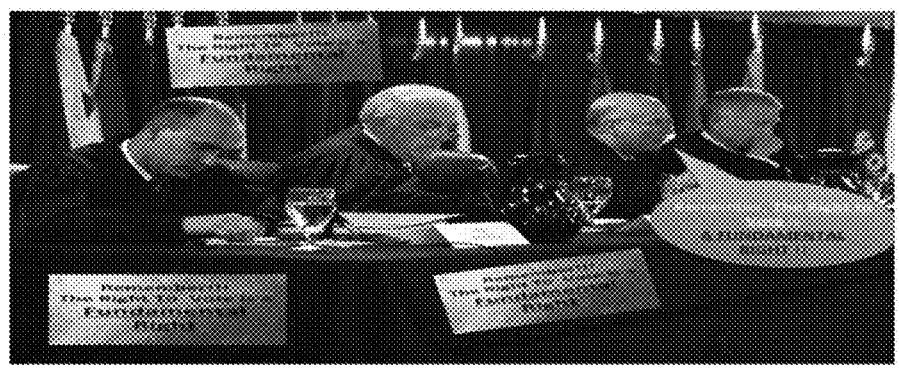
FIG. 27 is another example of a screenshot, displayed by a memorization system, illustrating a statement of information displayed according to the higher authority principle.

FIGS. 25-27 illustrate example screenshots of the passive learning environment displayed by a memorization system, according to the higher authority principle. For example, screenshot 2500 illustrates the hardware platform displaying statements of information, according to the higher authority principle. The higher authority principle can refer to the theory that information is more memorable when it comes from a higher authority, as opposed to a colleague or peer. Screenshot 2500 illustrates a representation of a friendly or cooperative figure speaking the statement of information. For example, the friendly figure can be female or male that speaks a true statement of information, so the user may see the statement on the screen (and also hear it in a friendly tone of voice through speakers of the hardware platform). In screenshot 2500, the woman in the picture represents the friendly figure that speaks a statement of information (e.g., "The Right to Vote is A FUNDAMENTAL RIGHT"). In some embodiments, when the hardware platform receives an input corresponding to an incorrect action, the hardware platform may initially present the friendly figure if the incorrect action is a first occurrence.

FIG. 26 illustrates another example of the hardware platform displaying statements of information, according to the higher authority principle. Screenshot 2600 illustrates the higher authority being a serious figure. If the hardware platform receives an input corresponding to a second occurrence of an incorrect action (e.g., receiving the wrong input twice), then the hardware platform may display a video of a person, having a characteristic of being serious, that represents a higher authority in the field (e.g., a university professor in the subject that the user wants to memorize). As other examples, the person having a characteristic of being serious may be a customs agent, or any other authority figure. The hardware platform can display the individual representing a higher authority person as speaking the correct statement of information in a serious and authoritative manner. For example, in screenshot 2600, the higher authority figure can be represented as speaking the correct statement of information: "Remember . . . The right to vote is a FUNDAMENTAL RIGHT."

FIG. 27 illustrates another example of the hardware platform displaying statements of information, according to the higher authority principle. Screenshot 2700 illustrates the higher authority being a disciplinary committee. For example, if the hardware platform receives an input corresponding to a third occurrence of an incorrect action (e.g., receiving an incorrect input three times), the hardware platform can display an image or video having a characteristic of a higher authority by displaying a fictional disciplinary committee consisting of many higher authority figures (e.g., similar to court room where there are many judges). The hardware platform can display a representation of each member of the disciplinary committee speaking the correct statement of information in a serious and authoritative manner. Each member may have very distinct voice and tone. For example, screenshot 2700 illustrates a representation of the higher authority figures speaking the correct statement of information: "The right to vote is a FUNDAMENTAL RIGHT". The hardware platform may display the disciplinary committee according to the dramatization principle and the variation principle because the hardware platform may output many different voices and display many different people speaking the same true statement of information. In addition, if the hardware platform receives inputs corresponding to an incorrect action three times regarding to the same statement of information, the user may compare the first friendly picture and voice, the second serious and authoritative picture and voice, and the third disciplinary committee picture and voice. All the dramatizations may represent a penalty for repeating the same error.

The hardware platform can display the higher authority figures of FIGS. 25-27 in any sequential order if the hardware platform receives three inputs that correspond to an incorrect action. The higher authority figures can be any person (male or female) that can be perceived by the user as a higher authority or disciplinary committee. The hardware platform can output different voices associated with the individuals in the images or video. The hardware platform can also display an image or representation of the higher authority figure(s) having a variation of the camera focus. For example, if one depicted individual speaks longer (due to the nature and length of the statement of information), then the hardware platform may focus on the speaker but from different locations. This is to maintain the focus and the attention span of the user while this dramatization is being displayed as a video or as a series of images.

Figure 28:
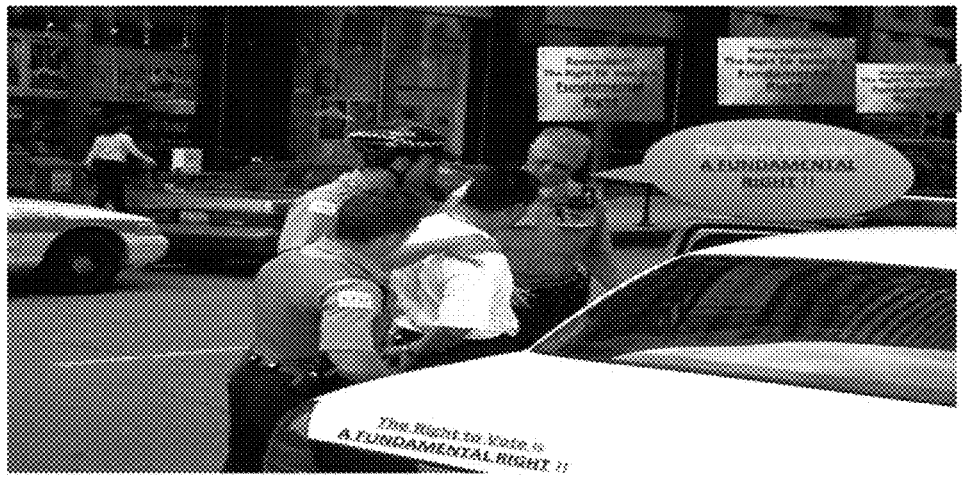
FIG. 28 is an example of a screenshot, displayed by a memorization system, illustrating a statement of information displayed according to the dramatization principle.

FIG. 28 illustrates an example screenshot of a passive learning environment displayed by the hardware platform displaying statements of information, according to the dramatization principle. The dramatization principle may refer to the theory that subject matter becomes more memorable if the subject matter is displayed in a dramatic setting or dramatized environment. The hardware platform can display statements of information with a dramatic effect by displaying fictional stories taken from serious events. Screenshot 2800 illustrates the dramatization of the penalty aspect of the dramatization principle. For example, if the hardware platform receives an input corresponding to an incorrect action, then the hardware platform can display a character getting arrested by fictional law enforcement officers. The hardware platform can display a representation of the law enforcement officers speaking the true or correct statement of information as the character is being arrested (e.g., as shown in FIG. 28). Another example of the hardware platform displaying a representation of the statement of information, according to the dramatization of the penalty principle, can include a representation of prisoners in the same prison cell speaking the statement of information. For example, the hardware platform may display the video (or series of images) showing prisoners repeating the correct statement of information. The hardware platform may output voices corresponding to each of the prisoners, such that the voice of each prisoner has a distinct tone.

Figure 29:
FIG. 29 is another example of a screenshot, displayed by a memorization system, illustrating a statement of information displayed according to the dramatization principle.

FIG. 29 illustrates an example of dramatization of the story aspect of the dramatization principle. For example, screenshot 2900 may illustrate a statement of information being displayed in the context of a dramatic story. The hardware platform may display a statement of information according to the dramatization of the story principle when the hardware platform receives an input corresponding to an incorrect action. Screenshot 2900 may illustrate a breaking news story broadcasted by a news channel. The main headline of the news channel can be the statement of information (e.g., "The right to vote is a fundamental right"). Further, a news reporter can repeat the correct statement of information and explain how the user has made the same mistakes multiple times.

Figure 30:
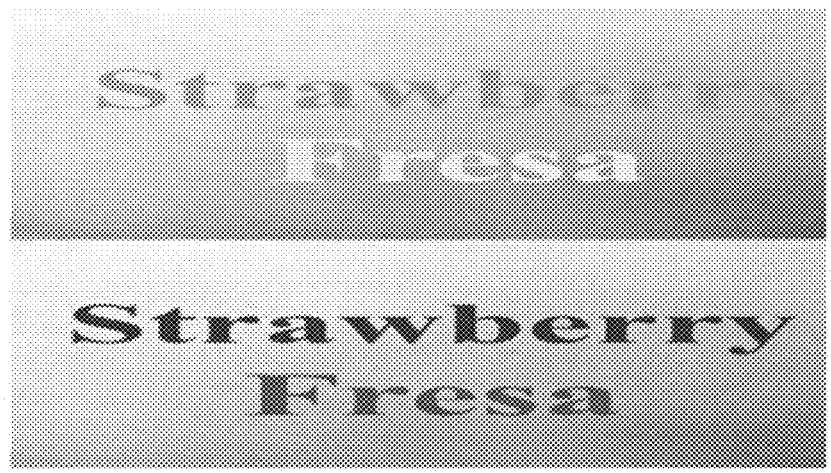
FIG. 30 is an example of a screenshot, displayed by a memorization system, illustrating a statement of information displayed according to the contrast principle.

FIG. 30 illustrates an example screenshot displayed by the hardware platform displaying a statement of information according to the contrast principle. The contrast principle is based on a theory that the statement of information becomes more memorable when there is a high contrast between the statement of information and another item displayed. The hardware platform can represent a contrast in any form, such as colors, voices, pictures, movement, information content, etc. FIG. 30 illustrates a high contrast between the color of the statement of information. For example, in screenshot 3000, the statement of information (e.g., strawberry) can be presented with a high contrast in color with the background color.

The hardware platform may also represent a contrast using voices outputted by speakers. For example, the hardware platform may output audible sounds of statements of information, according to the contrast principle. The voices may be different and distinct from each other to increase the contrast between the sounds. Examples of contrasts between tones or types of voices that the hardware platform can output, include: adult male voice versus adult female voice; adult (male or female) voice versus infant (male or female) voice; infant male voice versus infant female voice; soft voice versus rough voice; high pitch versus low pitch voice; low voice versus loud voice; funny voice v. serious voice; whispered voice versus normal voice; seductive nice voice (female or male) versus arrogant voice (female or male); different female voices; different dale voices; slow voice versus fast voice; calm confident voice versus nervous voice; sleepy voice versus awake voice; happy voice versus sad voice; happy voice versus angry voice; friendly voice versus hateful voice; boring voice versus enthusiastic voice; lecturing voice versus news anchor voice; and young voice versus old voice, etc.

Figure 31:
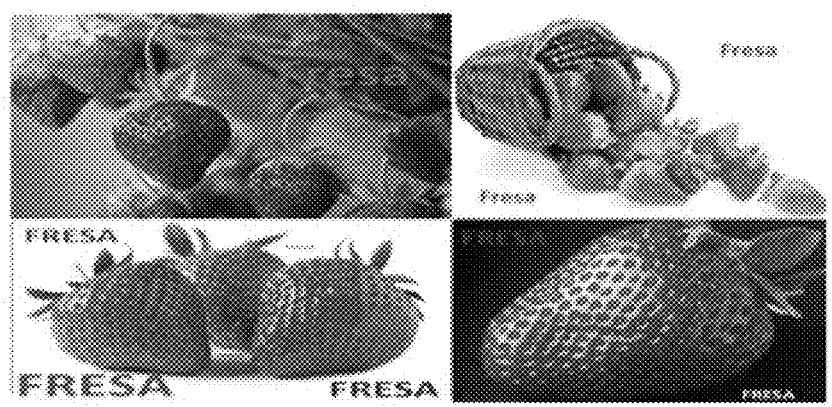
FIG. 31 is another example of a screenshot, displayed by a memorization system, illustrating a statement of information displayed according to the contrast principle.
Figure 32:
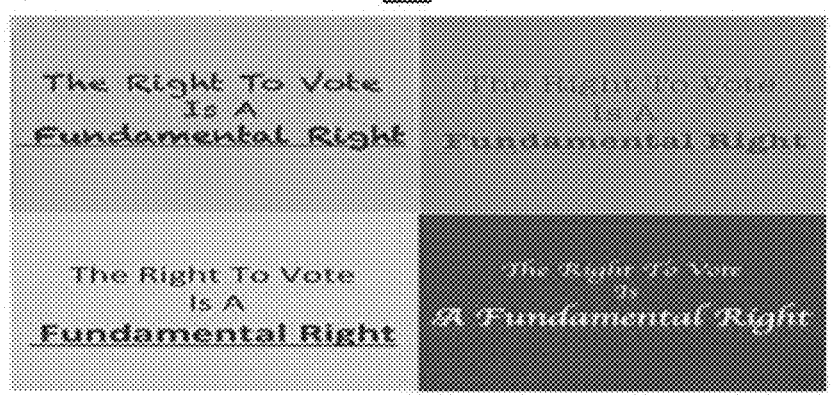
FIG. 32 is another example of a screenshot, displayed by a memorization system, illustrating a statement of information displayed according to the contrast principle.

FIGS. 31-32 illustrate example screenshots of statements of information displayed by the hardware platform, according to a contrast of presentation principle. For example, screenshot 3100 illustrates a statement of information (e.g., "fresa" which is the Spanish word for strawberry) being presented in various different pictures. FIG. 32 illustrates screenshot 3200 showing a statement of information (e.g., "the right to vote is a fundamental right") being presented with various background colors and font colors.

Figure 33:
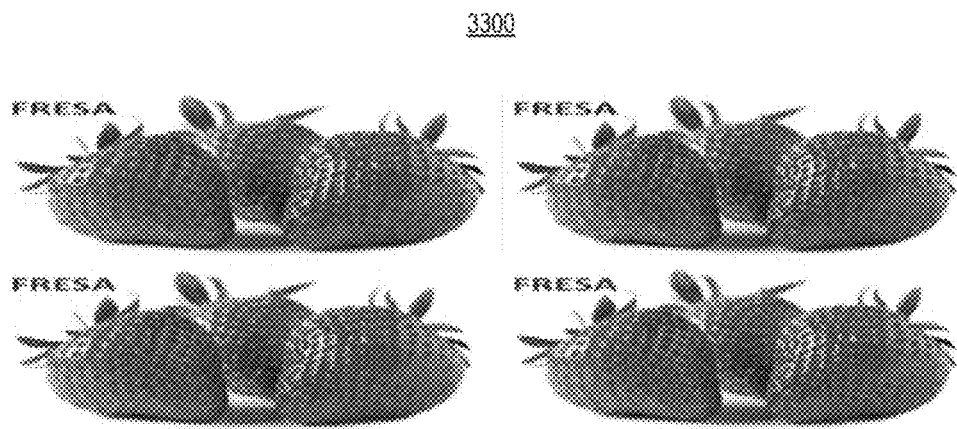
FIG. 33 is another example of a screenshot, displayed by a memorization system, illustrating a statement of information displayed according to the contrast principle.
Figure 34:
FIG. 34 is another example of a screenshot, displayed by a memorization system, illustrating a statement of information displayed according to the contrast principle.
Figure 35:
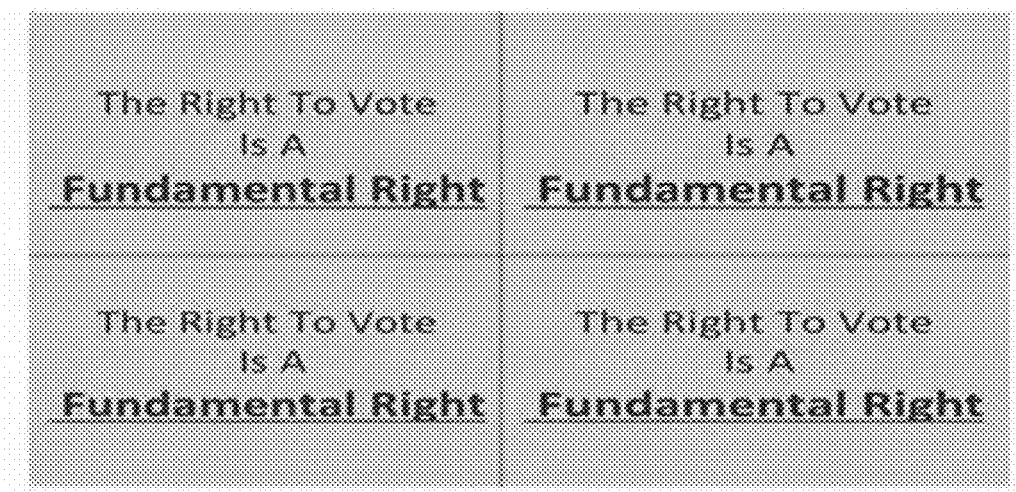
FIG. 35 is another example of a screenshot, displayed by a memorization system, illustrating a statement of information displayed according to the contrast principle.
Figure 36:
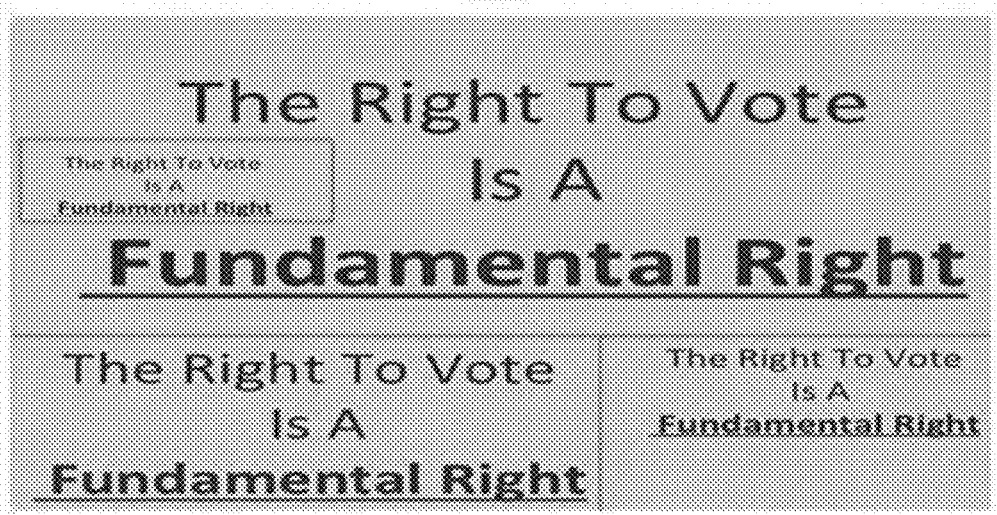
FIG. 36 is another example of a screenshot, displayed by a memorization system, illustrating a statement of information displayed according to the contrast principle.
Figure 37:
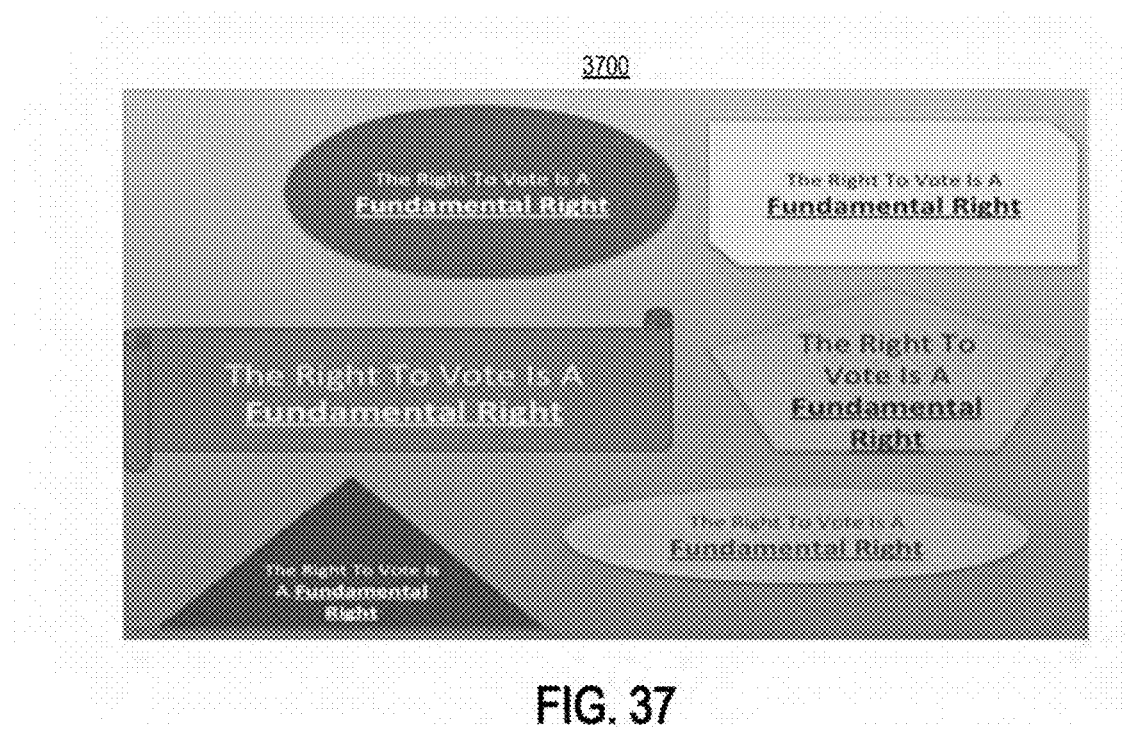
FIG. 37 is another example of a screenshot, displayed by a memorization system, illustrating a statement of information displayed according to the contrast principle.

FIGS. 33-37 illustrate example screenshots of a statement of information displayed by the hardware platform, according to a contrast of location and size principle. FIG. 33 illustrates screenshot 3300 showing the statement of information (e.g., "fresa" being the Spanish word for strawberry) being displayed without a contrast in size and location. FIG. 34 illustrates screenshot 3400 showing the statement of information (e.g., "fresa" being the Spanish word for strawberry) being displayed with a contrast in size and location of the strawberry or the word "fresa." In addition, FIG. 35 illustrates screenshot 3500 showing the statement of information (e.g., "the right to vote is a fundamental right") being displayed without a contrast in size and location. FIG. 36 illustrates screenshot 3600 showing the statement of information (e.g., "the right to vote is a fundamental right") being displayed with a contrast in size and location of the letters and words of the statement of information. FIG. 37 illustrates screenshot 3700 showing the statement of information (e.g., "the right to vote is a fundamental right") being displayed within different shapes and having different colors of text and background.

In some embodiments, the contrast principle can also include the motionless to movement principle. In the motionless to movement principle, the statement of information may be displayed in the passive learning environment (e.g., in an obstacle or on a building in the background, etc.) initially as being motionless, then the statement of information may begin to move around the passive learning environment. The hardware platform can change the statement of information from motionless to moving, and vice versa. The statement of information may become more memorable because the user may naturally pay attention to the statement of information due to the movement of the statement of information. Similarly, the moving statement of information principle may be represented by a statement of information that is moving all the time.

Figure 38:
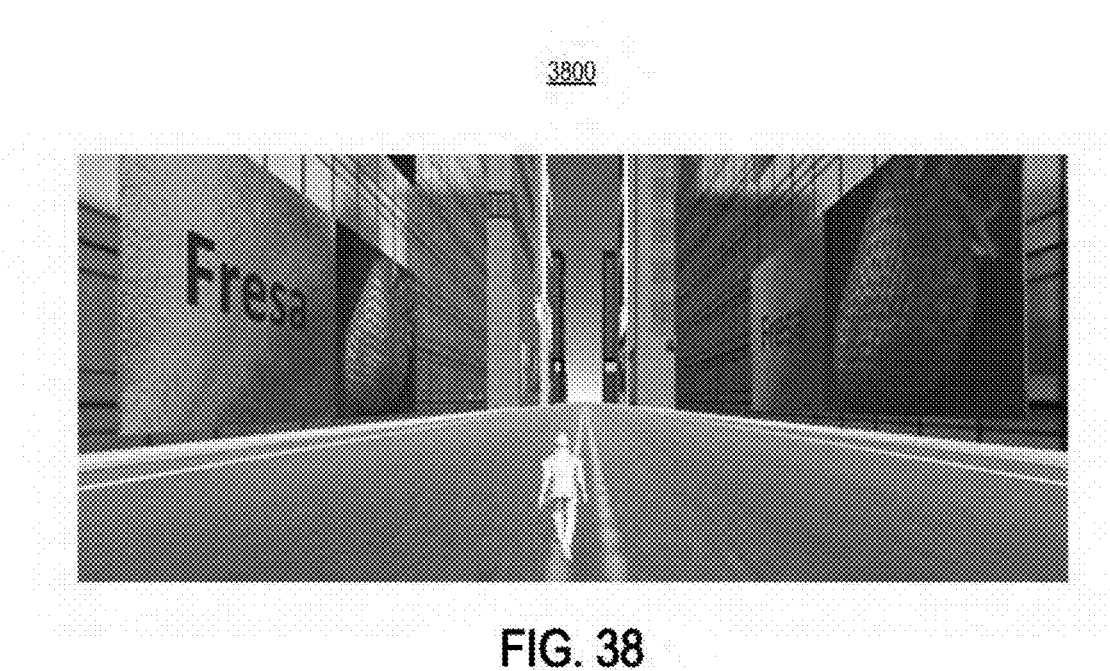
FIG. 38 is an example of a screenshot, displayed by a memorization system, illustrating a statement of information displayed according to the peripheral statement of information principle.

FIG. 38 illustrates an example screenshot of a passive learning environment displayed by the hardware platform, according to the peripheral statement of information principle. For example, screenshot 3800 illustrates the statement of information being displayed at a peripheral position of the passive learning environment (e.g., on the buildings in the background), rather than in an obstacle directly in front of the controllable object.

Figure 39:
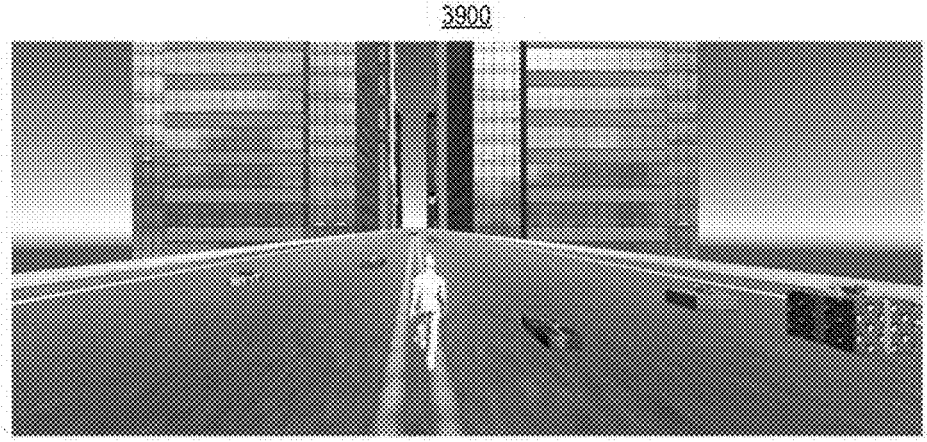
FIG. 39 is an example of a screenshot, displayed by a memorization system, illustrating a statement of information displayed according to the gifted statement of information principle.
Figure 40:
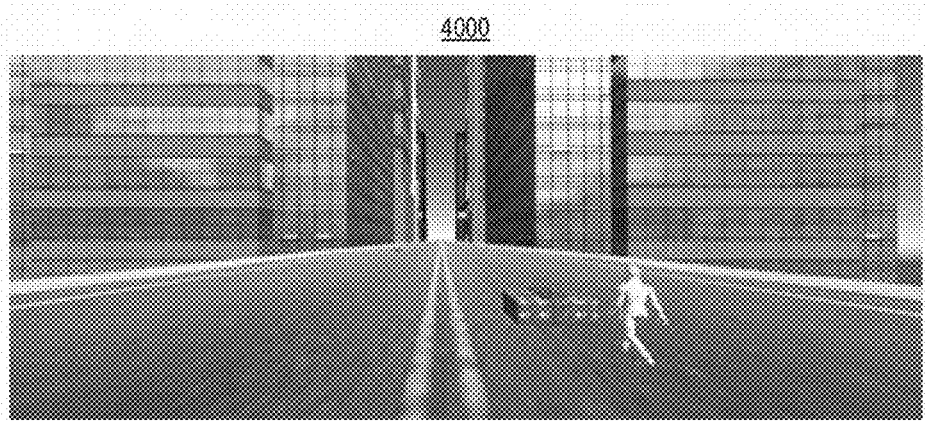
FIG. 40 is another example of a screenshot, displayed by a memorization system, illustrating a statement of information displayed according to the gifted statement of information principle.
Figure 41:
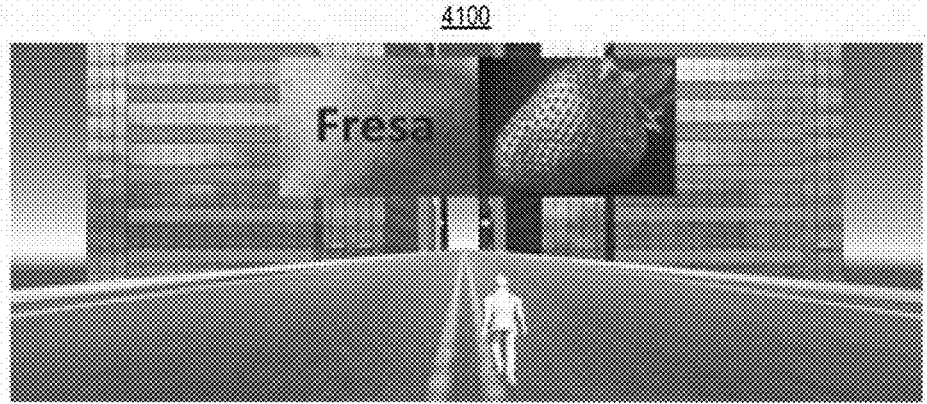
FIG. 41 is another example of a screenshot, displayed by a memorization system, illustrating a statement of information displayed according to the gifted statement of information principle.

FIGS. 39-41 illustrate an example screenshot of a passive learning environment displayed by the hardware platform, according to the gifted statement of information principle. For example, screenshot 3900 illustrates objects in the form of gift boxes. The gift boxes include statements of information. The hardware platform displays the statement of information as being released from the gift box when the hardware platform receives an input of controlling the controllable object to pass through or touch the gift boxes (or by other indirect means, such as shooting the gift box). The gifted statement of information can be in any form (picture, voices, text, etc.). Gift boxes can be any shape, size, and color, and can appear in different locations. Every gift box may include one different statement of information. For example, screenshot 4000 illustrates the controllable object approaching a gift box and screenshot 4100 illustrates the statement of information after being released from the gift box.

This gifted statement of information can relate to either new subject matter that has not yet tested or repeated subject matter that appeared previously. The hardware platform may facilitate an enhanced memorization experience because the user may pay more attention to the gifted statement of information.

In some embodiments, the hardware platform can display statements of information in a passive learning environment, according to the sudden statement of information principle and flashing statement of information principle. In the sudden statement of information principle, the hardware platform can display the statement of information suddenly to surprise the user. In the flashing statement of information principle, the hardware platform may display the statement of information in a flashing manner. For example, the statement of information can flash letter by letter or word by word, or both.

Figure 42:
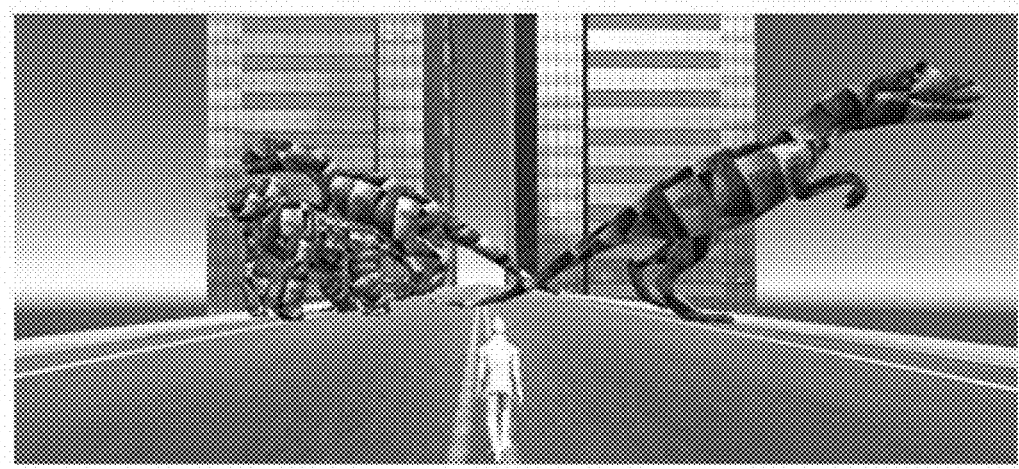
FIG. 42 is an example of a screenshot, displayed by a memorization system, illustrating a statement of information displayed according to the out-of-place principle.
Figure 43:
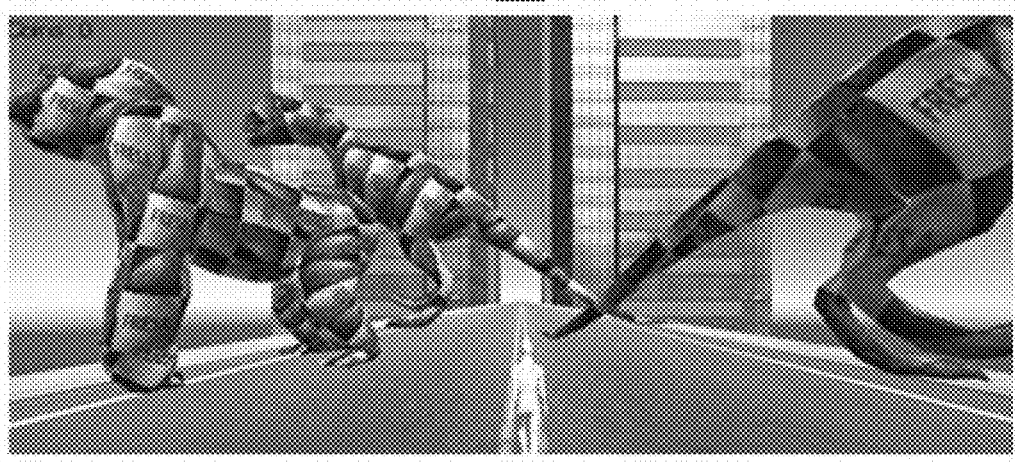
FIG. 43 is another example of a screenshot, displayed by a memorization system, illustrating a statement of information displayed according to the out-of-place principle.
Figure 44:
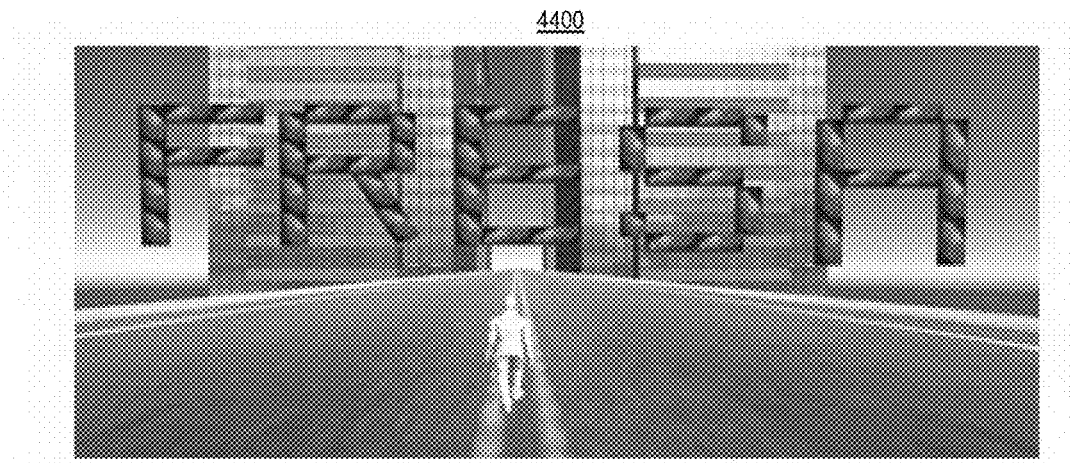
FIG. 44 is an example of a screenshot, displayed by a memorization system, illustrating a statement of information displayed according to the shapes representing the statement of information principle.
Figure 45:
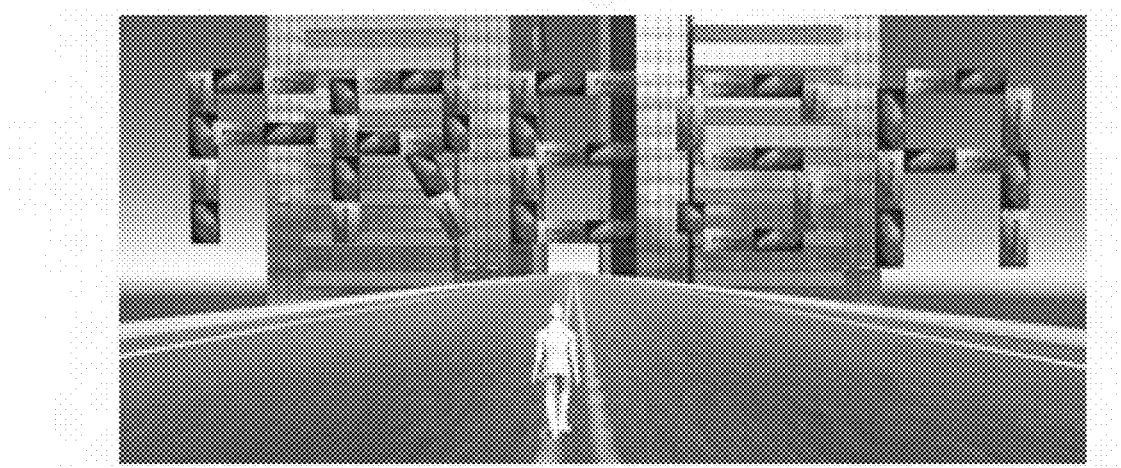
FIG. 45 is another example of a screenshot, displayed by a memorization system, illustrating a statement of information displayed according to the shapes representing the statement of information principle.
Figure 46:
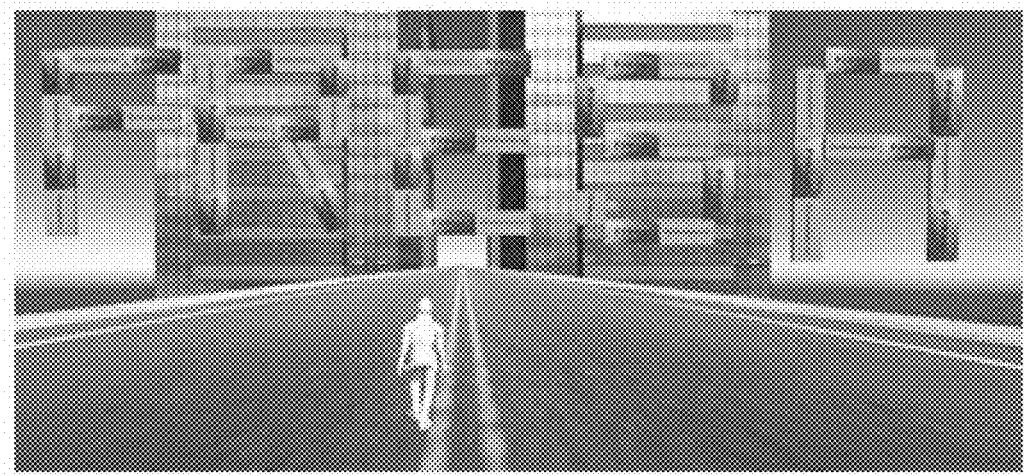
FIG. 46 is another example of a screenshot, displayed by a memorization system, illustrating a statement of information displayed according to the shapes representing the statement of information principle.
Figure 47:
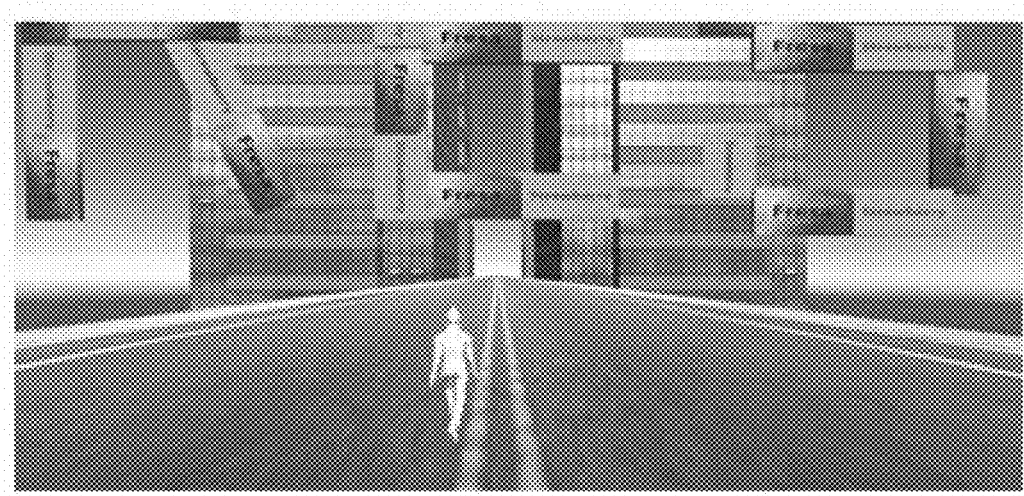
FIG. 47 is another example of a screenshot, displayed by a memorization system, illustrating a statement of information displayed according to the shapes representing the statement of information principle.

FIGS. 42-43 illustrate example screenshots of a statement of information in a passive learning environment displayed by the hardware platform, according to the out-of-place principle. The out-of-place principle refers to the theory that information presented on an object that is unusual to a particular scene may be more memorable. For example, screenshot 4200 illustrates the controllable object approaching representations of dinosaurs and gorillas. Further, screenshot 4300 illustrates the statement of information (e.g., "fresa") displayed on the dinosaurs and gorillas.

FIGS. 44-47 illustrate example screenshots of a statement of information in a passive learning environment displayed by the hardware platform, according to the shapes representing the statement of information principle. In the shapes representing statements of information principle, the statement of information is represented using shapes (e.g., blocks), such that each block includes the statement of information (or a related statement of information). For example, screenshot 4400 illustrates the statement of information "fresa" represented by blocks including an image of a strawberry ("fresa" is the Spanish translation of the word strawberry). Screenshots 4500 through 4700 illustrate the statement of information "fresa" represented by two types of blocks, one type of block including an image of a strawberry and the other type of block including text of the word "fresa."

Figure 48:
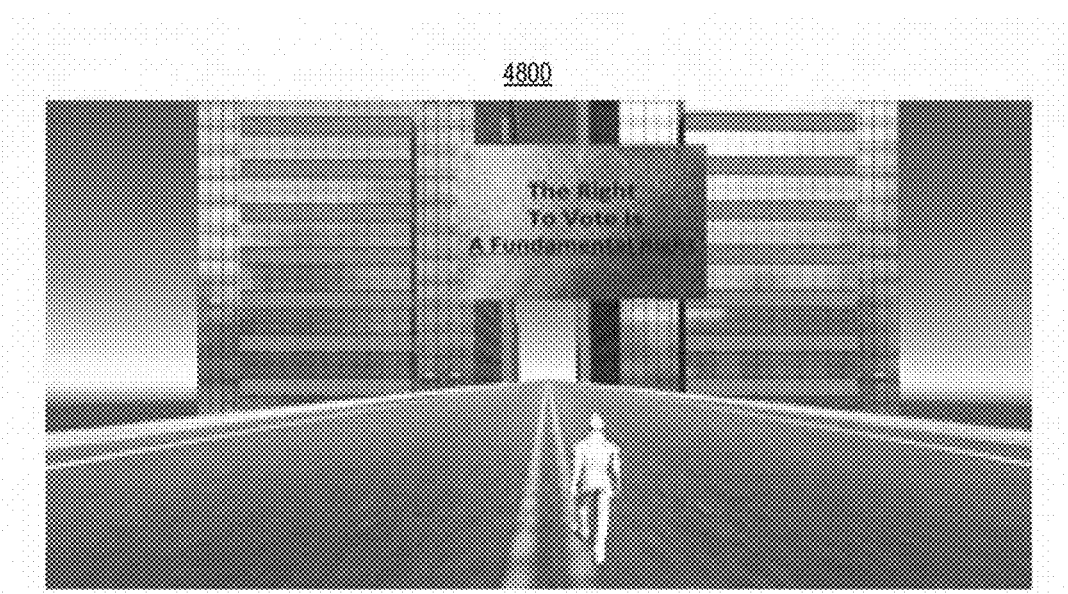
FIG. 48 is an example of a screenshot, displayed by a memorization system, illustrating a statement of information displayed according to the stressing the substantive part principle.
Figure 49:
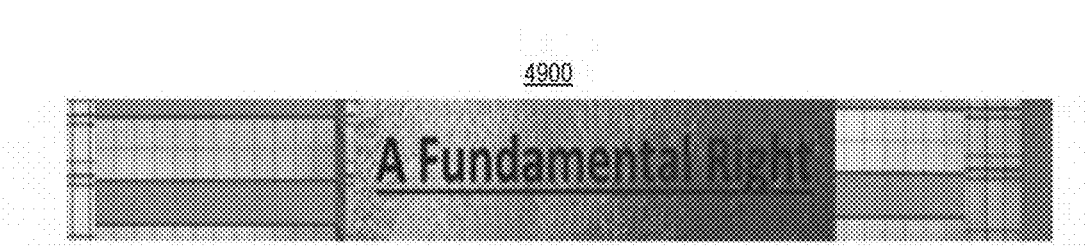
FIG. 49 is another example of a screenshot, displayed by a memorization system, illustrating a statement of information displayed according to the stressing the substantive part principle.
Figure 50:
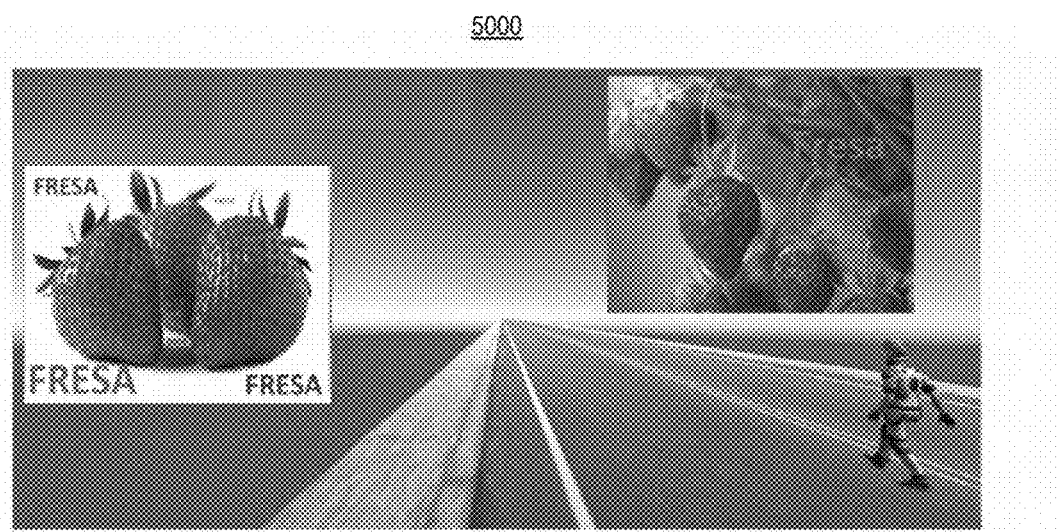
FIG. 50 is an example of a screenshot, displayed by a memorization system, illustrating a statement of information displayed according to the changing the focus principle.
Figure 51:
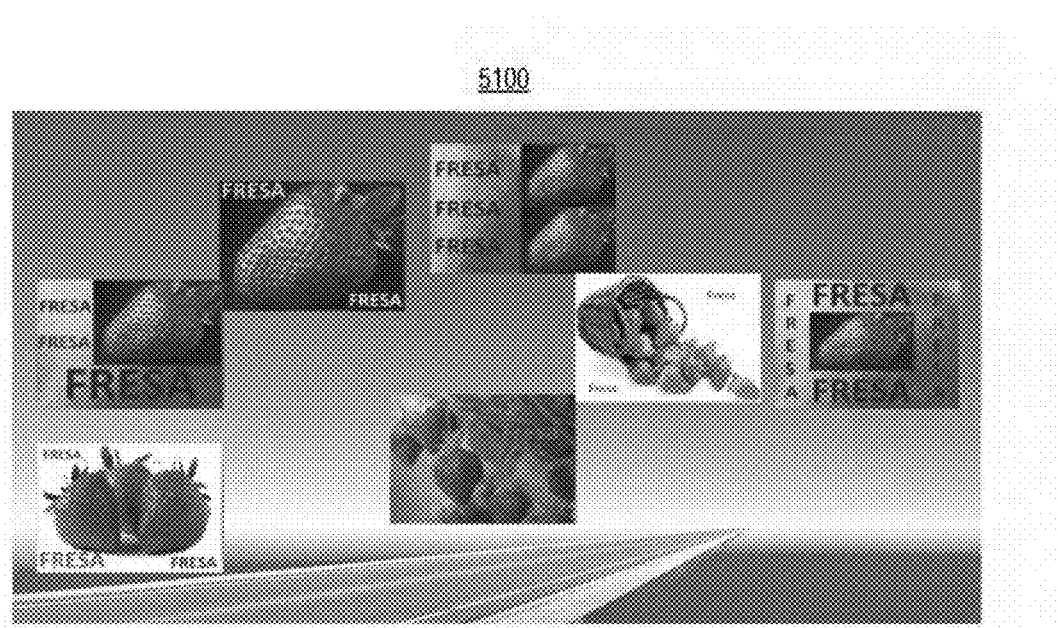
FIG. 51 is another example of a screenshot, displayed by a memorization system, illustrating a statement of information displayed according to the changing the focus principle.
Figure 52:
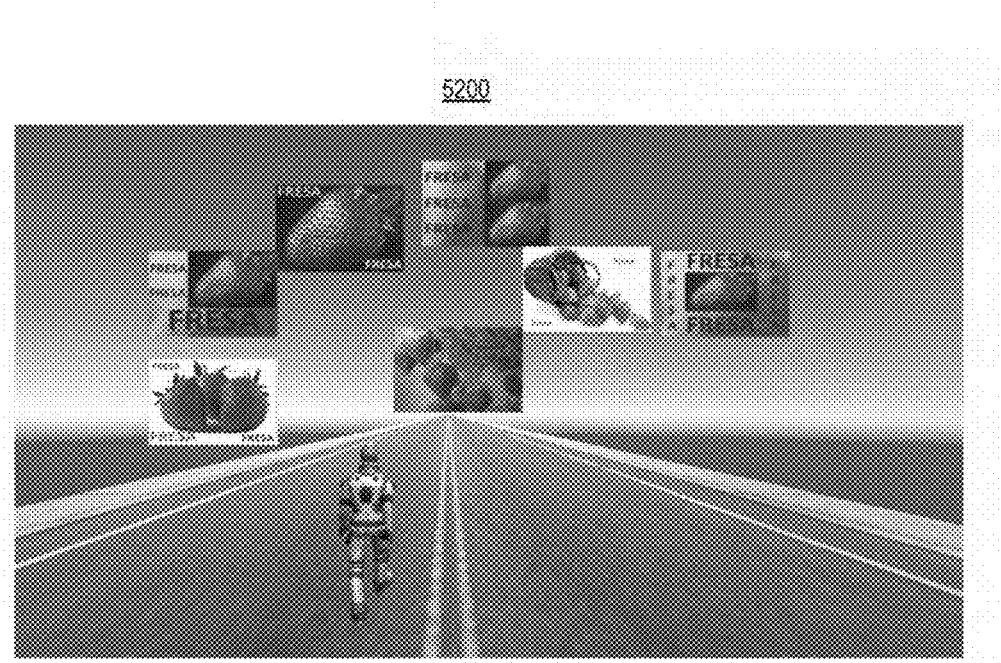
FIG. 52 is another example of a screenshot, displayed by a memorization system, illustrating a statement of information displayed according to the changing the focus principle.
Figure 53:
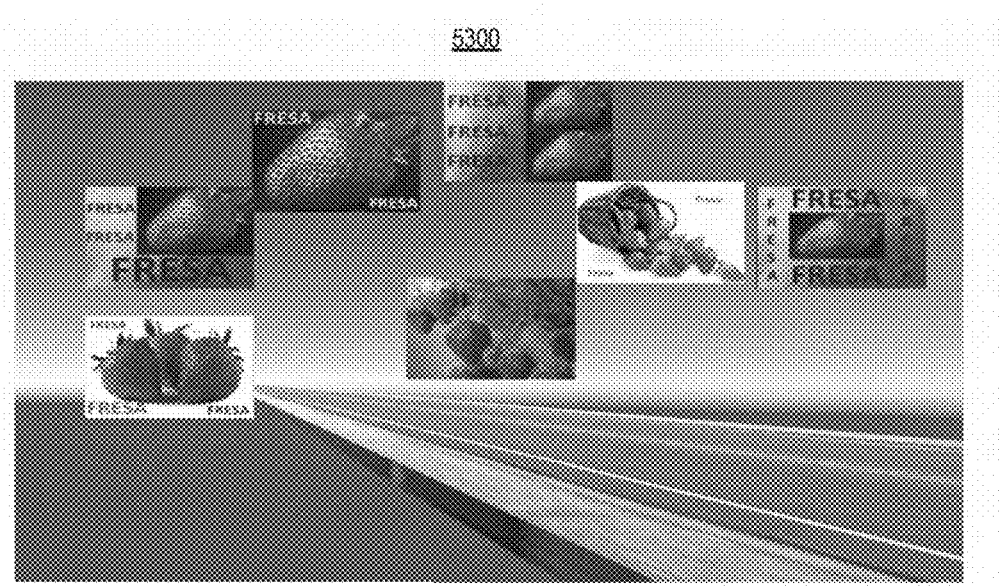
FIG. 53 is another example of a screenshot, displayed by a memorization system, illustrating a statement of information displayed according to the changing the focus principle.

FIGS. 48-49 illustrate example screenshots of a statement of information in a passive learning environment displayed by the hardware platform, according to the stressing the substantive part principle and the changing the picture focus principle. In the stressing the substantive part principle, the substantive part of the statement of information can be stressed or emphasized by the hardware platform. For example, the hardware platform can emphasize the substantive part of the statement of information by emphasizing a voice speaking the substantive part of the statement of information (e.g., a voice outputted by the speaker can emphasize the word "fundamental right" as shown in FIG. 48). In addition, in the changing the picture focus principle, the camera view can be changed to focus on the substantive part of the statement of information while the voice is speaking the substantive part of the statement of information. Screenshot 4900 illustrates the camera view focusing on the word "fundamental right." The voice can also speak the entire statement of information.

FIGS. 50-53 illustrate example screenshots of a statement of information in a passive learning environment displayed by the hardware platform, according to the changing the camera focus principle. Changing the camera focus principle can refer to the theory that frequently changing the focus or camera angle of the statement of information presented in the learning environment may make the statement of information more memorable. Screenshots 5000 through 5300 illustrate the different camera angles and different presentations of the statement of information "fresa" (the Spanish word for strawberry).

The changing the camera focus principle can include a general focus on the whole statement of information from different camera positions. When different voices are outputted, the outputted voices can speak the entire statement of information in the same manner. Further, the stressing the substantive part principle can include focusing the camera angle on the substantive part of the statement of information when the whole statement of information is presented. When different voices are outputted, the tone of the outputted voice can change when speaking the substantive part of the statement of information.

Figure 54:
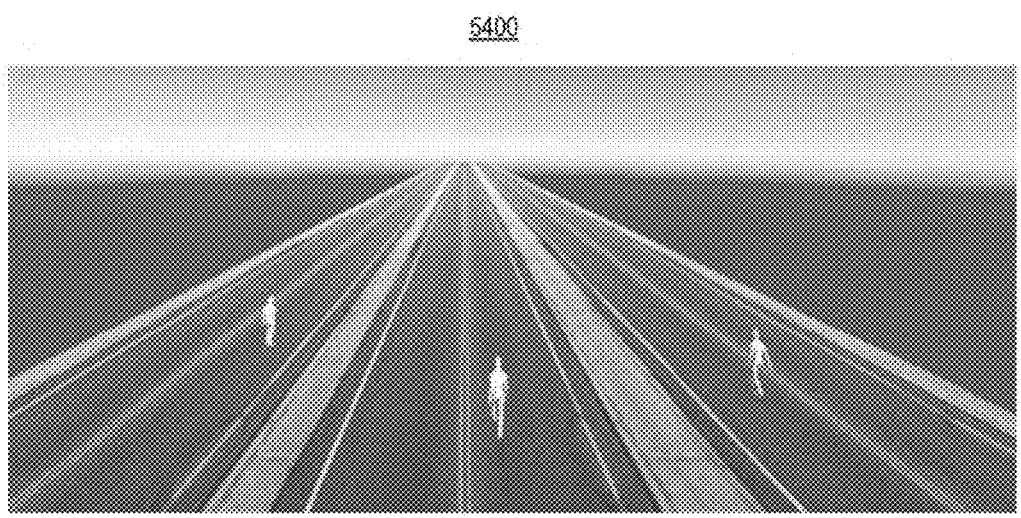
FIG. 54 is an example of a screenshot, displayed by a memorization system, illustrating a statement of information displayed according to the competition principle.

FIG. 54 illustrates an example screenshot of a passive learning environment displayed by the hardware platform, according to the competition principle. The competition principle refers to the theory that information may be more memorable when it presented in the context of a competition with other users. The competition principle can include a general competition; a special team competition; a competition based on geographical locations, age, educational subjects, and levels; and educational gambling. The competition principle can provide the energy and motivation for users to learn and memorize to compete against other users. Screenshot 5400 illustrates a learning environment displayed by the hardware platform according to the competition principle. The hardware platform can display the active learning environment or the passive learning environment according to the competition principle.

In the general competition principle, the users can compete against each other with respect to memorizing an educational subject. Each user can choose an avatar. Further, the avatar can run infinitely on a similar path that includes the same statement of information in the same order as the other competitors. Each user can see the user's own controllable object and may not see other users' avatars. Further, the hardware platform can output a representation of the user losing the game if the user input corresponds to an incorrect action or after a predetermined number of wrong decisions. The competition can be for a period of time and the penalty for the user making wrong decisions can be restarting the game from a previous position. The competition can also be broadcasted to an audience so the audience can learn with the competing users. The special teams competition can be an online (or local network) competition where the user may join with other users as a team that may compete with other teams. If a member of any team loses the game, the whole team of that member may lose the game. The competition based on geographical locations, age, educational subjects, and levels can be a competition in which users whose geographical locations are within certain boundaries can participate (e.g., competition to memorize SAT words among all users within the Washington, D.C. area). The hardware platform can facilitate a competition of users in large or small geographical areas and at different times. The competition can also be based on age or educational subject matter. The educational gambling competition can be a competition managed and facilitated by the hardware platform that enables users to pay a fee to enter a competition.

The top winner or the top few winners may win a certain amount of the total earnings of the competition.

Figure 55:
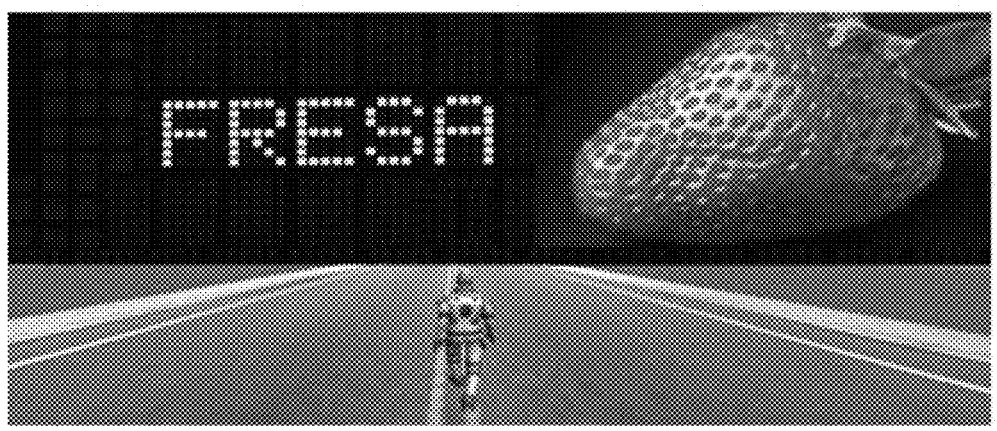
FIG. 55 is an example of a screenshot, displayed by a memorization system, illustrating a statement of information displayed according to the lighting principle.

FIG. 55 illustrates an example screenshot of a passive learning environment displayed by the hardware platform, according to the lighting principle. The lighting principle can refer to the theory that presenting a statement of information appearing as light against a dark background may make the statement of information more memorable. Screenshot 5500 illustrates the statement of information "fresa" and an image of a strawberry appearing as light against a dark background.

Figure 56:
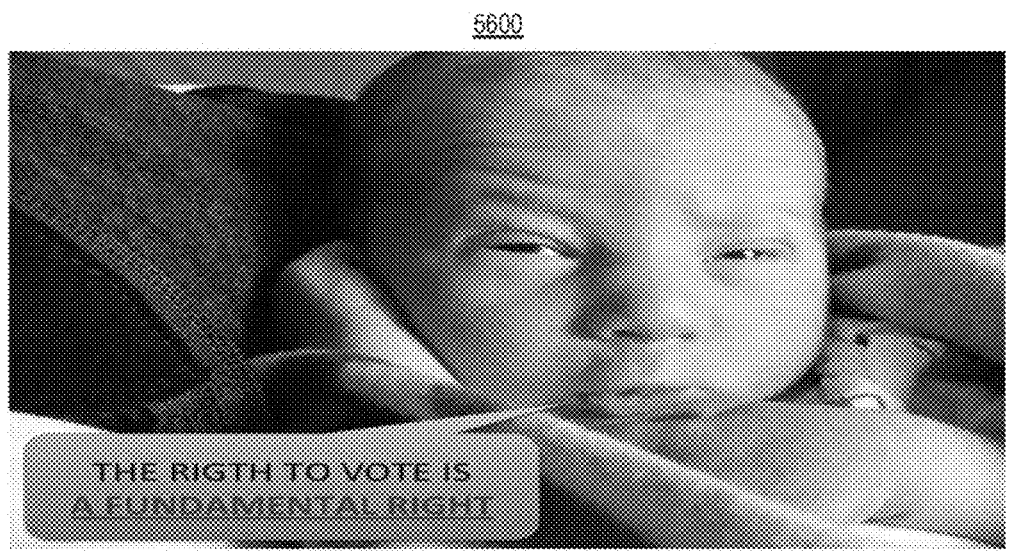
FIG. 56 is an example of a screenshot, displayed by a memorization system, illustrating a statement of information displayed according to the humor principle.

FIG. 56 illustrates an example screenshot of a passive learning environment displayed by the hardware platform, according to the humor principle. The humor principle can refer to the theory that presenting a statement of information in a humoristic context can make the statement of information more memorable. Screenshot 5600 illustrates a statement of information (e.g., "the right to vote is a fundamental right) associated with a humoristic image.

Figure 57:
FIG. 57 is an example of a screenshot, displayed by a memorization system, illustrating a statement of information displayed according to the sexual hint principle.

FIG. 57 illustrates an example screenshot of a passive learning environment displayed by the hardware platform, according to the sexual hint principle. The sexual hint principle can refer to the theory that a statement of information can be more memorable if it is associated with an image having a characteristic of sexual appeal. For example, screenshot 5700 illustrates a statement of information (e.g., "adverse possession must be notorious") associated with an image having sexual appeal.

Figure 58:
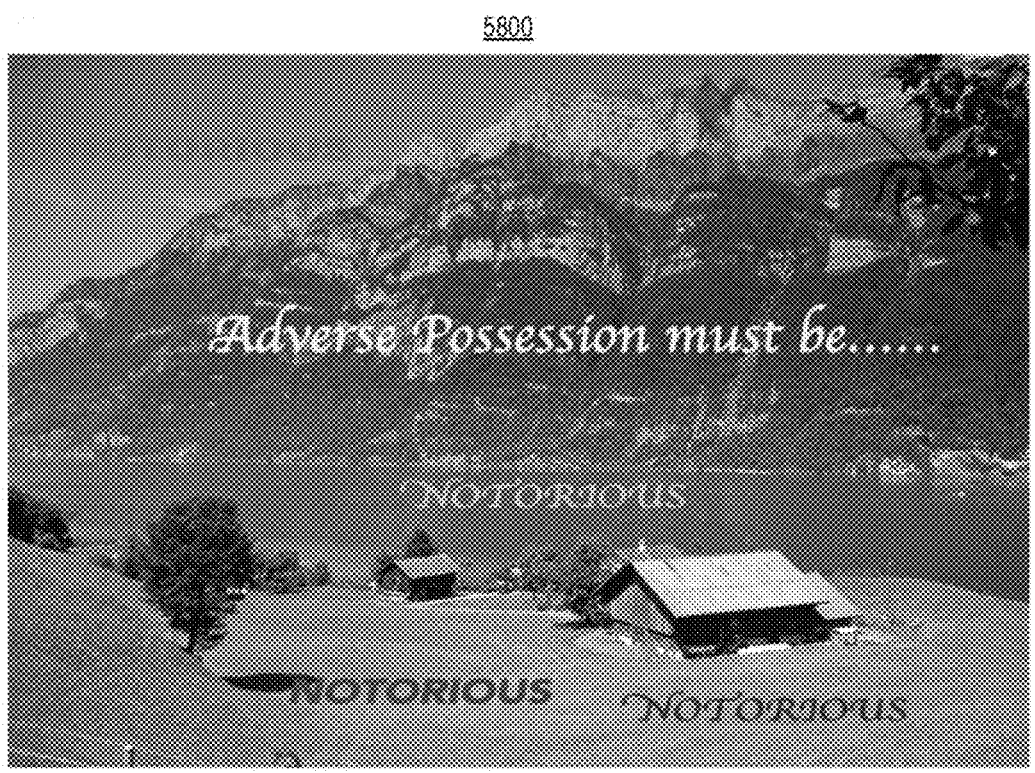
FIG. 58 is an example of a screenshot, displayed by a memorization system, illustrating a statement of information displayed according to the beauty principle.

FIG. 58 illustrates an example screenshot of a passive learning environment displayed by the hardware platform, according to the beauty principle. The beauty principle can refer to the theory that a statement of information is more memorable when it is presented in association with an image having a characteristic of beauty (e.g., nature, animals, people, etc.). For example, screenshot 5800 illustrates a statement of information (e.g., "adverse possession must be notorious") associated with an image of natural beauty (e.g., a lake and a waterfall).

Figure 59:
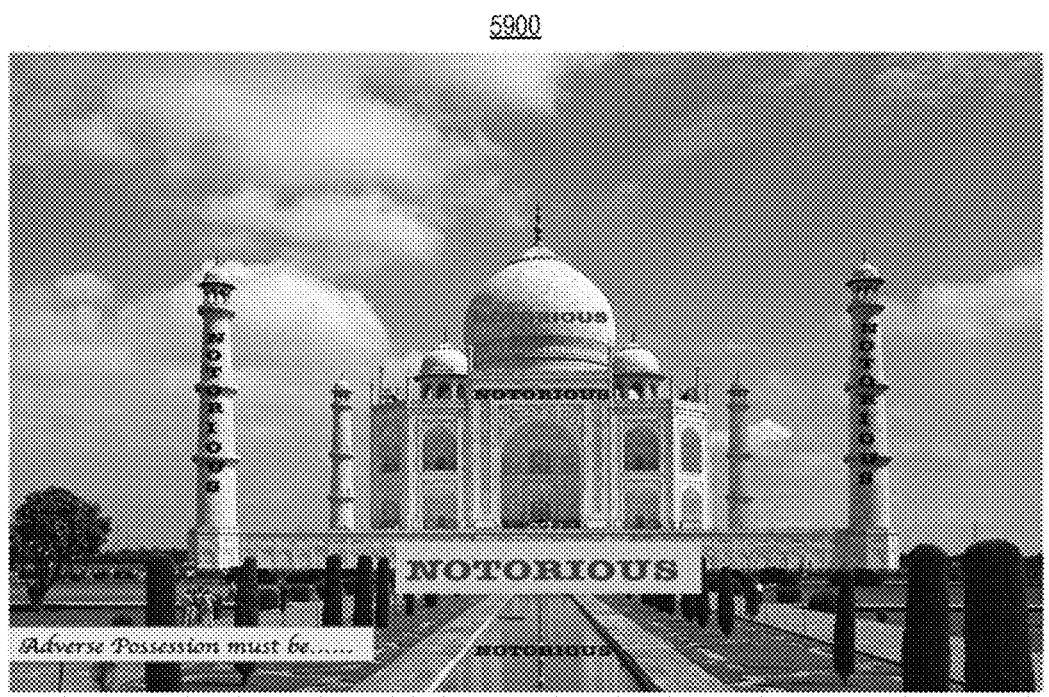
FIG. 59 is an example of a screenshot, displayed by a memorization system, illustrating a statement of information displayed according to the fame principle.

FIG. 59 illustrates an example screenshot of a passive learning environment displayed by the hardware platform, according to the fame principle. The fame principle can refer to the theory that a statement of information can be more memorable if it is associated with an image of a famous or well-known object or person. For example, screenshot 5900 illustrates a statement of information (e.g., "adverse possession must be notorious") associated with an image of the Taj Mahal.

Figure 60:
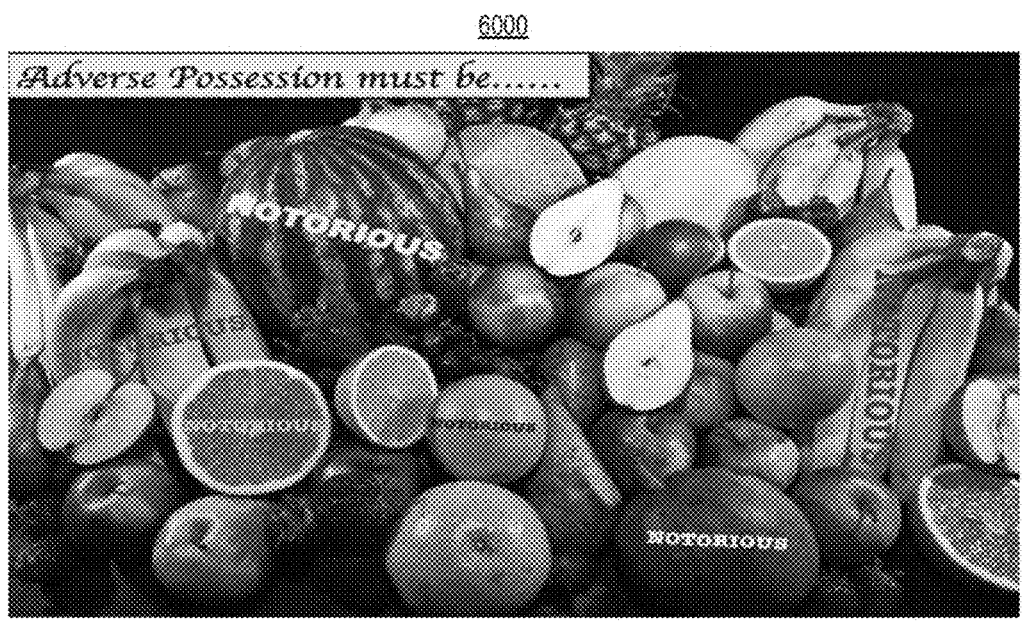
FIG. 60 is an example of a screenshot, displayed by a memorization system, illustrating a statement of information displayed according to the delicious-food principle.

FIG. 60 illustrates an example screenshot of a passive learning environment displayed by the hardware platform, according to the delicious-food principle. The delicious-food principle can refer to the theory that a statement of information can be more memorable if it is associated with an image of delicious food. For example, screenshot 6000 illustrates a statement of information (e.g., "adverse possession must be notorious") associated with an image of delicious food.

Figure 61:
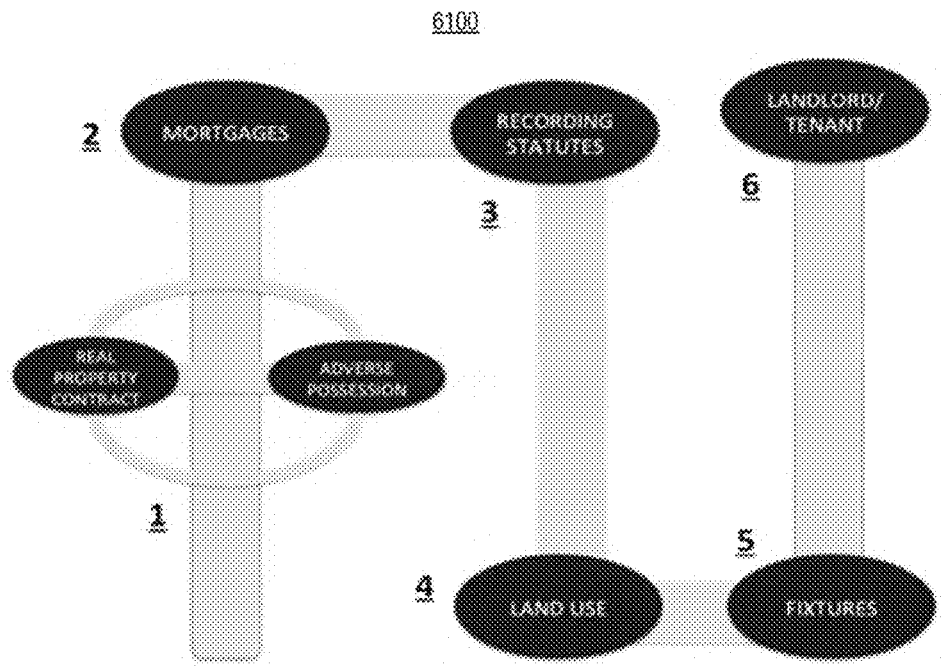
FIG. 61 is an example of a screenshot, displayed by a memorization system, illustrating a map selection feature of a learning environment.
Figure 62:
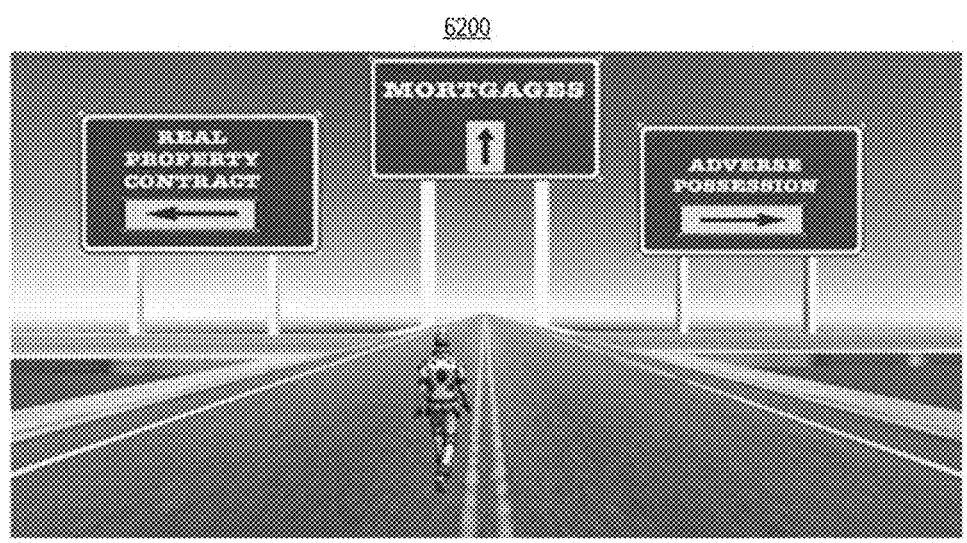
FIG. 62 is another example of a screenshot, displayed by a memorization system, illustrating a map selection feature of a learning environment.

FIGS. 61-62 illustrate screenshots of a map selection feature displayed by the hardware platform. The hardware platform can present one or more options to the user for proceeding in the learning environment. For example, in FIG. 61 (screenshot 6100), the hardware platform can display a map of the subject matter to be memorized before starting the learning environment. Further, the hardware platform can receive an input from the user selecting a path of the map. FIG. 62 (screenshot 6200) illustrates options presented to the user for continuing in the memorization environment.

Figure 63:
FIG. 63 is an example of a screenshot, displayed by a memorization system, illustrating a learning environment for developing listening skills.

In some embodiments, the hardware platform can be used to develop the user's listening skills. For example, FIG. 63 illustrates screenshot 6300 of a memorization environment where the hardware platform displays a statement of information in an obstacle (e.g., "platano") and outputs a sound corresponding to the text of the statement of information. For example, the hardware platform can display the word "platano" and output an audio signal corresponding to the exact pronunciation of the word "platano". The user may determine if the outputted sound matches the text of the statement of information. The user can transmit an input signal accordingly for the hardware platform to analyze. The hardware platform can determine whether the received input corresponds to a correct action. The user can enhance his or her listening skills using the hardware platform.

Figure 64:
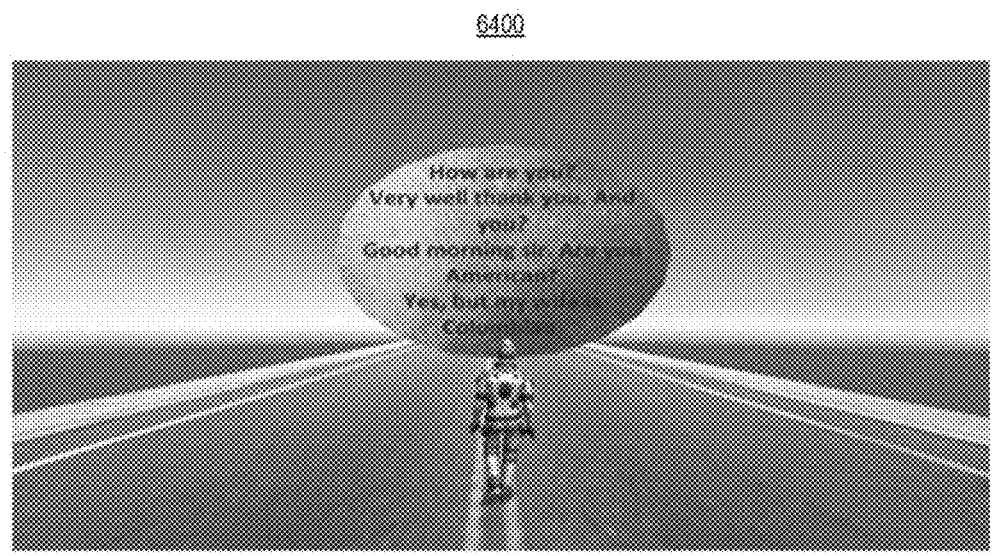
FIG. 64 is an example of a screenshot, displayed by a memorization system, illustrating a learning environment for developing reading comprehension skills.
Figure 65:
FIG. 65 is another example of a screenshot, displayed by a memorization system, illustrating a learning environment for developing reading comprehension skills.

In some embodiments, the hardware platform can be used to develop the user's reading comprehension skills. For example, FIGS. 64-65 illustrate screenshots 6400 and 6500 of obstacles including text in English and in Spanish. The user may read the English text (as shown in FIG. 64) and determine if the Spanish text (as shown in FIG. 65) is a match. The hardware platform can receive user input of avoiding the obstacle of FIG. 65 or passing through the obstacle of FIG. 65 based on whether the text of FIG. 65 is a correct translation of the text of FIG. 64. The hardware platform can be used to develop reading comprehension in the same language, as well (e.g., text in first obstacle and in second obstacle can be in English). In addition, the hardware platform can be used for reading books.

Figure 66:
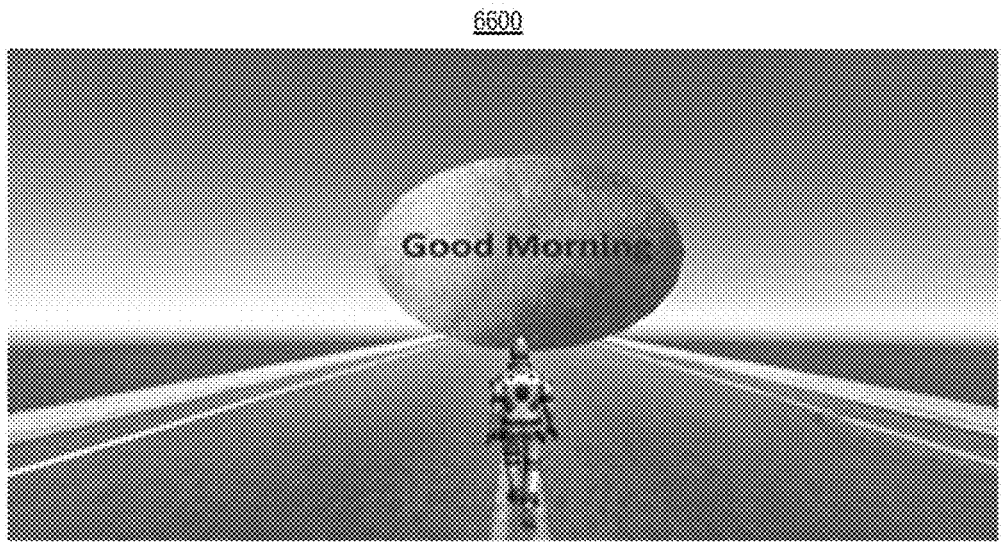
FIG. 66 is an example of a screenshot, displayed by a memorization system, illustrating a learning environment for developing speaking skills.
Figure 67:
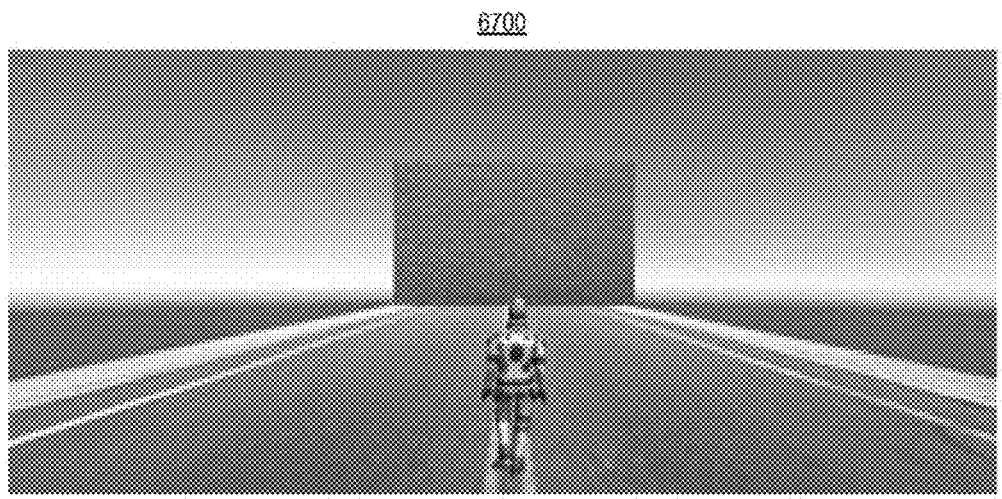
FIG. 67 is another example of a screenshot, displayed by a memorization system, illustrating a learning environment for developing speaking skills.

In some embodiments, the hardware platform can be used to develop the user's pronunciation skills. For example, FIGS. 66-67 illustrate example screenshots displayed by the hardware platform. The hardware platform can initially display text within an obstacle and subsequently prompt a user to speak the text. For example, in screenshot 6600, the hardware platform displays the text "Good morning" in an obstacle. The hardware platform can move the controllable object to pass through or avoid the obstacle in screenshot 6600 without penalty, according to user input. In screenshot 6700, the hardware platform can display a prompt for the user to speak the words of the text displayed in the previous obstacle (e.g., "Good morning") in FIG. 66. The hardware platform can listen for the user's spoken words and determine whether the received audio input from the user matches the text of "Good morning." If the received audio input matches the text, then the hardware platform can determine that the user input corresponds to a correct action. Otherwise, the hardware platform can determine that the user input corresponds to an incorrect action.

Figure 68:
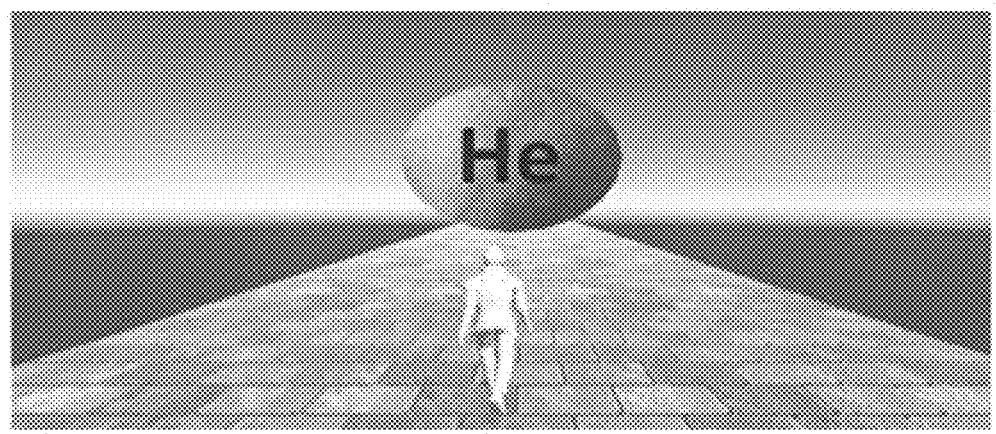
FIG. 68 is an example of a screenshot, displayed by a memorization system, illustrating a learning environment for developing grammar skills.
Figure 69:
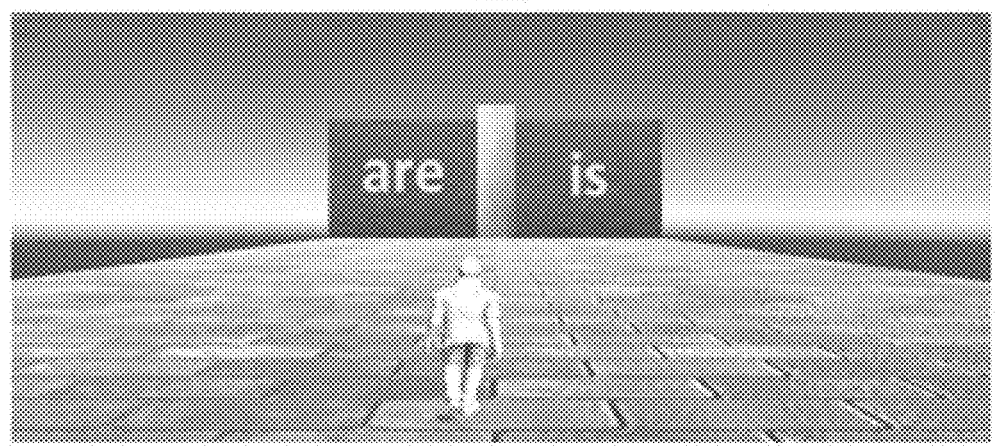
FIG. 69 is another example of a screenshot, displayed by a memorization system, illustrating a learning environment for developing grammar skills.

FIGS. 68-69 illustrate example screenshots displayed by the hardware platform displaying a learning environment for developing grammar skills. For example, in FIGS. 68-69, the hardware platform can display the text "He" in the obstacle of screenshot 6800 and the text "are" and "is" in the subsequently presented obstacle of screenshot 6900. The user may make a binary decision as to whether the correct word after the word "He" is "are" or "is" based on rules of English grammar. The hardware platform can receive user input corresponding to the user's binary decision to determine whether the input corresponds to a correct action or an incorrect action. The hardware platform can test English grammar (or grammar in any language) at any level (basic, intermediate, or advanced).

In some embodiments, the hardware platform can be used to develop the user's writing and typing skills. For example, the hardware platform can display a first object including a statement of information (e.g., "Buenos Dias"). The hardware platform can later display a prompt for the user to handwrite the text included in the first object. The hardware platform can receive a signal corresponding to the user's handwritten strokes (e.g., inputted on a tablet device) and perform an analysis on the received input to determine if the user correctly handwrote the text. The hardware platform can also receive an input of typed letters from a keyboard.

In some embodiments, the hardware platform can output an audio signal corresponding to a statement of information (e.g., "fresa"). The hardware platform can then display a prompt for the user to handwrite the word corresponding to the outputted audio signal. For example, the hardware platform can receive an input corresponding to handwritten strokes of the word (e.g., inputted on a tablet device) and determine whether the received input matches the word.

In some embodiments, the hardware platform can be used to develop the user's practical knowledge. For example, the subject matter of the statements of information displayed by the hardware platform can relate to practical business tactics, self-help techniques, emotional or religious support techniques, etc. For example, a statement of information can be "The most important thing in innovation is the people you have" based on a quote from Steve Jobs. A false version of the statement of information can be "The most important thing to achieve in innovation is R&D money." As another example, the statements of information can relate to established standards of design derived by authority experts. For example, a statement of information (e.g., a picture of a design) can be displayed within an obstacle, and the user can transmit an input controlling the controllable object with respect to the obstacle based on whether the user believes the picture of the design satisfies the established standards. Again, the memorization system, according to examples described above, can facilitate the learning of any subject matter.

Figure 70:
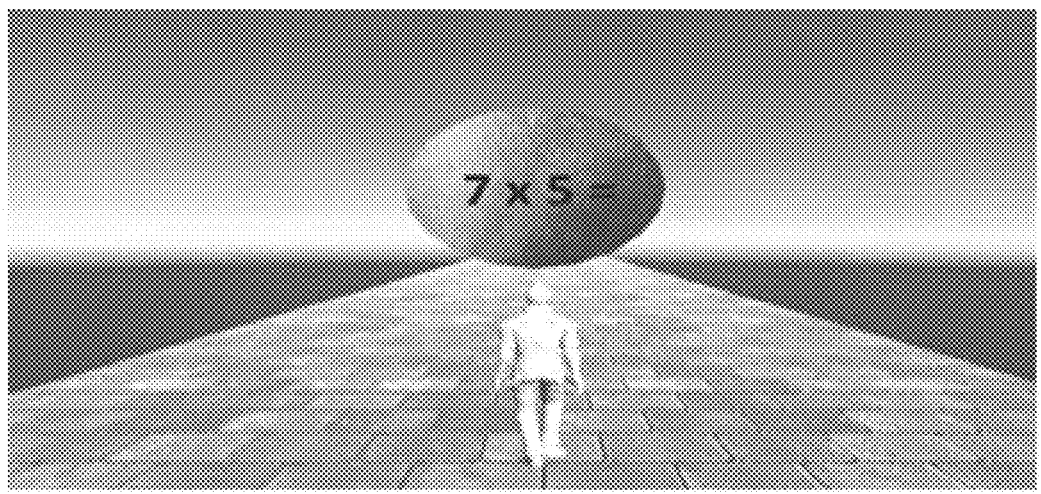
FIG. 70 is an example of a screenshot, displayed by a memorization system, illustrating a learning environment for developing mathematical skills.
Figure 71:
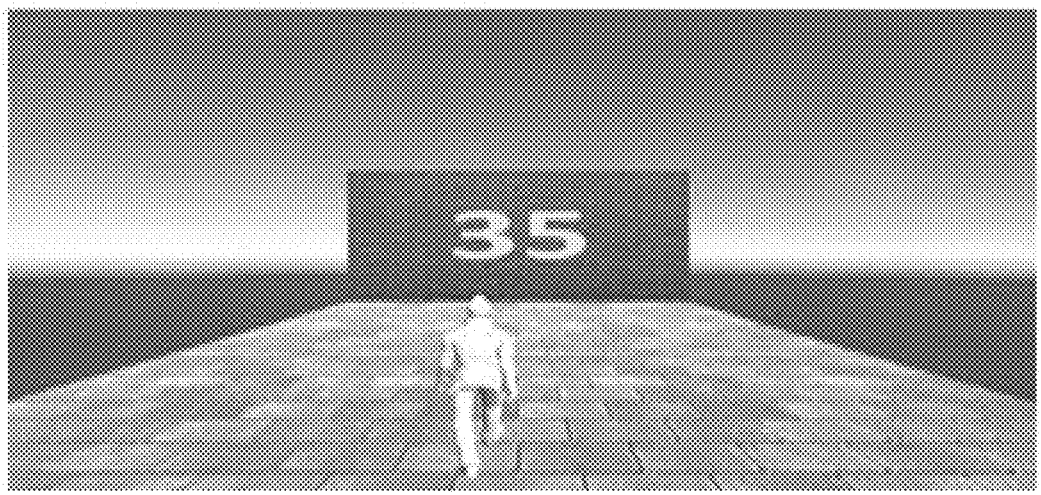
FIG. 71 is another example of a screenshot, displayed by a memorization system, illustrating a learning environment for developing mathematical skills.

FIGS. 70-71 illustrate example screenshots displayed by the hardware platform displaying a learning environment for developing mathematical skills. For example, screenshot 7000 illustrates a first object including a mathematical equation without the answer. The controllable object can be controlled to pass through or avoid the first object without penalty. Screenshot 7100 illustrates a second object including a number. If the number in the second object is the answer to the mathematical equation in the first object, then the correct action would be to pass through the second object. In this case, avoiding the second object would be the incorrect action.

Figure 72:
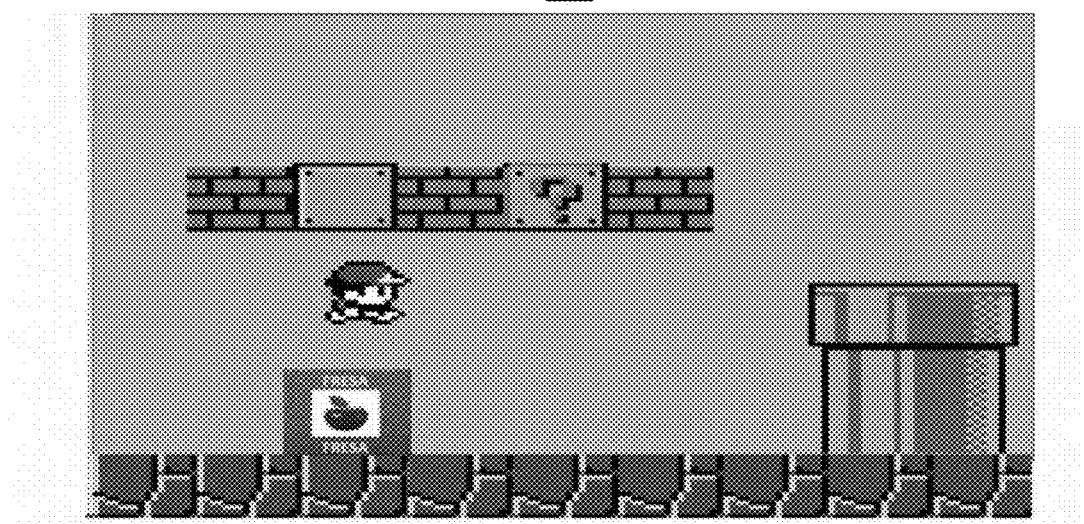
FIG. 72 is an example of a screenshot, displayed by a memorization system, illustrating a learning environment in two-dimensions.

FIG. 72 illustrates an example screenshot of an active learning environment displayed by the hardware platform using 2D images. In screenshot 7200, the statement of information included in the obstacle is false because "fresa" is a strawberry, not an apple. In this example, the correct action would be to avoid the obstacle, and the incorrect action would be to pass through the obstacle.

One skilled in the art will realize the invention can be embodied in other specific forms without departing from the spirit or essential characteristics thereof. The foregoing embodiments are therefore to be considered in all respects illustrative rather than limiting of the invention described above. Scope of the invention is thus indicated by the appended claims, rather than by the foregoing description, and all changes that come within the meaning and range of equivalency of the claims are therefore intended to be embraced therein.

What is claimed:

1. A method comprising:
    outputting, at a user device, an image sequence that forms an environment to facilitate memorization;
    displaying a controllable object in the image sequence as moving along a path;
    controlling a position of the controllable object within each image of the image sequence, based on an input received from a user operating the user device;
    presenting an item object in the image sequence as an obstacle in the path to block the controllable object, the item object comprising a representation of a prompt that is correct or incorrect or incomplete; the item object including a first item object and a second item object, the first item object including first content displayed at a first time and the second item object including second content displayed at a second time, the first time being earlier than the second time;
    displaying the first content within the first item object, wherein the first content includes one of an image or text or audio;
    displaying the second content within the second item object, wherein the second content includes a plurality of images, wherein one image of the plurality of images and the first content correspond to a match, and remaining images of the plurality of images and the first content correspond to a mismatch;
    receiving the user input,
    outputting a negative image representing a negative indicator in response to the user input making a decision corresponding to an incorrect action with respect to the prompt or outputting a positive image representing a positive indicator in response to the user input making a decision corresponding to a correct action with respect to the prompt; and
    outputting an additional environment to facilitate memorization, wherein the additional environment includes information suitable for memorization presented according to whether the positive image or the negative image is outputted.

2. The method of claim 1, wherein the prompt includes at least one image or text or audio associated with information suitable for memorization.

3. The method of claim 2, wherein the outputting the positive image comprises:
    receiving the input;
    analyzing the input;
    determining that the controllable object passes through the item object based on the analysis; and
    outputting the positive image in response to receiving the input.

4. The method of claim 2, wherein the outputting the positive image comprises:
    receiving the input;
    analyzing the input;
    determining that the controllable object avoids the item object based on the analysis; and
    outputting the positive image in response to receiving the input.

5. The method of claim 2, wherein the item object includes one or more item objects, each item object presented in the path of the controllable object at differing times, and each item object including text or at least one image associated with information suitable for memorization, and
    wherein a first item object of the one or more item objects is associated with a second item object of the one or more item objects, such that a relationship between the first item object and the second item object corresponds to one of a match or a mismatch.

6. The method of claim 5, further comprising:
displaying the controllable object as moving in a direction towards the second item object, the first item object and the second item object corresponding to a match;
receiving the input;
comparing the input with relationship data;
determining that the input corresponds to the correct action based on the comparing; and
outputting the positive image in response to receiving the input.

7. The method of claim 5, further comprising:
displaying the controllable object as moving in a direction towards the second item object, the first item object and the second item object corresponding to a mismatch;
receiving the input;
comparing the input with relationship data;
determining that the input corresponds to the incorrect action based on the comparing;
and
outputting the negative image in response to receiving the input.

8. The method of claim 1, further comprising:
outputting a first audio signal associated with the negative image representing the negative indicator in response to the user input making a decision corresponding to the incorrect action, and
outputting a second audio signal associated with the positive image representing the positive indicator in response to the user input making a decision corresponding to the correct action.

9. The method of claim 8, wherein the first audio signal includes a plurality of audio signals, such that each audio signal of the plurality of audio signals has a unique characteristic.

10. The method of claim 1, wherein the item object includes a first item object and a second item object, the first item object including first content displayed at a first time and the second item object including second content displayed at a second time, the first time being earlier than the second time, and wherein the first content and the second content correspond to one of a match or a mismatch.

11. The method of claim 10, wherein the first item object has a first shape and the second item object has a second shape, such that the first shape and the second shape are different.

12. The method of claim 1, wherein the first content includes one of an image or text or audio and the second content includes the other of the image or the text or audio.

13. The method of claim 1, wherein the first content includes an image or text or audio and the second content includes a visual prompt requesting an audio input or a handwritten stroke input or a typing stroke input from the user.

14. The method of claim 1, further comprising:
displaying a first content within the first item object, wherein the first content includes one of an image or text;
displaying the second content within a second item object, wherein the second content includes a plurality of images, such that one image of the plurality of images and the first content correspond to a match, and remaining images of the plurality of images and the first content correspond to a mismatch;
receiving the input, the input corresponding to the controllable object being controlled to pass through the one image of the plurality of images; and
outputting the positive image in response to receiving the input.

15. The method of claim 1, wherein the first content and the second content corresponding to a match indicates that the second content is a translation of the first content from a first language to a second language, and
wherein the first content and the second content corresponding to a mismatch indicates that the second content is not a translation of the first content from the first language into the second language.

16. The method of claim 1, wherein the first content includes one of incorrect information or correct information, and the second content includes the other of the incorrect information or the correct information, and
wherein subject matter of the first content is unrelated to subject matter of the second content.

17. The method of claim 1, wherein the first content includes one of incorrect information or correct information, and the second content includes the other of the incorrect information or the correct information; and
wherein subject matter of the first content is related to subject matter of the second content.

18. The method of claim 1, further comprising:
outputting the additional environment in connection with the negative image,
wherein outputting the additional environment includes outputting a representation of the information suitable for memorization in association with an image having a characteristic, and
outputting an audio signal corresponding to the information suitable for memorization.

19. The method of claim 18, wherein the characteristic is a characteristic of a higher authority.

20. The method of claim 19, wherein the image having the characteristic of the higher authority includes an image of a disciplinary board.

21. The method of claim 19, wherein the image having the characteristic of the higher authority includes an image of a professor.

22. The method of claim 19, wherein the image having the characteristic of the higher authority includes an image of a figure having a characteristic of being friendly.

23. The method of claim 18, wherein the characteristic is a characteristic of dramatization.

24. The method of claim 23, wherein the image having the characteristic of dramatization includes an image of a figure being arrested.

25. The method of claim 23, wherein the image having the characteristic of dramatization includes an image of a news broadcast.

26. The method of claim 1, further comprising:
outputting the additional environment in connection with the negative image or the positive image, wherein outputting the additional environment includes displaying the information suitable for memorization as motionless at a first time and as moving at a second time.

27. The method of claim 1, further comprising:
outputting the additional environment in connection with the negative image or the positive image,
wherein outputting the additional environment includes displaying a first image including an entire portion of the information suitable for memorization, and subsequently displaying a second image including a highlighted portion of the information suitable for memorization, the highlighted portion being smaller than the entire portion.

28. The method of claim 1, wherein the additional environment includes a competition environment, such that the competition environment facilitates a competition between a plurality of users,
wherein the competition is based on the information suitable for memorization.

29. The method of claim 28, wherein the plurality of users are located in the same geographic location, are within a predetermined age group, or are assigned to learn the same subject matter.

30. The method of claim 1, wherein presenting the item object includes outputting an audio signal corresponding to information suitable for memorization included in the item object, and
wherein the input received from the user operating the user device includes an audio input.

31. The method of claim 30, wherein the audio input corresponds to the correct action when the audio input matches the information suitable for memorization, and
wherein the audio input corresponds to the incorrect action when the audio input does not match the information suitable for memorization.

32. A method comprising:
outputting, at a user device, an image sequence that forms an environment to facilitate memorization;
displaying a controllable object in the image sequence as moving along a path;
controlling a position of the controllable object within each image of the image sequence, based on an input received from a user operating the user device;
presenting an item object in the image sequence as an obstacle in the path to block the controllable object, the item object comprising a representation of a prompt that is correct or incorrect or incomplete;
outputting a negative image representing a negative indicator in response to the user input making a decision corresponding to an incorrect action with respect to the prompt or outputting a positive image representing a positive indicator in response to the user input making a decision corresponding to a correct action with respect to the prompt; and
outputting an additional environment to facilitate memorization, wherein the additional environment includes information suitable for memorization presented according to whether the positive image or the negative image is outputted, wherein outputting the additional environment includes displaying a first group of objects, wherein each object within the first group includes first information suitable for memorization, wherein the first information suitable for memorization is previously presented, and displaying a second group of objects, wherein each object in the second group includes second information suitable for memorization, wherein the second information suitable for memorization is newly presented, the first group being smaller than the second group.

33. A system comprising:
a display;
a system controller to control the display to output an image sequence that forms;
an environment to facilitate memorization;
a non-transitory memory comprising: a controllable object engine configured for being executed by a processor to facilitate displaying a controllable object in the image sequence as moving along a path, such that the controllable object interacts with the image sequence based on an input from a user; and
one or more data structures to store a plurality of prompts relating to information suitable for memorization, each prompt of the plurality of prompts being correct or incorrect or incomplete;
wherein the system controller is configured to control the display to present an item object in the image sequence as an obstacle in the path to block the controllable object, the item object comprising a representation of a prompt, among the plurality of prompts, and to output a negative image representing a negative indicator in response to the user input making a decision corresponding to an incorrect action with respect to the prompt and to output a positive image representing a positive indicator in response to the user input making a decision corresponding to a correct action with respect to the prompt, and
wherein outputting an additional environment includes displaying a first group of objects, wherein each object within the first group includes first information suitable for memorization, wherein the first information suitable for memorization is previously presented, and displaying a second group of objects, wherein each object in the second group includes second information suitable for memorization, wherein the second information suitable for memorization is newly presented, the first group being smaller than the second group.

34. The system of claim 33, wherein:
the system controller is configured to:
control the display to output the item object;
receive the input;
generate a comparison result based on a comparison between the input and relationship data stored in the one or more data structures, wherein the comparison result indicates whether the input corresponds to the controllable object passing through the item object or avoiding the item object; and
output the positive image or the negative image, based on the comparison result.

35. The system of claim 33, wherein the system controller is configured to output the item object as including a first item object displaying first content and second item object displaying second content,
wherein the system controller is further configured to initially output the first item object and subsequently output the second item, and
wherein the first content and the second content correspond to one of a match or a mismatch.

36. The system of claim 33, further comprising a speaker configured to:
output a first audio signal associated with the negative image representing the negative indicator in response to the user input making a decision corresponding to the incorrect action,
and
output a second audio signal associated with the positive image representing the positive indicator in response to the user input making a decision corresponding to the correct action.

37. A method comprising:
outputting, at a user device, an image sequence that forms an environment to facilitate memorization;
displaying a controllable object in the image sequence as moving along a path;

controlling a position of the controllable object within each image of the image sequence, based on an input received from a user operating the user device;

presenting an item object in the image sequence as an obstacle in the path to block the controllable object, the item object comprising a representation of a prompt that is correct or incorrect or incomplete;

outputting a negative image representing a negative indicator in response to the user input making a decision corresponding to an incorrect action with respect to the prompt or outputting a positive image representing a positive indicator in response to the user input making a decision corresponding to a correct action with respect to the prompt; and outputting an additional environment to facilitate memorization, wherein the additional environment includes information suitable for memorization presented according to whether the positive image or the negative image is outputted, wherein outputting the additional environment includes displaying a group of objects, wherein each object within the group includes information suitable for memorization, wherein the information suitable for memorization is previously presented.

* * * * *